United States Patent
Iyer

(10) Patent No.: US 9,131,000 B2
(45) Date of Patent: Sep. 8, 2015

(54) METHODS, SYSTEMS, AND COMPUTER READABLE MEDIA FOR HEURISTICS-BASED ADAPTIVE PROTOCOL PARSING

(75) Inventor: Rahul Iyer, Morrisville, NC (US)

(73) Assignee: IXIA, Calabasas, CA (US)

(*) Notice: Subject to any disclaimer, the term of this patent is extended or adjusted under 35 U.S.C. 154(b) by 104 days.

(21) Appl. No.: 13/447,160

(22) Filed: Apr. 13, 2012

(65) Prior Publication Data

US 2013/0275606 A1    Oct. 17, 2013

(51) Int. Cl.
*H04L 29/06* (2006.01)
*H04L 29/12* (2006.01)

(52) U.S. Cl.
CPC .............. *H04L 69/22* (2013.01); *H04L 61/10* (2013.01); *H04L 61/15* (2013.01)

(58) Field of Classification Search
None
See application file for complete search history.

(56) References Cited

U.S. PATENT DOCUMENTS

| | | | |
|---|---|---|---|
| 5,561,841 A | 10/1996 | Markus | |
| 5,850,386 A * | 12/1998 | Anderson et al. | 370/241 |
| 6,125,072 A | 9/2000 | Wu | |
| 6,771,957 B2 | 8/2004 | Chitrapu | |
| 6,996,772 B2 * | 2/2006 | Justice et al. | 715/236 |
| 7,543,054 B1 * | 6/2009 | Bansod et al. | 709/224 |
| 7,706,347 B2 | 4/2010 | Kim et al. | |
| 7,765,313 B2 * | 7/2010 | Jain et al. | 709/230 |
| 8,010,469 B2 | 8/2011 | Kapoor et al. | |
| 8,135,657 B2 | 3/2012 | Kapoor et al. | |
| 8,601,585 B2 * | 12/2013 | Beddoe et al. | 726/25 |
| 8,724,498 B2 | 5/2014 | Choi et al. | |
| 8,738,985 B2 | 5/2014 | Deng et al. | |
| 8,793,117 B1 | 7/2014 | Varshney et al. | |
| 8,855,070 B2 | 10/2014 | Deng et al. | |
| 8,892,829 B2 | 11/2014 | Asokan | |
| 8,908,535 B2 | 12/2014 | Campbell et al. | |
| 2003/0036403 A1 | 2/2003 | Shiu et al. | |
| 2005/0022012 A1 | 1/2005 | Bluestone et al. | |
| 2005/0220047 A1 | 10/2005 | Baey et al. | |
| 2006/0242499 A1 | 10/2006 | Volz | |
| 2006/0262880 A1 | 11/2006 | Mizuta et al. | |
| 2006/0276195 A1 | 12/2006 | Nordling | |
| 2007/0091921 A1 | 4/2007 | Elliot et al. | |
| 2009/0052473 A1 | 2/2009 | Choi et al. | |
| 2009/0077456 A1 | 3/2009 | Pi et al. | |
| 2009/0077457 A1 | 3/2009 | Ramesh et al. | |

(Continued)

OTHER PUBLICATIONS

Loria et al., Protocol Analysis in Intrusion Detection Using Decision Tree, Aug. 2004, IEEE 0-7695-2108-8/04, pp. 5.*

(Continued)

*Primary Examiner* — Kevin Bates
*Assistant Examiner* — Jeyanath Jeyaratnam
(74) *Attorney, Agent, or Firm* — Jenkins, Wilson, Taylor & Hunt, P.A.

(57) ABSTRACT

Methods, systems, and computer readable media for heuristics-based adaptive protocol parsing are disclosed. According to one aspect, a method for heuristics-based adaptive protocol parsing includes receiving a message of a first protocol, where the first protocol defines a plurality of valid message formats, and parsing the received message using a protocol tree for determining whether the received message is in one of the plurality of valid message formats. While parsing the received message, heuristics are used to optimize the protocol tree. In one embodiment, the protocol tree is optimized for parsing messages having the message format of a received message.

17 Claims, 56 Drawing Sheets

(56) References Cited

U.S. PATENT DOCUMENTS

| | | |
|---|---|---|
| 2009/0100300 A1 | 4/2009 | Kim |
| 2009/0196244 A1 | 8/2009 | Chun et al. |
| 2009/0245187 A1 | 10/2009 | Nam et al. |
| 2010/0075678 A1 | 3/2010 | Akman et al. |
| 2010/0165847 A1 | 7/2010 | Kamuf et al. |
| 2010/0184447 A1 | 7/2010 | Miki et al. |
| 2010/0195743 A1 | 8/2010 | Barsoum et al. |
| 2010/0272011 A1 | 10/2010 | Palanki et al. |
| 2010/0290371 A1 | 11/2010 | Beale |
| 2010/0303011 A1 | 12/2010 | Pan et al. |
| 2010/0331030 A1 | 12/2010 | Nory et al. |
| 2011/0032925 A1 | 2/2011 | Lee et al. |
| 2011/0044196 A1 | 2/2011 | Ishii |
| 2011/0076962 A1 | 3/2011 | Chen et al. |
| 2011/0086659 A1 | 4/2011 | Yoon et al. |
| 2011/0110315 A1 | 5/2011 | Chen et al. |
| 2011/0119552 A1 | 5/2011 | Park et al. |
| 2011/0158333 A1 | 6/2011 | Nakano et al. |
| 2011/0170439 A1 | 7/2011 | Miki et al. |
| 2011/0206151 A1 | 8/2011 | McCloud et al. |
| 2011/0235586 A1 | 9/2011 | Han et al. |
| 2011/0238855 A1 | 9/2011 | Korsunsky et al. |
| 2011/0302390 A1 | 12/2011 | Copeland et al. |
| 2012/0014242 A1 | 1/2012 | Kim et al. |
| 2012/0033650 A1 | 2/2012 | Ahn et al. |
| 2012/0039246 A1 | 2/2012 | Zhang et al. |
| 2012/0042226 A1 | 2/2012 | Ramesh et al. |
| 2012/0051271 A1 | 3/2012 | Beale |
| 2012/0063384 A1 | 3/2012 | Bi et al. |
| 2012/0093249 A1 | 4/2012 | Sun et al. |
| 2012/0094651 A1 | 4/2012 | Chun et al. |
| 2012/0144226 A1 | 6/2012 | Yang et al. |
| 2012/0150521 A1 | 6/2012 | Balkwill |
| 2012/0170524 A1 | 7/2012 | Ren et al. |
| 2012/0204081 A1 | 8/2012 | Fresia et al. |
| 2012/0240185 A1 | 9/2012 | Kapoor et al. |
| 2013/0006567 A1 | 1/2013 | Horn |
| 2013/0010724 A1 | 1/2013 | Han et al. |
| 2013/0024753 A1 | 1/2013 | Masuda et al. |
| 2013/0034062 A1 | 2/2013 | Seo et al. |
| 2013/0058240 A1 | 3/2013 | Kim et al. |
| 2013/0058294 A1 | 3/2013 | Miki et al. |
| 2013/0058306 A1 | 3/2013 | Noh et al. |
| 2013/0060735 A1* | 3/2013 | Haddy et al. .......... 707/620 |
| 2013/0070689 A1 | 3/2013 | Liu et al. |
| 2013/0070690 A1 | 3/2013 | Moon et al. |
| 2013/0088973 A1 | 4/2013 | Yang et al. |
| 2013/0115987 A1 | 5/2013 | Yoo et al. |
| 2013/0121168 A1 | 5/2013 | Luo et al. |
| 2013/0121295 A1 | 5/2013 | Saito et al. |
| 2013/0155867 A1 | 6/2013 | Asokan et al. |
| 2013/0155872 A1 | 6/2013 | Subramanian et al. |
| 2013/0155878 A1 | 6/2013 | Deng et al. |
| 2013/0184023 A1 | 7/2013 | Asokan et al. |
| 2013/0208600 A1 | 8/2013 | Campbell et al. |
| 2013/0208603 A1 | 8/2013 | Choi et al. |
| 2013/0227092 A1* | 8/2013 | Maestas .......... 709/220 |
| 2013/0227233 A1 | 8/2013 | Asokan |
| 2014/0169177 A1 | 6/2014 | Popescu et al. |
| 2014/0173094 A1 | 6/2014 | Majumdar et al. |
| 2014/0185425 A1 | 7/2014 | Kim et al. |
| 2014/0269361 A1 | 9/2014 | Asokan et al. |

OTHER PUBLICATIONS

Murray Hill (Self-Adjusting Binary Search Trees, Journal of the Association for Computing Machinery. vol. 32, No. 3, Jul. 1985, pp. 652-686, Total pp. 35).*

Dutta et al. (A Tight Lower Bound for Parity in Noisy Communication Networks, Tata Institute of Fundamental Research, Mumbai, India, 12 pages, 2008).*

Nilsson et al. (The Scalable Tree Protocol—A Cache Coherence Approach for Large-scale Multiprocessors, 9 Pages, 1992).*

Non-Final Office Action for U.S. Appl. No. 13/154,166 (Aug. 19, 2013).

Non-Final Office Action for U.S. Appl. No. 13/396,577 (Aug. 8, 2013).

Radio Electronics, "LTE CA: Carrier Aggregation Tutorial," pp. 1-7 http://www.radio-electronics.com/info/cellulartelecomms/lte-long-term-evolution/4g-lte-advanced-carrier-channel-aggregation.php (Printed from the Internet Aug. 7, 2013).

Share Technote, "Frame Structure—Downlink," pp. 1-11 http://www.sharetechnote.com/html/FrameStructure_DL.html#PCFICH (Printed from the Internet Aug. 7, 2013).

Non-Final Office Action for U.S. Appl. No. 13/336,005 (Jul. 2, 2013).

Non-Final Office Action for U.S. Appl. No. 13/431,975 (May 24, 2013).

Commonly assigned, co-pending U.S. Appl. No. 13/835,658 for "Methods, Systems, and Computer Readable Media for Utilizing Adaptive Symbol Processing in a Multiple User Equipment (Multi-UE) Simulator," (unpublished, filed Mar. 15, 2013).

3rd Generation Partnership Project, "Technical Specification Group Radio Access Network; Evolved Universal Terrestrial Radio Access (E-UTRA); Physical layer procedures (Release 11)," 3GPP TS 36.213, V11.2.0, pp. 1-173 (Feb. 2013).

3rd Generation Partnership Project, "Technical Specification Group Radio Access Network; Evolved Universal Terrestrial Radio Access (E-UTRA); Multiplexing and channel coding (Release 11)," 3GPP TS 36.212, V11.2.0, pp. 1-18 (Feb. 2013).

3rd Generation Partnership Project, "Technical Specification Group Radio Access Network; Evolved Universal Terrestrial Radio Access (E-UTRA); Physical Channels and Modulation (Release 11)," 3GPP TS 36.211, V11.2.0, pp. 1-109 (Feb. 2013).

3rd Generation Partnership Project, "Technical Specification Group Radio Access Network; Evolved Universal Terrestrial Radio Access (E-UTRA); Physical layer; Measurements (Release 11)," 3GPP TS 36.214, V11.1.0, pp. 1-14 (Dec. 2012).

3rd Generation Partnership Project, "Technical Specification Group Radio Access Network; Evolved Universal Terrestrial Radio Access (E-UTRA); LTE physical layer; General description (Release 11)," 3GPP TS 36.201, V11.1.0, pp. 1-13 (Dec. 2012).

3rd Generation Partnership Project, "Technical Specification Group Radio Access Network; Evolved Universal Terrestrial Radio Access (E-UTRA); Physical layer for relaying operation (Release 11)," 3GPP TS 36.215, V11.0.0, pp. 1-16 (Sep. 2012).

Xiao et al., "IMS Network Deployment Cost Optimization Based on Flow-Based Traffic Model," IEEE/IFIP Network Operations and Management Symposium—NOMS 2010, pp. 232-239 (2010).

"Network Topology," http://web.archive.org/web/20081219235147/http://en.wikipedia.org/wiki/Network_topology, pp. 1-9 (Dec. 19, 2008).

Commonly assigned, co-pending U.S. Appl. No. 13/431,975 for "Methods, Systems, and Computer Readable Media for Dynamically Controlling a Turbo Decoding Process in a Long Term Evolution (LTE) Multi-User Equipment (UE) Traffic Simulator," (unpublished, filed Mar. 28, 2012).

Commonly assigned, co-pending U.S. Appl. No. 13/429,384 for "Scalable Architecture for Multiple User Equipment (Multi-UE) Simulation," (unpublished, filed Mar. 25, 2012).

Commonly assigned, co-pending U.S. Appl. No. 13/408,787 for "Methods, Systems, and Computer Readable Media for Integrated Sub-Block Interleaving and Rate Matching," (unpublished, filed Feb. 29, 2012).

Commonly assigned, co-pending U.S. Appl. No. 13/396,577 for "Methods, Systems, and Computer Readable Media for Performing Long Term Evolution (LTE) Channel Delineation," (unpublished, filed Feb. 14, 2012).

Commonly assigned, co-pending U.S. Appl. No. 13/371,389 for "Methods, Traffic Simulators, and Computer Readable Media for Validating Long Term Evolution (LTE) Code Blocks and Transport Blocks," (unpublished, filed Feb. 10, 2012).

Commonly assigned, co-pending U.S. Appl. No. 13/352,058 for "Methods, Systems, and Computer Readable Media for Long Term Evolution (LTE) Uplink Data Processing," (unpublished, filed Jan. 17, 2012).

Commonly assigned, co-pending U.S. Appl. No. 13/336,005 for "Methods, Systems, and Computer Readable Media for Reducing the Impact of False Downlink Control Information (DCI) Detection in

(56) References Cited

OTHER PUBLICATIONS

Long Term Evolution (LTE) Physical Downlink Control Channel (PDCCH) Data," (unpublished, filed Dec. 23, 2011.
Commonly assigned, co-pending U.S. Appl. No. 13/326,264 for "Methods, Systems, and Computer Readable Media for Improved Long Term Evolution (LTE) Hybrid Automatic Repeat Request (HARQ) Processing," (unpublished, filed Dec. 14, 2011).
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 v9.9.0 (Dec. 2011).
"3rd Generation Partnership Project; Universal Mobile Telecommunications System (UMTS); Evolved Universal Terrestrial Radio Access (E-UTRA); Physical layer for relaying operation (Release 10)," 3GPP TS 36.216, v10.3.1 (Sep. 2011).
"3rd Generation Partnership Project; Technical Specification Group Radio Access Network; Evolved Universal Terrestrial Radio Access (E-UTRA); Physical layer procedures (Release 10)," 3GPP TS 36.213, V10.3.0 (Sep. 2011).
"3rd Generation Partnership Project; Technical Specification Group Radio Access Network; Evolved Universal Terrestrial Radio Access (E-UTRA); Multiplexing and channel coding (Release 10)," 3GPP TS 36.212, V10.3.0 (Sep. 2011).
"3rd Generation Partnership Project; Technical Specification Group Radio Access Network; Evolved Universal Terrestrial Radio Access (E-UTRA); Physical Channels and Modulation (Release 10)," 3GPP TS 36.211, V10.3.0 (Sep. 2011).
"LTE; Evolved Universal Terrestrial Radio Access (E-UTRA); Physical layer; Measurements (3GPP TS 36.214 version 10.1.0 Release 10)," ETSI TS 136 214, V10.1.0 (Apr. 2011).
Third Generation Partnership Project, "Technical Specification Group Radio Access Network; Evolved Universal Terrestrial Radio Access (E-UTRA); LTE Physical Layer; General Description," 3GPP TS 36.201 v10.0.0, Release 10 (Dec. 2010).
"IxCatapult Chassis," http://www.ixiacom.com/products/display?skey=ch_ixcatapult, pp. 1-2 (Downloaded from the Internet Apr. 14, 2010).
"Wireless Network Testing," Ixia, 915-2623-01 Rev A, pp. 1-18 (Jan. 2010).
"Wireless Network Testing," Ixia, 915-2622-01 Rev A, pp. 1-16 (Jan. 2010).
"3rd Generation Partnership Project; Technical Specification Group Radio Access Network; Requirements for Evolved UTRA (E-UTRA) and Evolved UTRAN (E-UTRAN) (Release 9)," 3GPP TR 25.913, v9.0.0 (Dec. 2009).
"PDCCH Blind Decoding," PDCCH Decoding Example, http://www.steepestascent.com, pp. 1-6 (Copyright 2009-2011, dowloaded from the Internet Dec. 4, 2011).
Notice of Allowance and Fee(s) Due for U.S. Appl. No. 13/326,264 (Jun. 9, 2014).
Notice of Allowance and Fee(s) Due for U.S. Appl. No. 13/154,166 (Jun. 2, 2014).
Applicant-Initiated Interview Summary for U.S. Appl. No. 13/154,166 (Apr. 28, 2014).
Non-Final Office Action for U.S. Appl. No. 13/429,384 (Apr. 9, 2014).
Non-Final Office Action for U.S. Appl. No. 13/429,384 (Mar. 13, 2014).
Final Office Action for U.S. Appl. No. 13/154,166 (Mar. 3, 2014).
Final Office Action for U.S. Appl. No. 13/336,005 (Feb. 26, 2014).
Final Office Action for U.S. Appl. No. 13/326,264 (Feb. 20, 2014).
Non-Final Office Action for U.S. Appl. No. 13/408,787 (Feb. 3, 2014).

Notice of Allowance and Fee(s) Due for U.S. Appl. No. 13/431,975 (Jan. 22, 2014).
Notice of Allowance and Fee(s) Due for U.S. Appl. No. 13/396,577 (Dec. 18, 2013).
Non-Final Office Action for U.S. Appl. No. 13/431,975 (Oct. 10, 2013).
Non-Final Office Action for U.S. Appl. No. 13/326,264 (Oct. 10, 2013).
Commonly-assigned, co-pending U.S. Appl. No. 14/027,113 for "Methods, Systems, and Computer Readable Media for Test Configuration Optimized Decoding of Protocol Messages in a Network Device Test System," (Unpublished, filed Sep. 13, 2013).
3rd Generation Partnership Project, "Technical Specification Group Radio Access Network; Evolved Universal Terrestrial Radio Access (E-UTRA); Physical layer for relaying operation (Release 11)," 3GPP TS 36.216, V11.0.0, pp. 1-16 (Sep. 2012).
Ikuno et al., "System level simulation of LTE networks," 2010 IEEE 71st Vehicular Technology Conference: VTC2010-Spring, (May 16-19, 2010).
Notice of Publication for GB Patent Application No. 1411056.3 (Aug. 11, 2014).
Notice of Allowance and Fee(s) Due for U.S. Appl. No. 13/371,389 (Aug. 8, 2014).
Non-Final Office Action for U.S. Appl. No. 13/352,058 (Aug. 4, 2014).
Notice of Allowance and Fee(s) Due for U.S. Appl. No. 13/408,787 (Jul. 18, 2014).
Notification of Transmittal of the International Search Report and the Written Opinion of the International Searching Authority, or the Declaration for International Application No. PCT/US2012/070877 (Mar. 28, 2013).
Dahlman et al., "10.4.9: Blind Decoding of PDCCHs," 4G LTE / LTE-Advanced for Mobile Broadband, pp. 199-202 (2011).
Non-Final Office Action for U.S. Appl. No. 13/716,077 (Sep. 24, 2014).
Notice of Allowance and Interview Summary of U.S. Appl. No. 13/352,058 (Feb. 5, 2015).
Advisory Action Before the Filing of an Appeal Brief, Examiner-Initiated Interview Summary and AFCP 2.0 Decision for U.S. Appl. No. 13/429,384 (Mar. 3, 2015).
Non-Final Office Action and Examiner-Initated Interview Summary for U.S. Appl. No. 13/336,005 (Dec. 5, 2014).
Final Office Action for U.S. Appl. No. 13/429,384 (Nov. 21, 2014).
Non-Final Office Action for U.S. Appl. No. 13/154,166 (Oct. 28, 2014).
"DCT2000 LTE UE Simulation API Manual," Release 17.1, Catapult Communications, pp. 1-106 (May 2009).
"Catapult Communications Announces High-Capacity LTE UE Simulation Test System," Catapult Communications Corporation, pp. 1-2 (Feb. 9, 2009).
Zyren, "Overview of the 3GPP Long Term Evolution Physical Layer," White Paper, Freescale Semiconductor, Inc., Document No. 3GPPEVOLUTIONWP, pp. 1-24 (Jul. 2007).
"LTE (Long Term Evolution) Testing Systems," http://www.catapult.com/technologies/tech_lte.htm, pp. 1-2 (Jun. 26, 2008).
"Turbo Coding and MAP decoding—Part 1," www.complextoreal.com, pp. 1-24 (Copyright 2006).
Regalia, "Iterative Decoding of Concatenated Codes: A Tutorial," EURASIP Journal on Applied Signal Processing, vol. 6, pp. 762-774 (2005).
Notice of Allowance and Fee(s) Due & Examiner-Initiated Interview Summary for U.S. Appl. No. 13/716,077 (Feb. 20, 2015).
Non-Final Office Action for U.S. Appl. No. 13/718,813 (Jan. 14, 2015).

\* cited by examiner

METHODS, SYSTEMS, AND COMPUTER READABLE MEDIA FOR HEURISTICS-BASED ADAPTIVE PROTOCOL PARSING

TECHNICAL FIELD

The subject matter described herein relates to methods and systems for decoding and analyzing received messages for adherence to a protocol. More particularly, the subject matter described herein relates to methods, systems, and computer readable media for heuristics-based adaptive protocol parsing.

BACKGROUND

A message protocol defines the content or form of a message in a standardized manner, so that entities using the protocol can communicate with each other unambiguously. A message may have distinct parts with distinct functions. For example, a message may include a routing header that identifies the sender and intended receiver of the message, a payload section that includes the content of the message that is to be delivered, and a checksum that may be used to detect and possibly correct errors that may have been injected into the message while in transit. These distinct parts are commonly referred to as information elements, or IEs.

A message protocol may define several different varieties or types of messages. These message types may share some common IEs, such as the routing header or checksum, but may also have IEs that are unique to each type of message. For example, each message may include a message type identifier so that the receiving entity may unambiguously determine which type of message it is receiving and thus know what IEs that message should contain. For each type of message, the message protocol may define not only what IEs that type of message should contain but also what order that the IEs should appear within the message.

An entity that receives messages that adhere to a message protocol may use a programming construct called a protocol tree to parse the received messages. Protocol trees define one or more valid message formats. A familiar example is the hypertext transport protocol, or HTTP. HTTP defines a number of request types, including GET, PUT, POST, HEAD, DELETE, and TRACE. The following pseudo code represents the actions that might be taken by a parsing function that traverses an HTTP protocol tree that, for the sake of this example, is not optimally organized:

```
1    receive HTTP message;
2    read HTTP message_type from the message type IE;
3    IF message_type = TRACE THEN
4        process TRACE message
5    ELSE IF message_type = DELETE THEN
6        process DELETE message
7    ELSE IF message_type = HEAD THEN
8        process HEAD message
9    ELSE IF message_type = POST THEN
10       process POST message
11   ELSE IF message_type = PUT THEN
12       process PUT message
13   ELSE IF message_type = GET THEN
14       process GET message
15   END IF
```

In the pseudo code shown above, the parsing function traverses the protocol tree in the order in which the branches exist within the tree: the first branch defines the expected structure of a TRACE message, the second branch defines the expected structure of a DELETE message, and so on through the list of valid message types. If the most commonly received message type is the GET message, however, this means that for most messages the parsing function performs five separate and time consuming tests—TRACE, DELETE, HEAD, POST, and PUT—before it correctly matches GET. The efficiency of this parsing function could be improved by providing a new protocol tree whose first branch defines the expected structure of a GET message, whose second branch defines the expected message for the next most common message type, such as PUT for example, and so on. If the environment in which this parser and its improved protocol tree operates is one in which the least expected message type occurs the most often, however, the improved protocol tree suffers the same inefficiencies as before. In a conventional system where the protocol tree is statically defined, the performance of the parsing function can vary greatly depending on the specific traffic received.

The example above illustrates the point that the order of IEs in a received protocol message could affect the performance of a decoding function if the order of IEs received doesn't match the order of the implemented protocol tree. These inefficiencies become more and more significant as the size of the protocol tree increases. Protocol trees that handle multiple protocols or protocols with many message types and/or significant variations of IEs within a message type can be quite large and thus even more susceptible to this kind of inefficiency.

Protocol tree inefficiency can have wide-ranging ramifications. The performance of a communication system is an important factor in its acceptance and eventual success in the marketplace. Improving performance and efficiency is also continuous process of engineering a communication system. Thus, there is a need for a decoding function that can adapt itself to parse the IEs of a received protocol message in a more efficient manner. Specifically, there exists a need for methods, systems, and computer readable media for heuristics-based adaptive protocol parting.

SUMMARY

According to one aspect, a method for heuristics-based adaptive protocol parsing includes receiving, at a hardware communications interface, a message of a first protocol, where the first protocol defines a plurality of valid message formats, and parsing the received message using a protocol tree for determining whether the received message is in one of the plurality of valid message formats. While parsing the received message, heuristics are used to optimize the protocol tree. In one embodiment, the protocol tree is optimized for parsing messages having the message format of the received message.

As used herein, the term "heuristic" is given the meaning most appropriate to a computer science context, e.g., "pertaining to the use of the general knowledge gained by experience", "relating to or using a problem-solving technique in which the most appropriate solution of several found by alternative methods is selected at successive stages of a program for use in the next step of the program', or "analysis based on previously observed information." In at least one of the embodiments described herein, for example, the term "heuristic" is used to describe a process in which the structure of a protocol tree is modified such that it is optimized for processing observed message formats. In some cases, optimization of the tree to process observed message formats may reduce the efficiency of the system or parser to process messsage formats that have not been observed yet but that are allowed by the system.

According to another aspect, the subject matter described herein includes a system for heuristics-based adaptive protocol parsing. The system includes a protocol tree for defining a plurality of valid message formats and a protocol analyzer that includes logic for: receiving a message and using the protocol tree to parse the received message and determine whether the received message is in one of the plurality of valid message formats. While parsing the received message, the protocol analyzer uses heuristics to optimize the protocol tree. In one embodiment, the protocol tree is optimized for parsing messages having the message format of the received message.

The subject matter described herein can be implemented in software in combination with hardware and/or firmware. For example, the subject matter described herein can be implemented in software executed by a processor, or by a circuit, logic, or other hardware for implementing the functions described herein. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for heuristics-based adaptive protocol parsing. Reference will now be made in detail to exemplary embodiments of the present invention, examples of which are illustrated in the accompanying drawings. Wherever possible, the same reference numbers will be used throughout the drawings to refer to the same or like parts.

Figure 1:
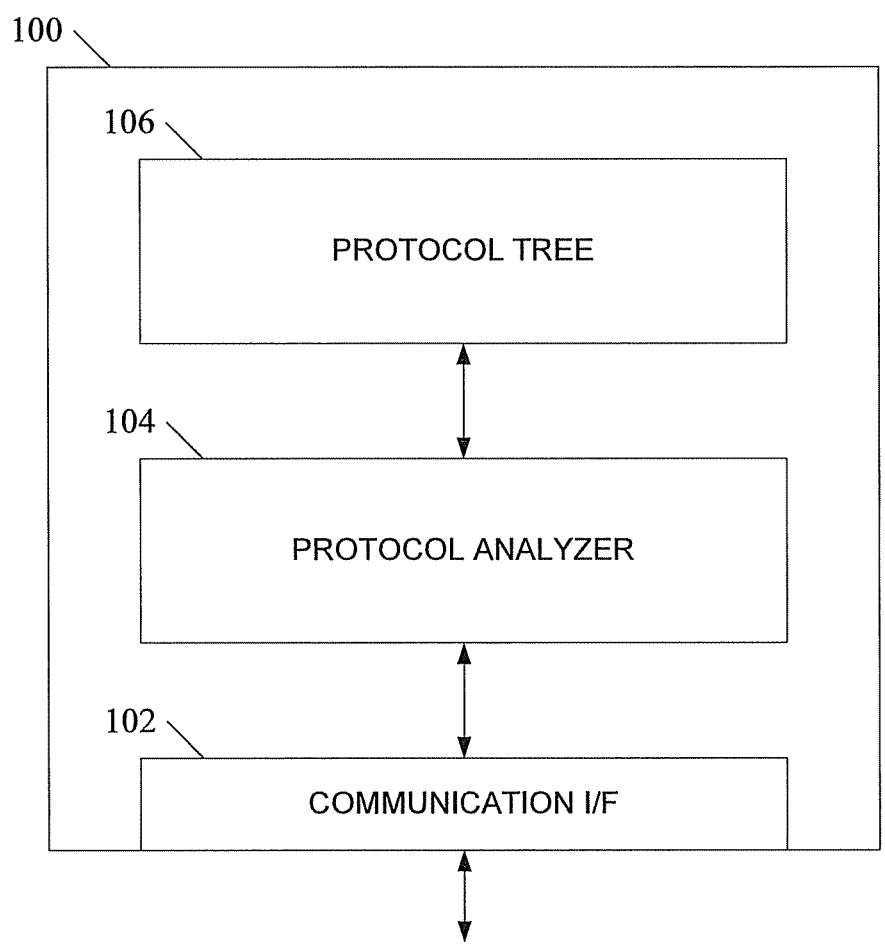
FIG. 1 is a block diagram illustrating an exemplary system for heuristics-based adaptive decoding according to an embodiment of the subject matter described herein.

FIG. 1 is a block diagram illustrating an exemplary system for heuristics-based adaptive decoding according to an embodiment of the subject matter described herein. In the embodiment illustrated in FIG. 1, system 100 includes a communications interface 102 for receiving protocol messages that have multiple valid message formats. The received messages are forwarded to a protocol analyzer or parser 104, which uses a protocol tree 106 to parse the received message. Protocol analyzer 104 determines whether the received message is in one of the multiple valid message formats. While parsing the received message, protocol analyzer 104 uses heuristics to optimize protocol tree 106.

In one embodiment, using heuristics to optimize the protocol tree includes optimizing the protocol tree for parsing messages having the format of the received message. In one embodiment, the protocol tree is optimized for parsing messages having the message format of the most recently received message, but other heuristics may be used. For example, the protocol tree may be optimized to parse messages having the message format that is most often received, or most often received during a sliding window of time, such as during the last minute, hour, day, or period. In one embodiment of the "most often received" heuristic, a protocol tree may be speculatively optimized while parsing the received message, e.g., by operating on a copy of the "working" protocol tree, after which the modified protocol tree becomes the new working tree only if the system determines that the most recently received message format has now become the most often received message format.

Figure 2:
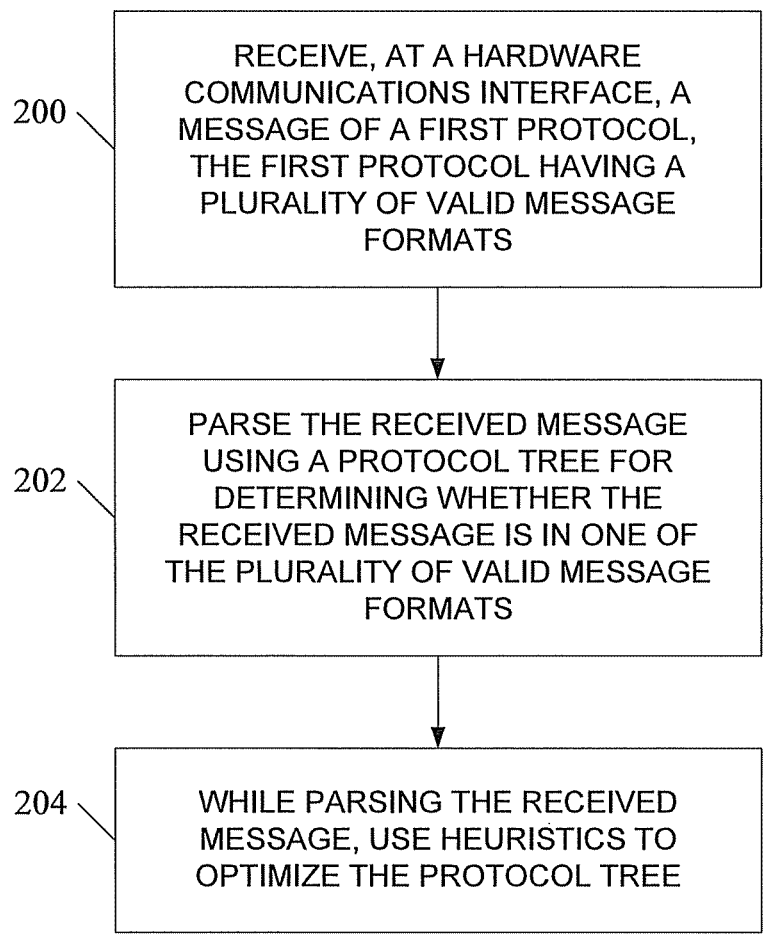
FIG. 2 is a flow chart illustrating an exemplary process for heuristics-based adaptive protocol parsing according to an embodiment of the subject matter described herein.

FIG. 2 is a flow chart illustrating an exemplary process for heuristics-based adaptive protocol parsing according to an embodiment of the subject matter described herein. In the embodiment illustrated in FIG. 2, step 200 includes receiving a message of a particular protocol that defines multiple valid message formats. Referring to the embodiment in FIG. 1, for example, communication interface 102 may receive a protocol message and pass the received message to protocol analyzer 104.

At step 202, the received message is parsed using a protocol tree for determining whether the received message in a valid format. For example, in FIG. 1, protocol tree 106 may define the valid formats for the received message in graph form, where each node of the graph is an information element (IE). In one embodiment, protocol analyzer 104 may process the IEs of the received message while it traverses protocol tree 106. For example, if the order of IEs in the received message corresponds to an extant path within protocol tree 106, protocol analyzer 104 may conclude that the received message is in a valid format.

At step 204, while parsing the received message, heuristics are used to optimize the protocol tree. In one embodiment, the protocol tree may be optimized to parse messages having the same message format as the most recently received message. In FIG. 1, for example, protocol analyzer 104 may reorganize the structure of protocol tree 106 such that the format of the just-received message is checked for first, before checking for any of the other valid formats. This may involve modifying the protocol tree such that observed information elements appear before non-observed information elements in a search of the protocol tree, a process that will be explained in more detail using additional figures, below. In alternative embodiments, the protocol tree may be optimized to parse messages having the message format that is most often received, the message format that is most often received during a sliding window of time, or other heuristics.

In one embodiment, the protocol tree is restructured only so long as the received message is a valid message format; if the received message turns out to be an invalid message format, the protocol tree is returned to its form prior to the reception of the invalid message. For example, a protocol tree may be speculatively optimized while parsing the received message, e.g., by operating on a copy of the "working" protocol tree, after which the modified protocol tree becomes the new working tree only if the system determines that the most recently received message was in a valid format.

In one embodiment, heuristics based adaptive decoding involves reordering or adapting the implemented protocol tree of a communication system, in real-time, to match that of the system with which it is communicating. Reordering the implemented protocol tree improves the parsing performance of the decoder, by increasing the likelihood of finding matches in the least possible search attempts over time. Reordering may create additional overhead for the first few messages, but over a period of time the protocol tree should stabilize into its newly adapted form. A protocol tree is said to be "adapted" when the order of IEs at each level of the implemented protocol tree most closely reflects the corresponding order of incoming messages. By reordering the protocol tree so that it matches the order in which IEs have appeared in messages received so far, the search time is likely to be reduced. This is so because most systems tend to send IEs in a particular order and therefore reordering the receiver's protocol tree to match the order favored by the sender increases the chances of matching in the least possible search attempts.

A protocol may define messages that are so distinct from each other that each message is considered to be of a different type or class from the other. A protocol may also define messages that are very similar to each other, differing only in the order in which the elements appear, differing only in the number of times a repeating element appears, or differing only by the inclusion or exclusion of optional elements, to give but three examples. This distinction gives rise to two different categories of information elements, herein referred to as "choice" IEs and "non-choice" IEs.

Choice IEs denote a union of one or more alternatives—i.e., at a given level of a protocol tree only one IE from the set of choices is relevant in the message. Using the HTTP example above, the IE that defines the HTTP message type can be one of "GET", "POST", "PUT", etc. Another way to think of choice IEs is that they indicate the choice or selection of one or another branch of the protocol tree. Once a branch of the protocol tree is taken, the non-selected branches need not be considered. Choice IEs at the same level of a protocol tree are mutually exclusive of each other. Choice IEs are generally not interchangeable, not repeatable, and not optional.

Non-choice IEs are an ordered or unordered collection of IEs which are not mutually exclusive: the appearance of one non-choice IE does not foreclose or exclude the consideration of other non-choice IEs. Depending on the protocol specification, non-choice IEs at the same level of the protocol tree may appear in any order, may appear multiple times, or may not appear at all. In other words, non-choice IEs may be interchangeable, may be repeatable, and may be optional, depending on the particular protocol.

Figure 3A:
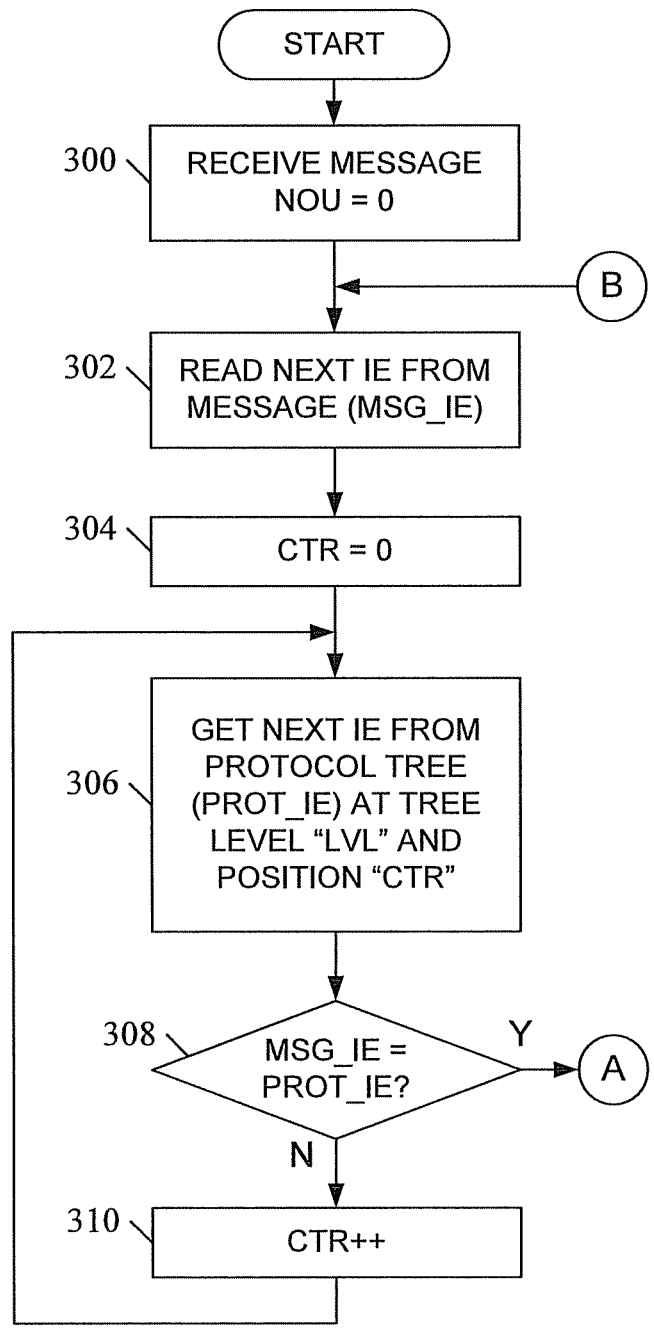
FIGS. 3A and 3B are flow charts illustrating in more detail an exemplary process for heuristics-based adaptive protocol parsing according to an embodiment of the subject matter described herein.
Figure 3B:
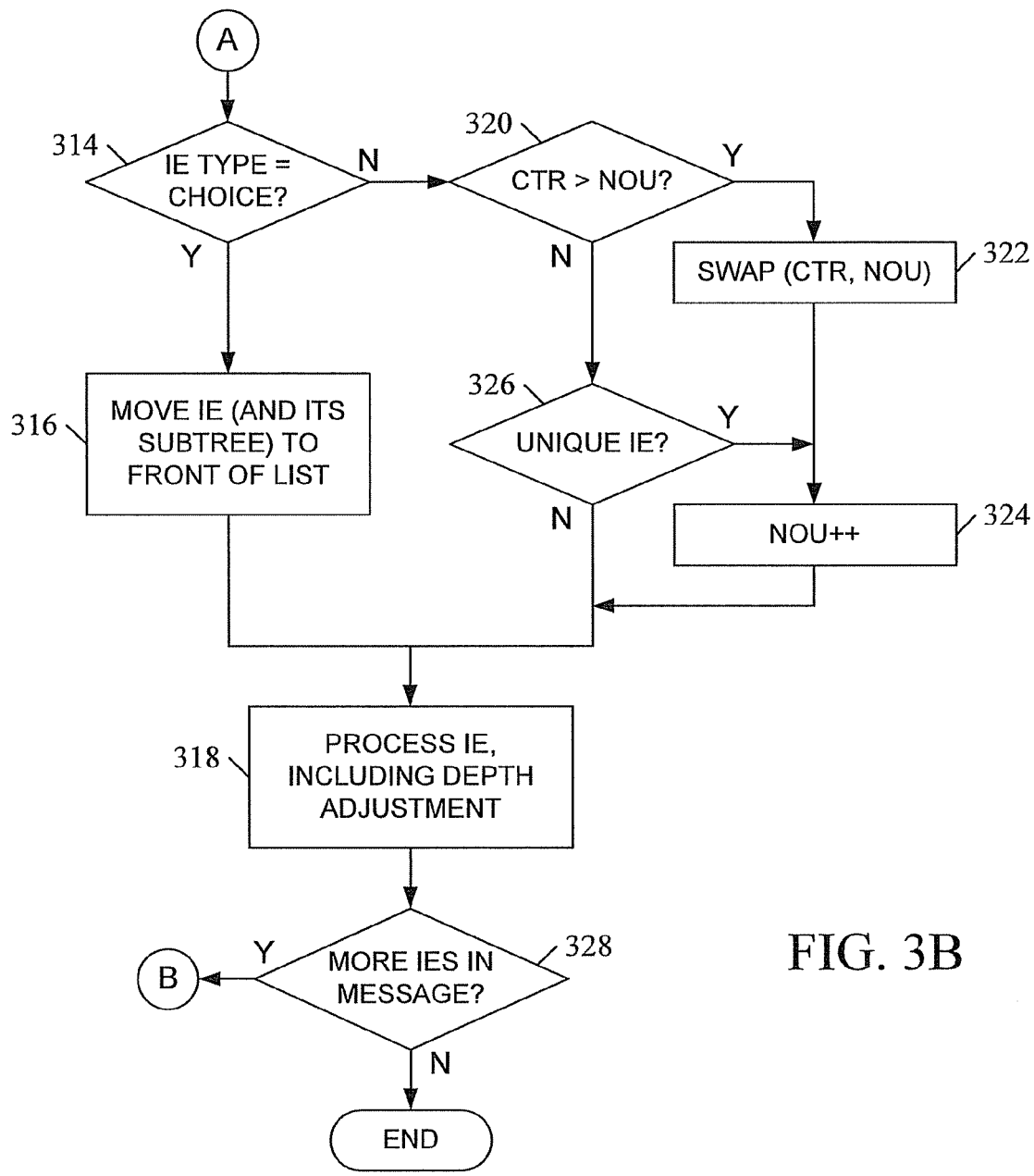

FIGS. 3A and 3B illustrate parts of flow chart illustrating in more detail an exemplary process for heuristics-based adaptive protocol parsing according to an embodiment of the subject matter described herein. In the embodiment illustrated in FIGS. 3A and 3B, the technique to implement reordering is slightly different based on whether the IE is a choice IE or a non-choice IE. As will be illustrated in more detail below, in one embodiment choice IEs are moved to a branch of the protocol tree that is evaluated first, e.g., "moved to the front of the list", while non-choice IEs are not simply moved to the front of the list but are instead relocated within the list so that the order of IEs within the list most closely match the order of IEs as they appeared in the received message. In other words, non-choice IEs may be moved to the front of the list but may also be moved to some location other than the front of the list.

In one embodiment, the number of unique IEs observed at each level in the protocol IE tree is maintained, for example as a variable named "NOU". As the IE from the message is compared to entries at a given level of the protocol tree, the index into the tree is also maintained, for example as a variable named "CTR". If a match is found, i.e., if the IE from the message matches an IE within the given level of the protocol tree, the value of CTR is compared to the value of NOU. If the offset is greater than the number of unique matches, the IE at position NOU within the protocol tree and the IE at position CTR within the protocol tree trade places. If the value of CTR is not greater than the value of NOU, the protocol tree is not modified. In either case, the IE is then processed. For simplicity, the process illustrated in FIGS. 3A and 3B does not include steps to detect and handle error conditions, such as mal-formed protocol messages, etc.

Referring now to FIG. 3A, the process starts at step 300, in which a message is received for parsing. In the embodiment illustrated in FIG. 3, a counter or variable NOU is set to zero. At step 302, the first IE is read from message. In the embodiment illustrated in FIG. 3, this IE is stored in a variable named "MSG_IE". At step 304, a counter or variable CTR is set to zero. At step 306, the first IE is read from the protocol tree. In the embodiment illustrated in FIG. 3, this IE is stored in a variable named "PROT_IE". At step 308, MSG_IE is compared to PROT_IE. If they do not match, the process moves to step 310, where CTR is incremented. If, at step 308, MSG_IE and PROT_IE match, the process moves to entry point "A" in FIG. 3B.

Referring now to FIG. 3B, at step 314, it is determined whether the matched IE is a "choice" type or a "non-choice" type. If the matched IE is a choice type, the process goes to step 316, in which the IE (and its sub-tree, if it has one) is moved from its current position within the protocol tree to the front of the list for that level of the protocol tree. In one embodiment, the matched IE and the IE at the current front of the list switch places, but in another embodiment the matched IE may be moved to the front of the list while the displaced IEs all move to their new positions, which is usually less efficient than a simple swap if the old position of the matched IE differs from the new position of the IE by more than one. The process then moves to step 318.

If, at step 314, the matched IE is a "non-choice" type, the process moves to step 320, which checks to see whether the value of CTR is greater than the value of NOU. If CTR>NOU, the process moves to step 322, where the matched IE (along with its sub-branch, sub-tree, or child nodes if extant) is swapped from its current position, which is pointed to by CTR, with the node at the position just after the last unique IE matched, which is pointed to by NOU. This is represented by the function SWAP(CTR,NOU) shown in element 322. The process then moves to step 324, in which the value of NOU is incremented, and then to step 318. If, at step 320, the value of CTR is not greater than the value of NOU, no swap will take place, but step 326 checks whether or not the matched IE has been seen before at the current level of the protocol tree, i.e., whether or not the IE is unique. If the IE has previously been seen at that level, the process goes directly to step 318, but if the IE has not previously been seen at that level, the process goes to step 324, which increments NOU, and then to step 318. In one embodiment, step 326 may check for the condition CTR=NOU as an indicator that the matched IE has not been seen before at the current level and is therefore unique for that level.

Thus, in one embodiment, a system may maintain information specific to a particular level, branch, or sub-branch of the protocol tree. Example information that may be maintained may include a list of the unique IEs found so far for a particular level, the values of CTR and NOU, and/or any other information that is appropriate. An example of maintenance of this kind of information will be discussed in more detail starting with FIG. 5A, below.

At step 318, the IE is processed. In one embodiment, since a match has been found, the value of CTR is reset to zero in preparation for the next search. In one embodiment, step 318 includes analyzing the most recently matched IE to determine whether it is a leaf node or a non-leaf (i.e., "parent") node. In one embodiment, if the IE is a parent node, the information being maintained for that level or sub-branch of the parser tree may be stored, e.g., pushed on to a "stack", for later retrieval and use, and new information, separate from the information about the parent node or its level, may be maintained for the children of the parent node. This is referred to in element 318 as "depth adjustment." In one embodiment, going to a new level includes maintaining CTR and NOU values specific to that level. When a new level is entered for the first time, for example, the value of NOU for that level may be set to zero. Once the child nodes have all been processed, the information about that level may be discarded (or kept, in embodiments which maintain statistics about received messages) and the information about the parent node may be retrieved from or popped off of the stack while the parser returns to the level of the parent and continues processing IEs at that level.

After the IE processing in step 318 is complete the process goes to step 328, which checks to see whether the received message contains IEs that have not yet been processed. If not, the process ends; if the message does contain more IEs, the process returns to FIG. 3A via entry point "B", and at step 302 the next IE is read from the message.

Figure 4:
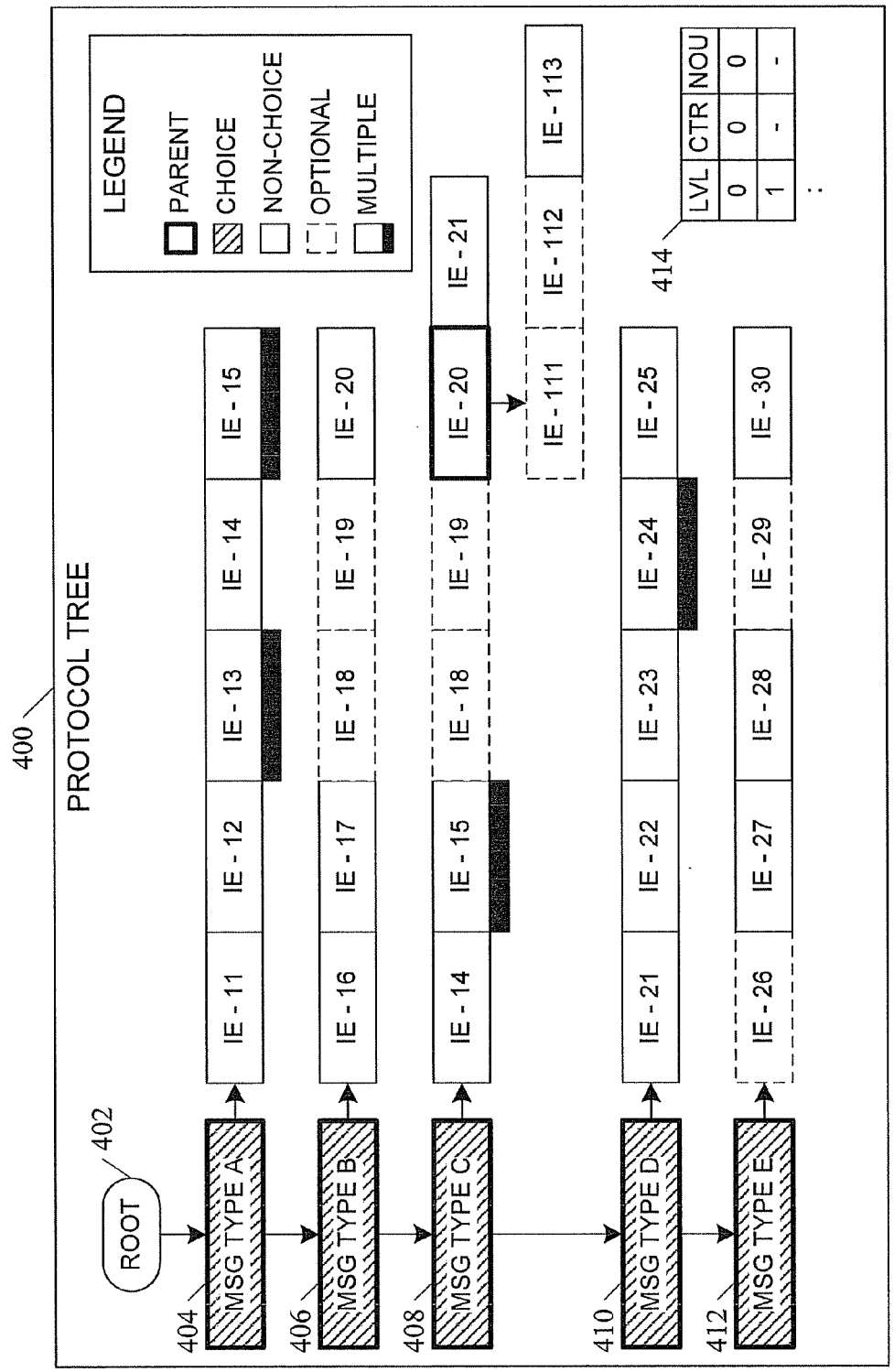
FIG. 4 illustrates an exemplary protocol tree according to an embodiment of the subject matter described herein.

FIG. 4 illustrates an exemplary protocol tree according to an embodiment of the subject matter described herein. In the embodiment illustrated in FIG. 4, the protocol tree is made up of a set of linked nodes, where each node except the root node represents an information element (IE) that may appear in a message that adheres to the protocol. As shown in the legend in FIG. 4, parent IEs are indicated by a box with a thick line, choice IEs are indicated by a filled box, non-choice IEs are indicated by a non-filled box, optional IEs are indicated by a box with a dashed line, and IEs that can occur one or more times are indicated by a box with a thick bottom border. In the embodiment illustrated in FIG. 4, for example, protocol tree 400 includes a root node 402 which points to the top of a list that includes choice nodes 404, 406, 408, 410, and 412. As used herein, the terms "top of a list" and "front of a list" are used interchangeably, depending on the graphic orientation of the list in the respective figure. Each of these choice nodes is the root or parent of a sub-tree that defines the valid format or formats for a particular message type. For example, node 404 is the parent node of a sub-tree that defines the format(s) of a first message type, called "Type A", node 406 is the parent node of a sub-tree that defines the format(s) of a second message type, called "Type B", and so on.

Referring to node 404, a Type A message includes a number of non-choice IEs, which can appear in any order. In the embodiment illustrated in FIG. 4, each unique non-choice IE is identified with a number. For example, node 404 points to a list of IEs that may appear in a Type A message. This list includes information elements IE-11, IE-12, IE-13, IE-14, and IE-15. In the embodiment illustrated in FIG. 4, IE-13 may appear multiple times, and IE-15 may also appear multiple times.

Referring to node 408, a Type C message may include IEs such as IE-14, IE-15 (which can occur multiple times), optional IEs IE-18 and IE-19, IE-20, and IE21. In the embodiment illustrated in FIG. 4, IE-20 is a parent node that points to a list of child choice nodes, optional node IE-111, optional node IE-112, and non-optional node IE-113. Although not shown in FIG. 4, each of the non-choice nodes IE-112, IE-112, and IE-113 may be the parent of its own sub-tree, according to the complexities of the protocol. Thus, protocol tree 400 may be as simple or as complicated as required to fully describe all of the valid message formats and variations that are defined or allowed by the protocol in question. Although not shown in FIG. 4, in one embodiment the list of nodes, such as nodes 404, 406, 408, 410, and 412, and/or the list of information elements, such as IE-11 through IE-15, may be implemented as a linked list or other suitable programming construct. In the embodiment illustrated in FIG. 4, a table 414 or other suitable construct may be used to maintain information used during the optimization process.

FIGS. 5A through 12M illustrate in detail the operation of a system and method for heuristics-based adaptive decoding according to an embodiment of the subject matter described herein. FIGS. 5A through 12M show the steps performed as a received message 500 is analyzed using example protocol tree 400 and following the method described in the detailed flow chart illustrated in FIG. 3. In the embodiment illustrated in FIGS. 5A through 12M, table 414 is used to store values of two variables, "number of unique" (NOU) and "counter" (CTR), for each level of the parse tree. NOU is used to keep track of the number of unique IEs that have been identified within received message 500, and a CTR is a counter that tracks the progression through the nodes of protocol tree 400.

FIGS. 5A through 5F illustrate the steps performed by a protocol analyzer, such as protocol analyzer 104 in FIG. 1, as it searches protocol tree 400 for an IE that matches the first IE of message 500. FIGS. 6A through 6E illustrate the steps performed by protocol analyzer 104 as it searches protocol tree 400 for an IE that matches the second IE of message 500. FIGS. 7A through 7E illustrate the steps performed by protocol analyzer 104 as it searches protocol tree 400 for an IE that matches the third IE of message 500. FIGS. 8A through 8E illustrate the steps performed by protocol analyzer 104 as it searches protocol tree 400 for an IE that matches the fourth IE of message 500. FIGS. 9A through 9E illustrate the steps performed by protocol analyzer 104 as it searches protocol tree 400 for an IE that matches the fifth IE of message 500. FIGS. 10A through 10G illustrate the steps performed by protocol analyzer 104 as it searches protocol tree 400 for an IE that matches the sixth IE of message 500. FIGS. 11A through 11F illustrate the steps performed by protocol analyzer 104 as it searches protocol tree 400 for an IE that matches the seventh IE of message 500. FIGS. 12A through 12M illustrate the steps performed by protocol analyzer 104 as it searches protocol tree 400 for an IE that matches the eighth and last IE of message 500.

Figure 5A:
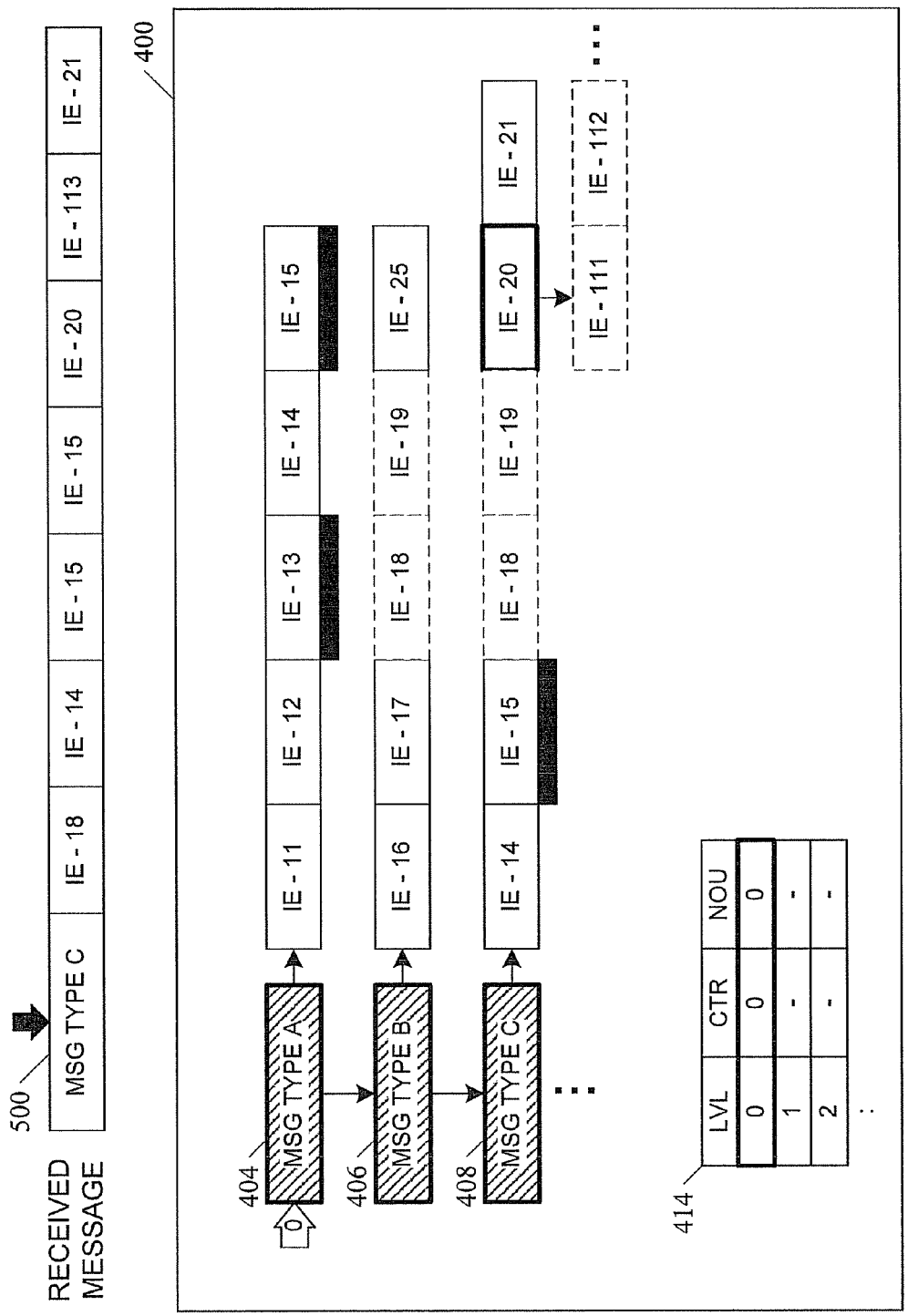
FIGS. 5A through 12M illustrate in detail the operation of a system and method for heuristics-based adaptive decoding according to an embodiment of the subject matter described herein.

FIG. 5A represents the results of steps 300 through 308 of FIG. 3A. At step 300 of FIG. 3A, a message is received and NOU is set to zero. As shown in FIG. 5A, received message 500 includes multiple information elements, including an IE that defines the message as a "Type C" message, an IE-18, an IE-14, two IE-15s, an IE-20, an IE-113, and an IE-21. At step 302 of FIG. 3A, the next IE is read from message 500 and CTR is set to zero. This next IE, which is herein referred to as MSG_IE, is identified in FIG. 5A using a black arrow. At step 304 of FIG. 3A, the value of CTR is set to zero. In FIG. 5A, the currently active level of table 414—LVL0—is indicated by a thick black border, and the value of CTR for LVL0 is set to zero.

At step 306 of FIG. 3A, the protocol analyzer gets the next IE from protocol tree 400. Starting at the root node (not shown) of protocol tree 400, the protocol analyzer gets the next IE from protocol tree 400, i.e., node 404. In the embodiment illustrated in FIG. 5A, the next IE, which is herein referred to as PROT_IE, is identified in FIG. 5A using a white arrow, and the current value of CTR (here, "0") is shown as a digit within the white arrow. At step 308 of FIG. 3A, MSG_IE is compared to PROT_IE. In FIG. 5A, MSG_IE and PROT_IE do not match.

Figure 5B:
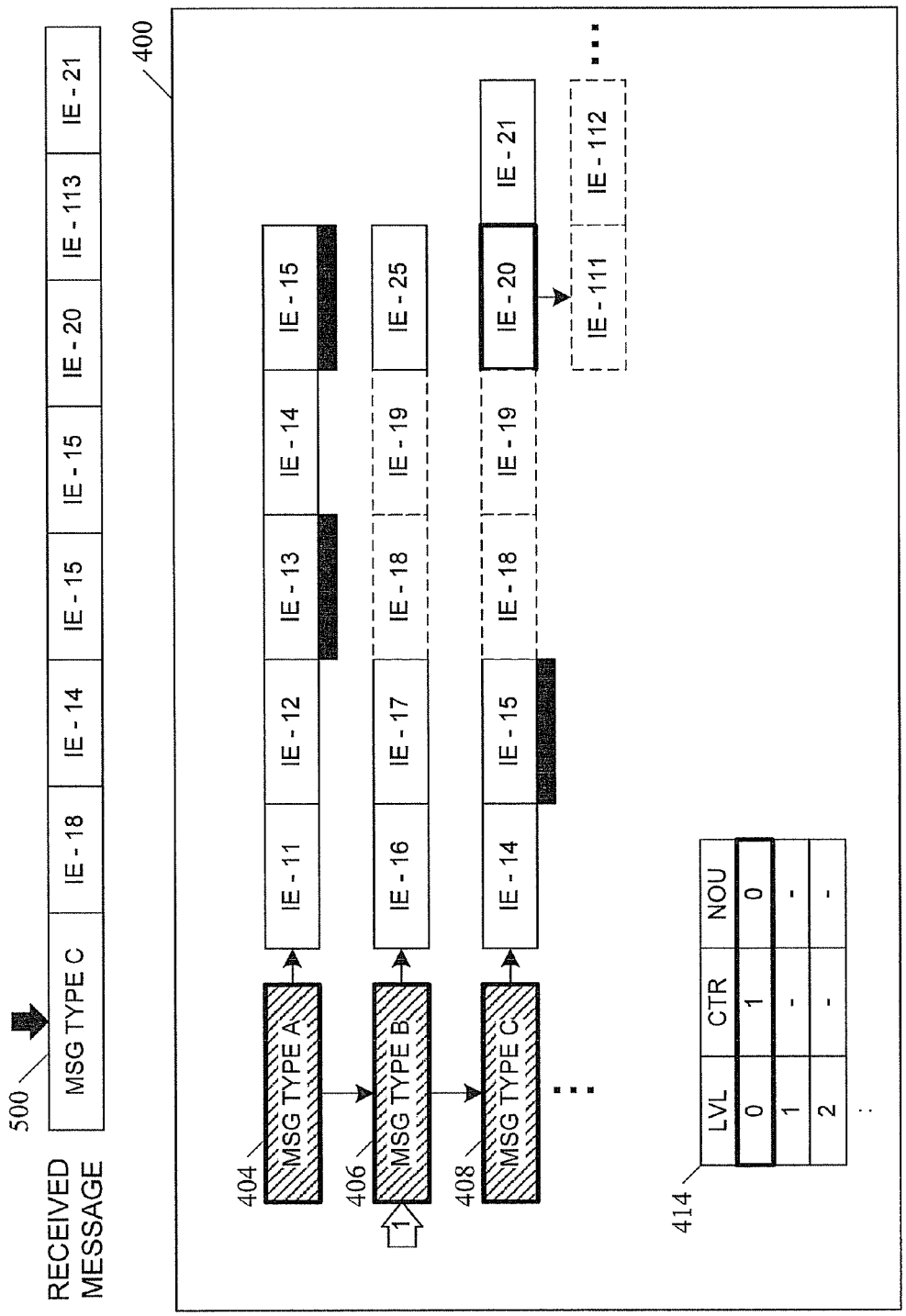

FIG. 5B represents the results of steps 310, 306, and 308 of FIG. 3A, in that order. These steps are herein referred to as the "match loop." The value of CTR for LVL0 is incremented to "1", the next node of protocol tree 400, node 406, becomes PROT_IE, and MSG JE is again compared to PROT_IE. In the embodiment illustrated in FIG. 5B, MSG_IE and PROT_IE again do not match.

Figure 5C:
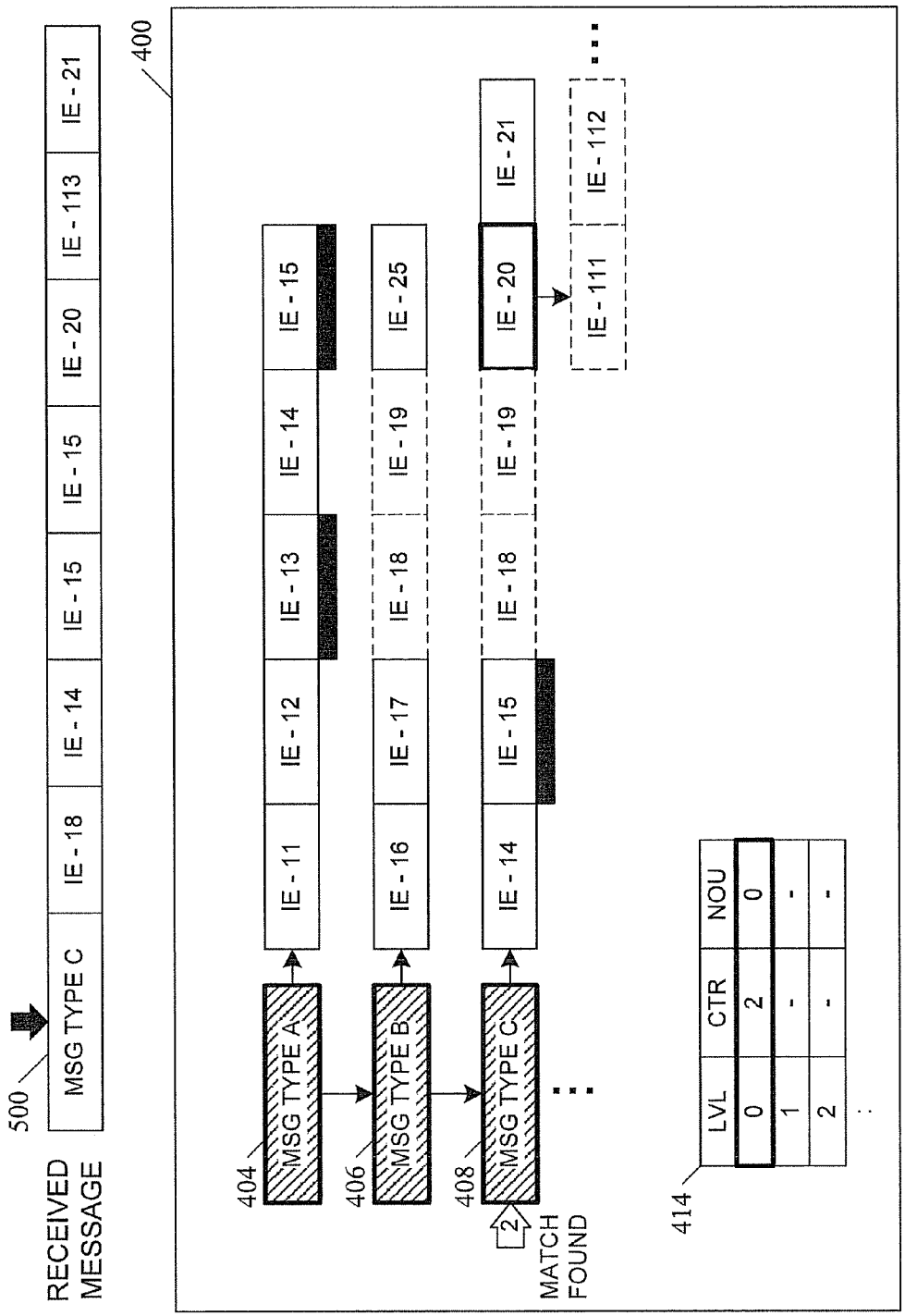

FIG. 5C represents another iteration through the match loop. Node 408 of protocol tree 400 becomes PROT_IE and CTR is incremented to "2", but this time PROT_IE matches MSG_IE.

Figure 5D:
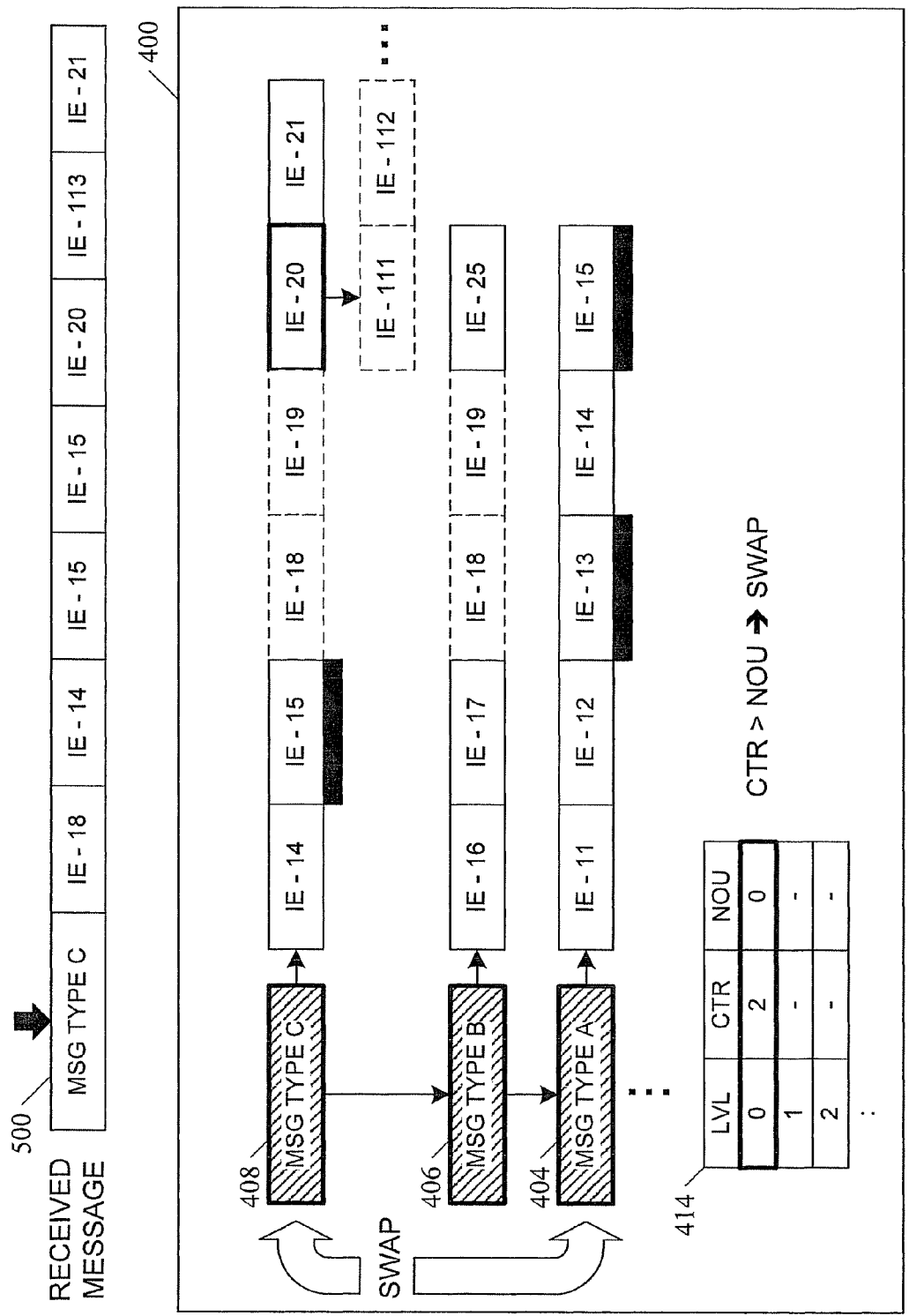

FIG. 5D represents the results of steps 314, 316, and 318 of FIG. 3B. At step 314, it is determined that PROT_IE (node 408) is a choice type, and at step 316, node 408 and its sub-tree are moved to the top of the list of choice modes. In the embodiment illustrated in FIG. 5D, nodes 404 and 408 swap places, which requires less restructuring of protocol tree 400 than would be required to move node 408 to the top of the list and relocate each of nodes 404 and 406 down one level, but restructuring may be accomplished performed in any manner that results in node 408 appearing earlier in the search of protocol tree 400. At step 318, MSG_IE is processed.

Figure 5E:
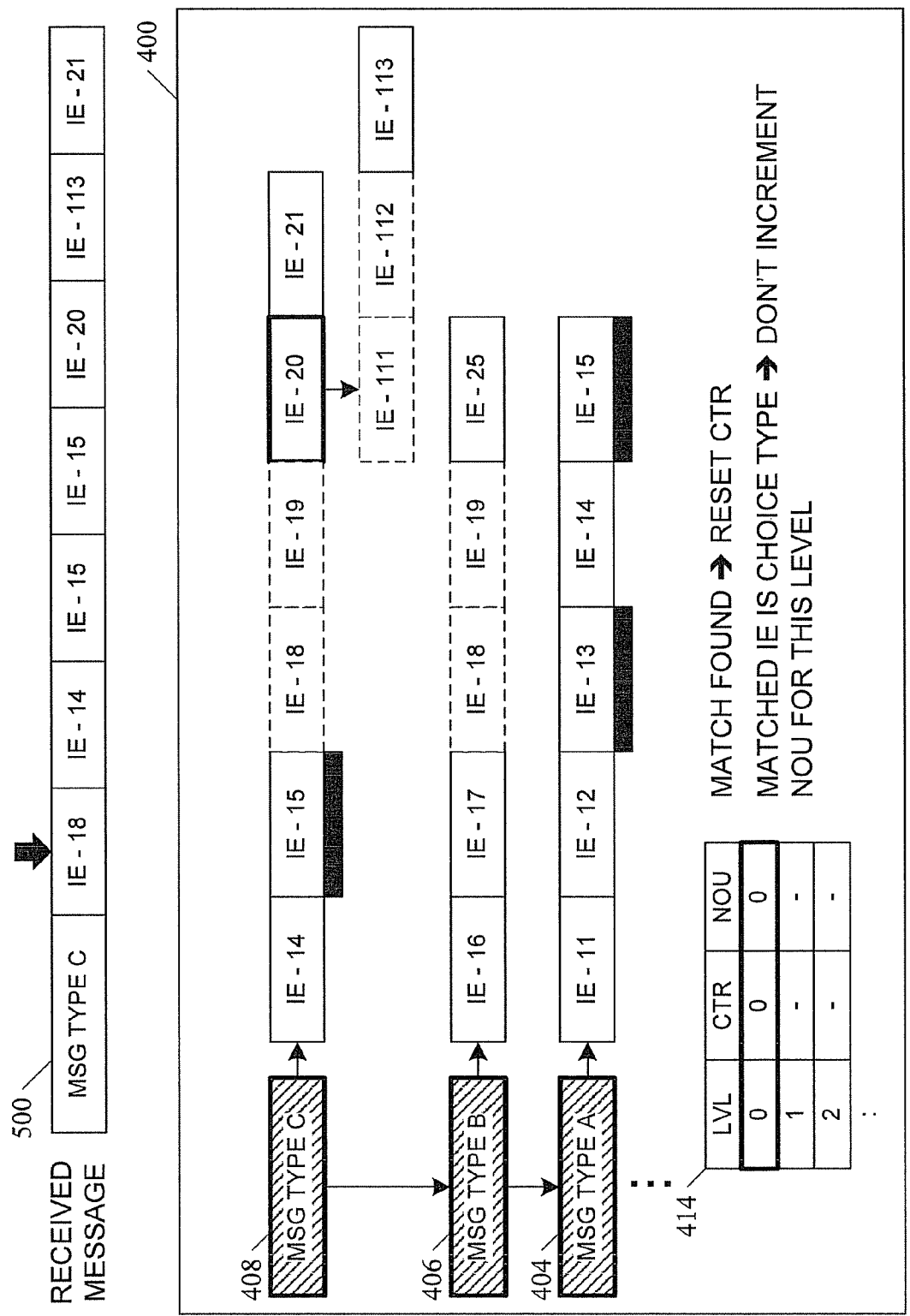
Figure 5F:
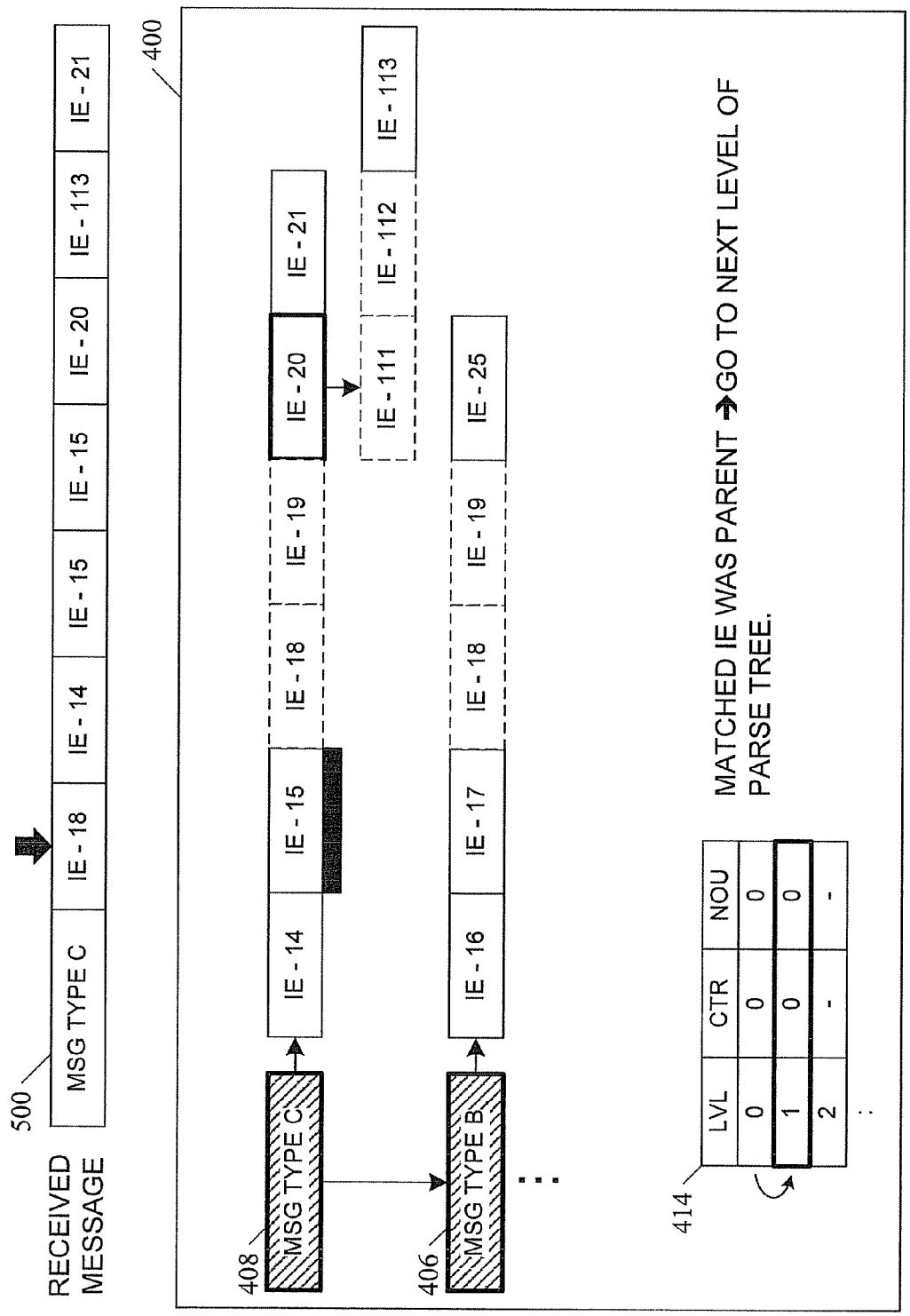

FIGS. 5E and 5F represent the actions taken in step 318. In FIG. 5E, since a match is found, the value for CTR at that level is set to zero. In one embodiment, since the matched IE is a choice type, NOU is not incremented, but in another embodiment NOU may be incremented. In FIG. 5F, the matched IE is a parent type, so the current values of CTR and NOU are stored, e.g., pushed onto a stack, and values of CTR and NOU for a new level—LVL1—are maintained within table 414. LVL1 becomes the new active level, as indicated by the thick border around that row of table 414. The process then moves to step 328 in FIG. 3B Since message 500 includes more IEs, at step 328 the process returns to step 302 in FIG. 3A.

Figure 6A:
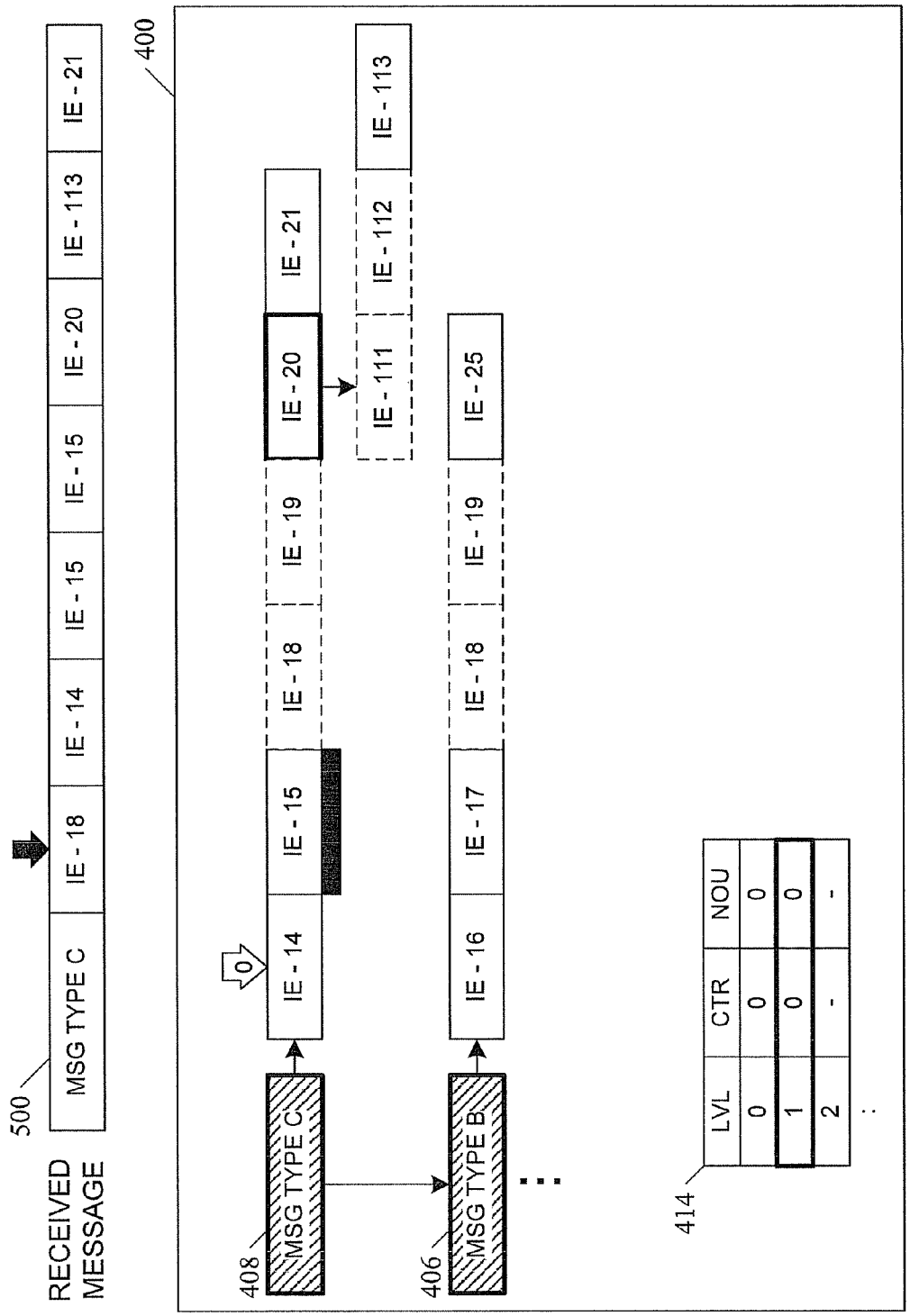

FIG. 6A represents another iteration of the match loop, this time searching the protocol tree for a match to the next MSG_IE, "IE-18". In the embodiment illustrated in FIGS. 5A through 12M, CTR is used as a pointer to the list of IEs that are at the same level of a particular branch of sub-branch of the protocol tree. Thus, in FIGS. 5A through 5F, CTR pointed first to node 404, then to node 406, then to 408, and so on, until nodes 408 and 404 exchanged places. In this example, CTR=0 indicates that the first node in the list for that level is being considered, CTR=1 indicates that the second node in the list for that level is being considered, and so on. In actual implementation, CTR may be a value that is independent from a pointer, index, or other structure that indicates which nodes in the list for that level is being considered. Here, for simplicity, CTR is being used synonymously and somewhat loosely as an index into a list of nodes at a particular level of the protocol tree. Thus, in FIG. 6A, CTR=0 for LVL1 does not point back to node 408, which is LVL0, but points instead to the first node in the list of nodes for LVL1, which is the node "IE-14". The second node in the list of nodes for LVL1 is the node "IE-15", and so on.

Figure 6B:
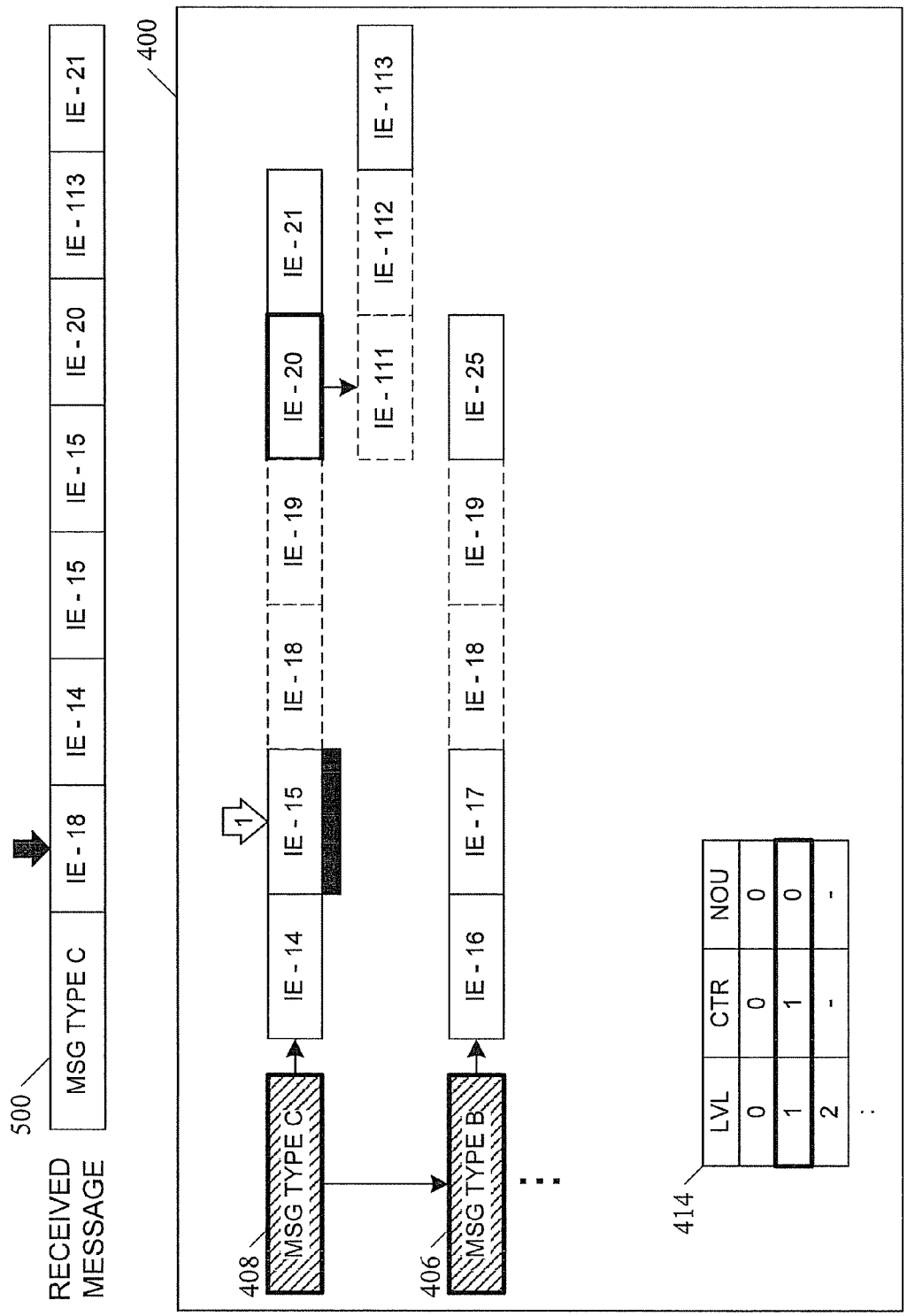
Figure 6C:
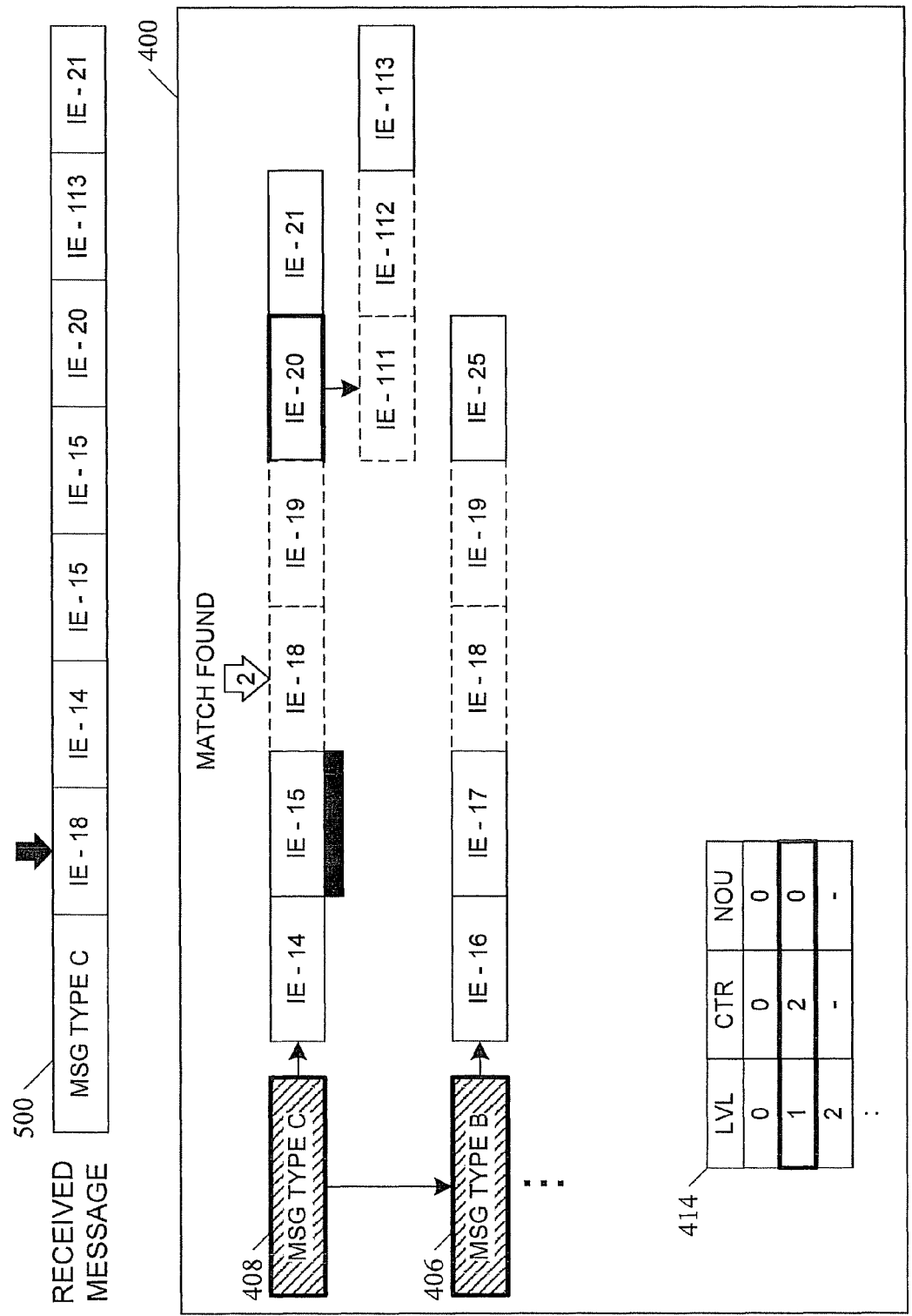
Figure 6D:
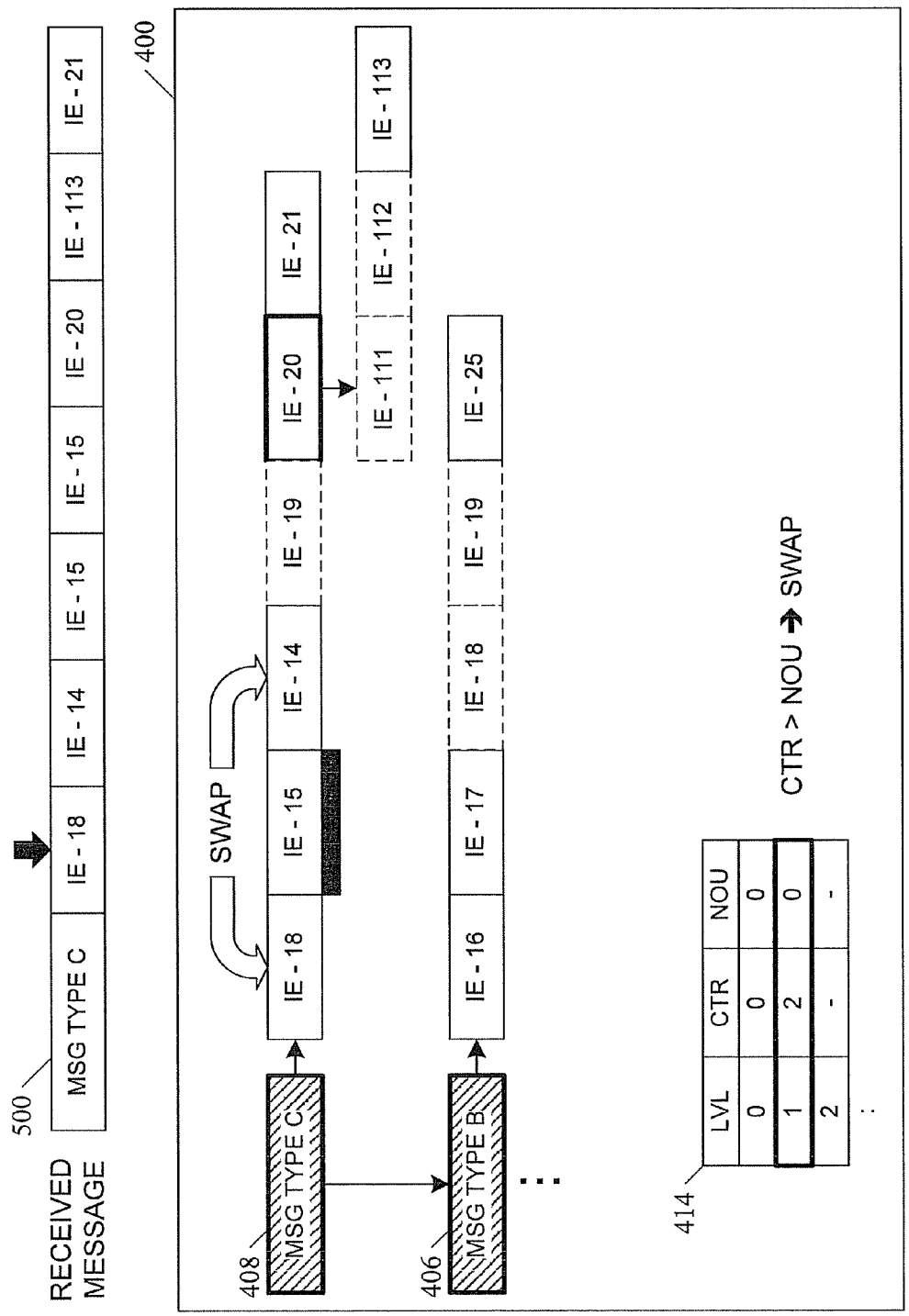
Figure 6E:
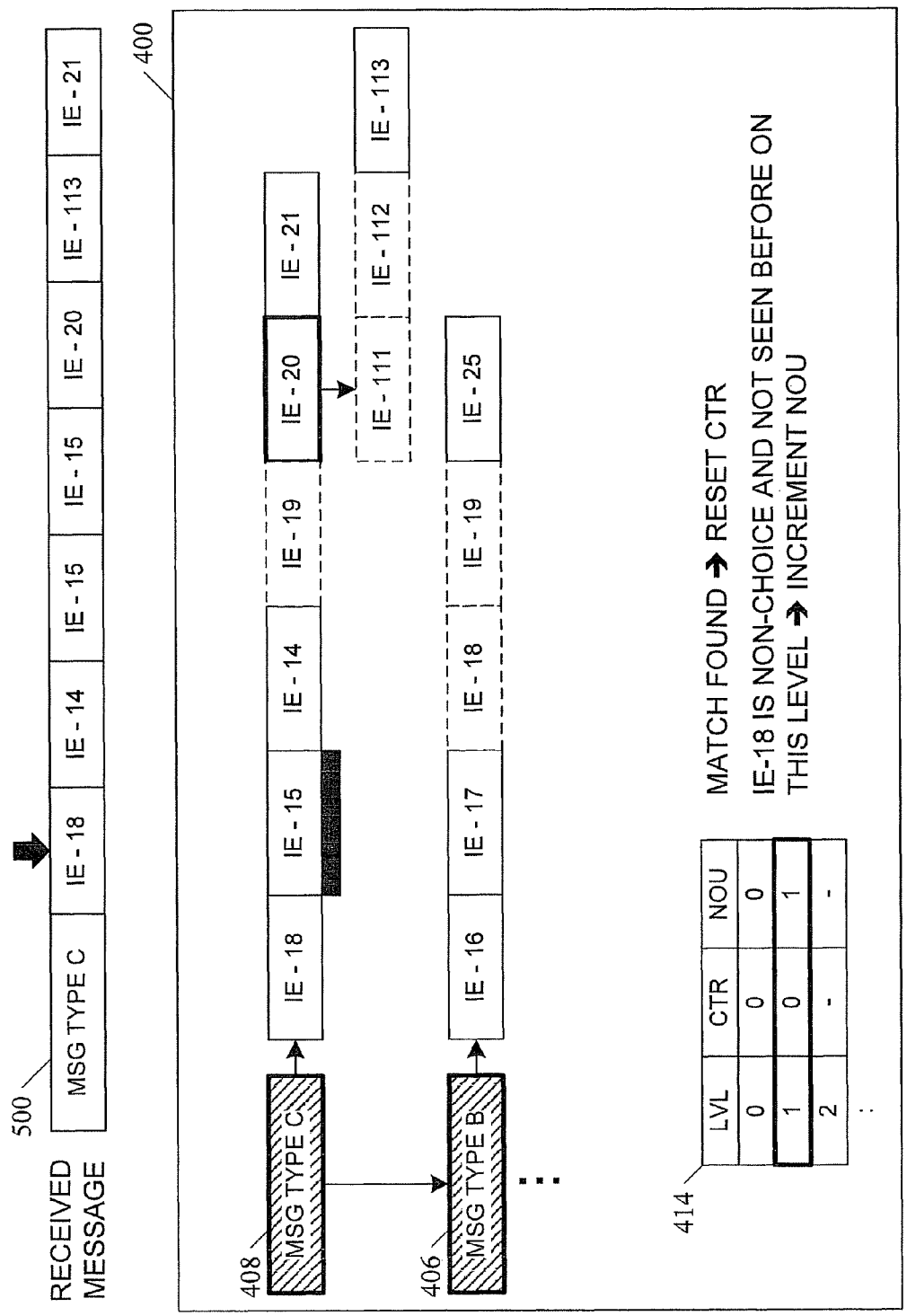

In FIG. 6A, CTR for LVL1=0, and the corresponding PROT_IE (IE-14) does not match the current MSG_IE (IE-18). In FIG. 6B, CTR for LVL1=1, and the corresponding PROT_IE (IE-15) does not match MSG_IE. In FIG. 6C, CTR=2, and PROT_IE matches MSG_IE. In FIG. 6D, since the value of CTR (2) is greater than the value of NOU (0), protocol tree 400 is optimized by swapping the protocol IE at position 2 is with the protocol IE at position 0. Thus, IE-18 and IE-14 change places within protocol tree 400. In FIG. 6E, the newly matched IE (IE-18) is processed. Since a match was found, CTR for LVL1 is reset to zero, and since IE-18 is a non-choice IE that has not yet been seen at this level of the parse tree, NOU for LVL1 is incremented. In one embodiment, if CTR>NOU this indicates that NOU should be incremented.

Figure 7A:
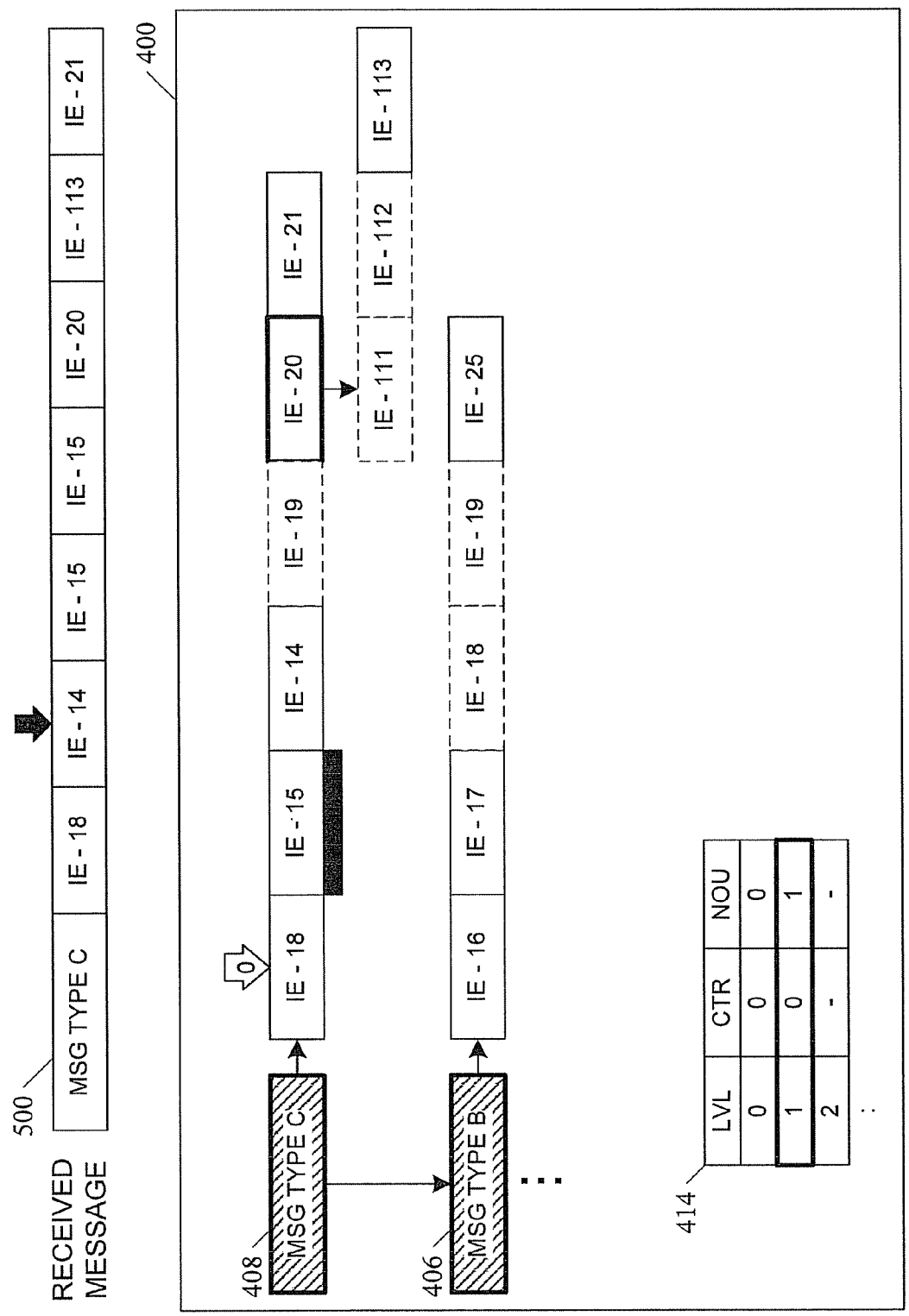
Figure 7B:
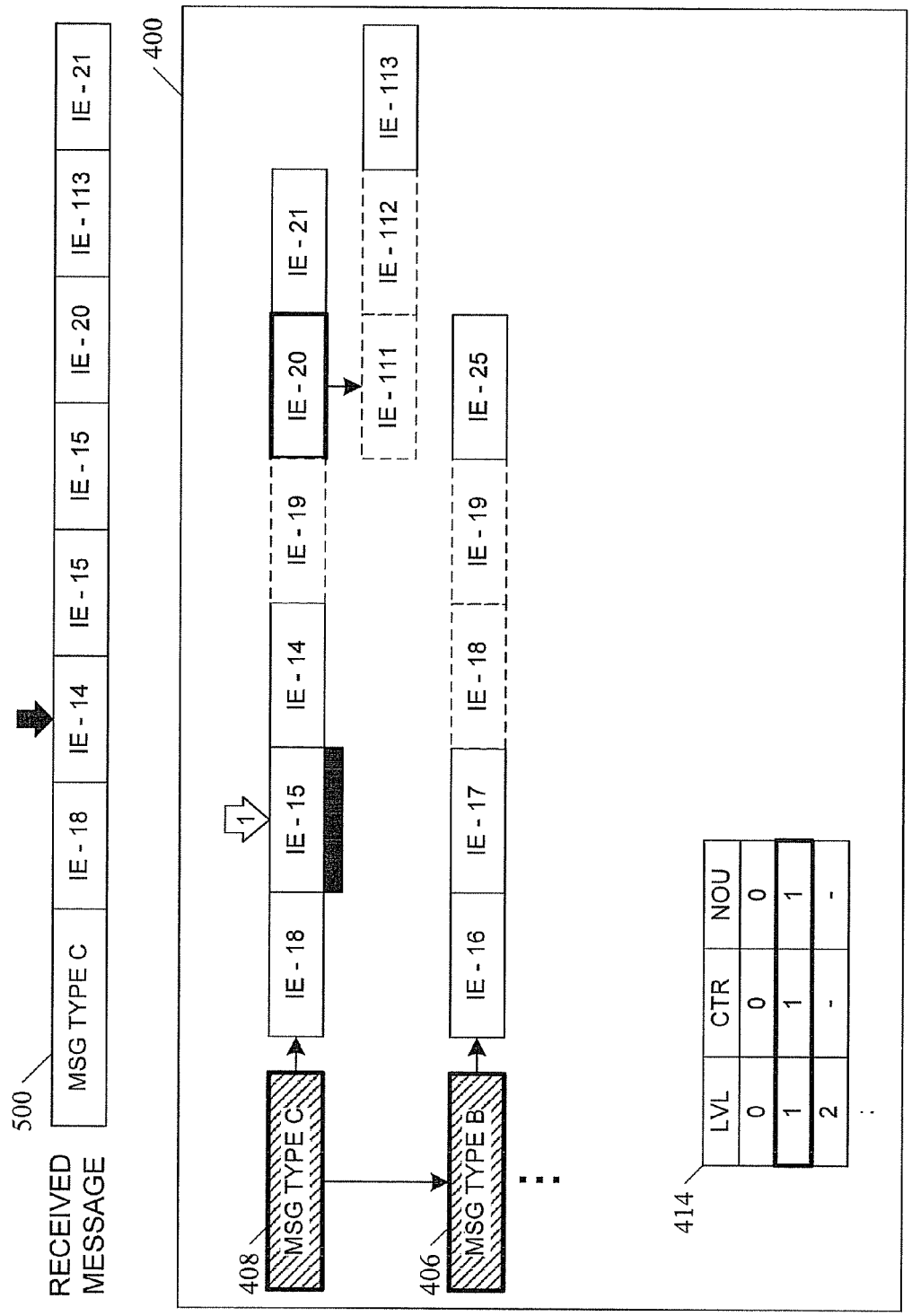
Figure 7C:
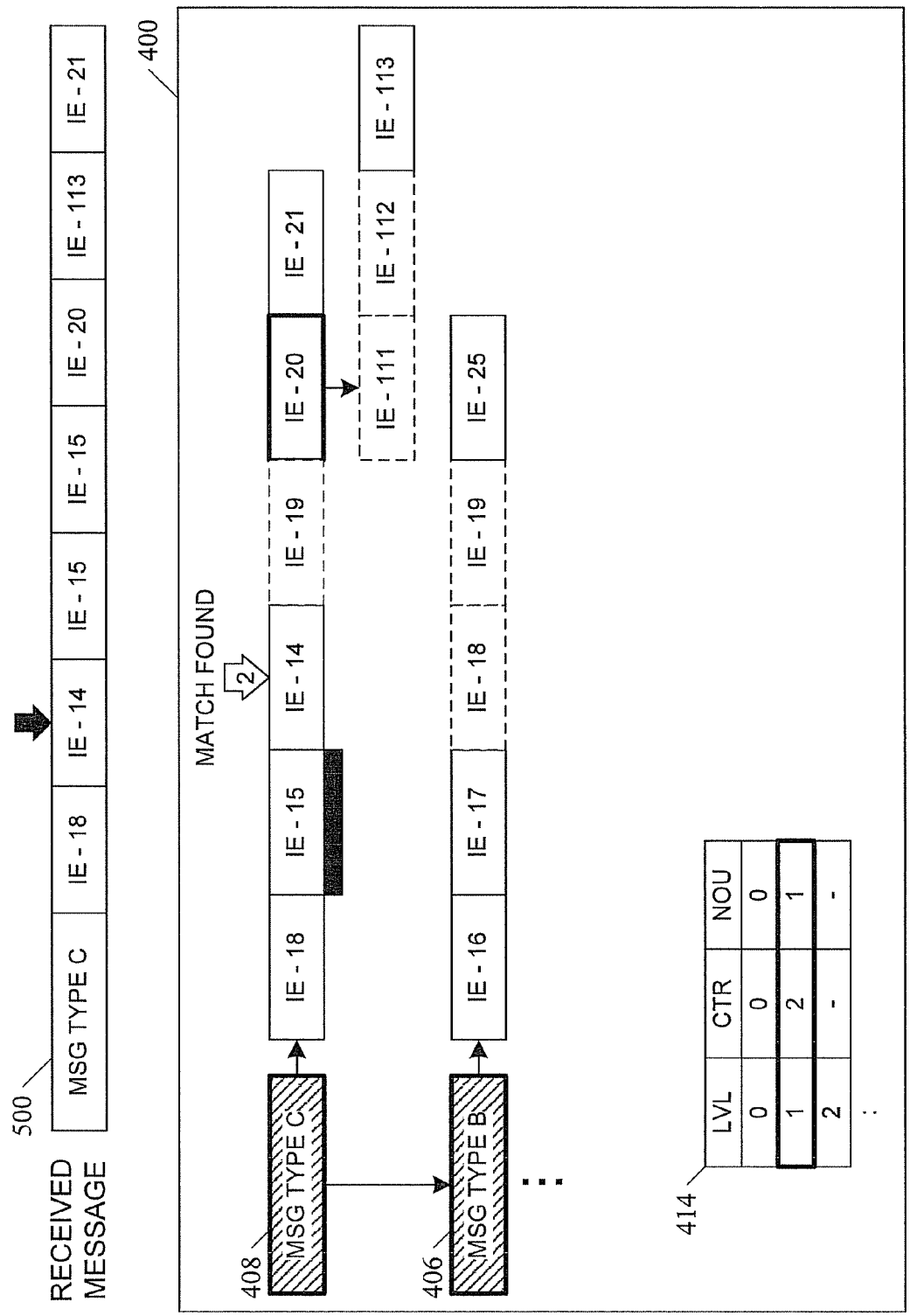
Figure 7D:
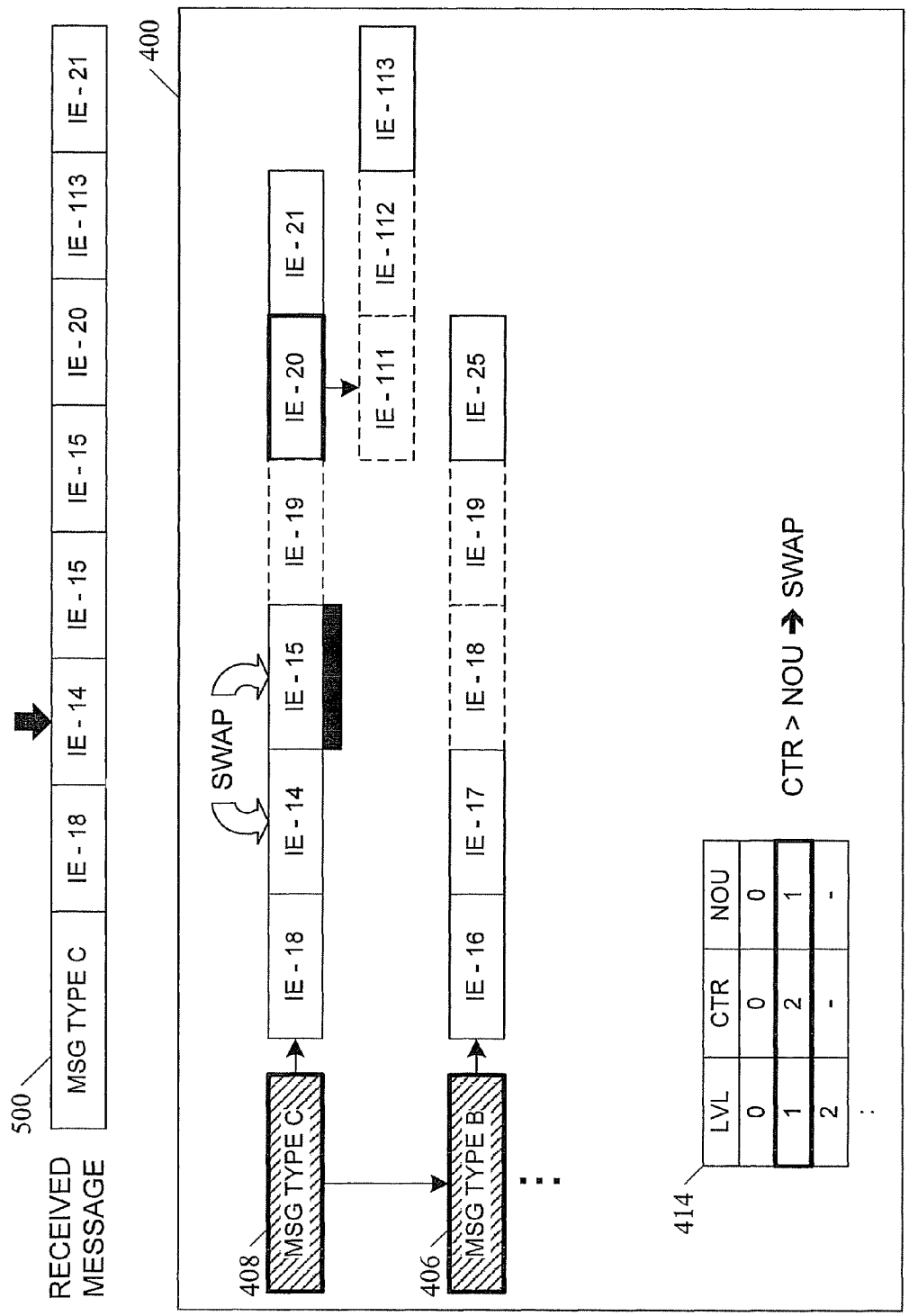
Figure 7E:
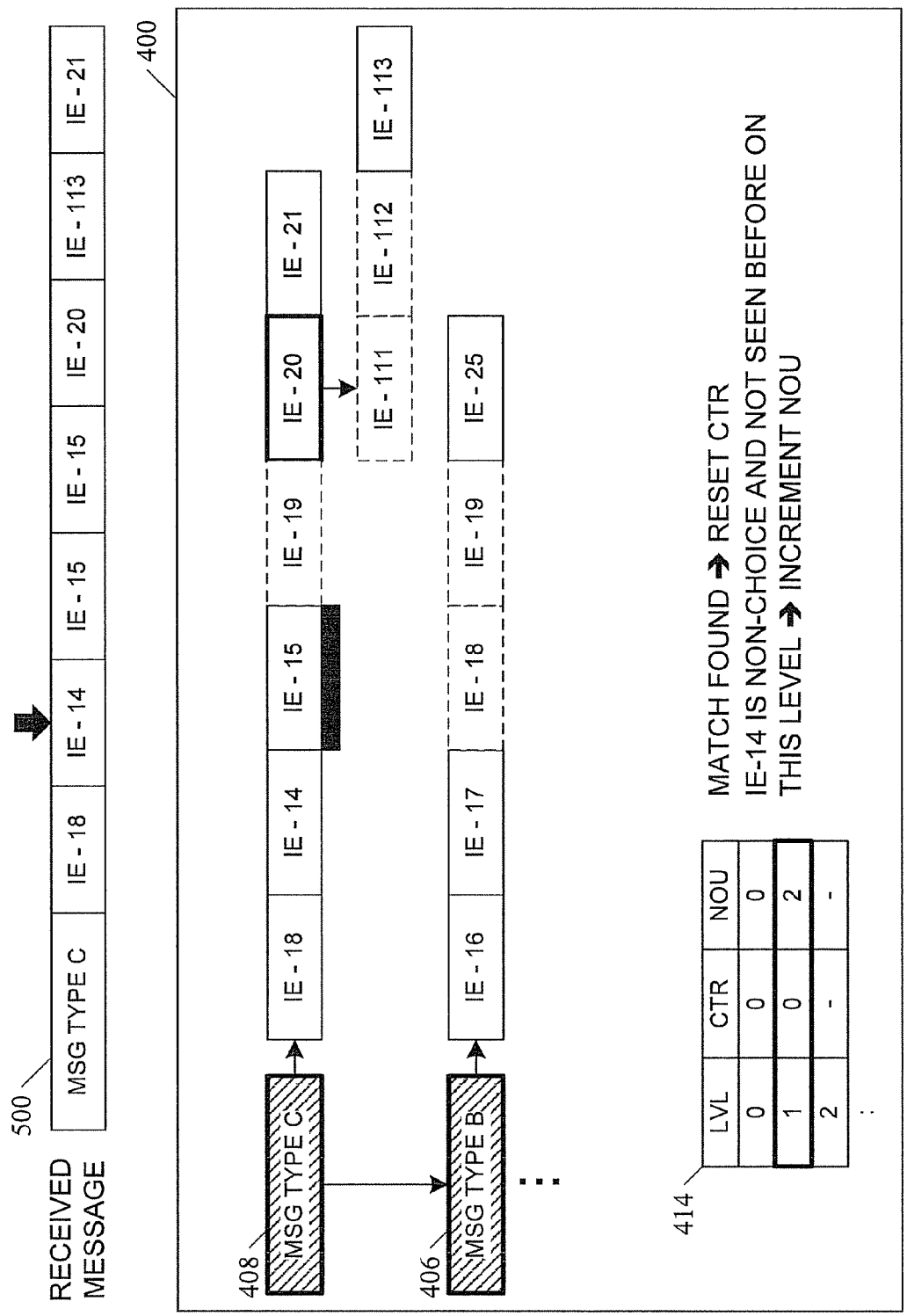

In FIGS. 7A through 7E, protocol tree 400 is searched for the next MSG_IE, "IE-14". FIGS. 7A, 7B, and 7C show the comparison of MSG_IE to PROT_IE nodes IE-18, IE-15, and IE-14, respectively, while the value of CTR for LVL1 is incremented accordingly. In FIG. 7C, PROT_IE matches MSG_IE, and since CTR (2) is greater than NOU (1), in FIG. 7D the IE at position 3 (IE-14) is swapped with the IE at position 2 (IE-15) within protocol tree 400. After the swap occurs, in FIG. 7E the value of CTR for LVL1 is reset. Since IE-14 has not been seen for this level of the parse tree, NOU for LVL1 is incremented to 2. The process then returns to step 302.

Figure 8A:
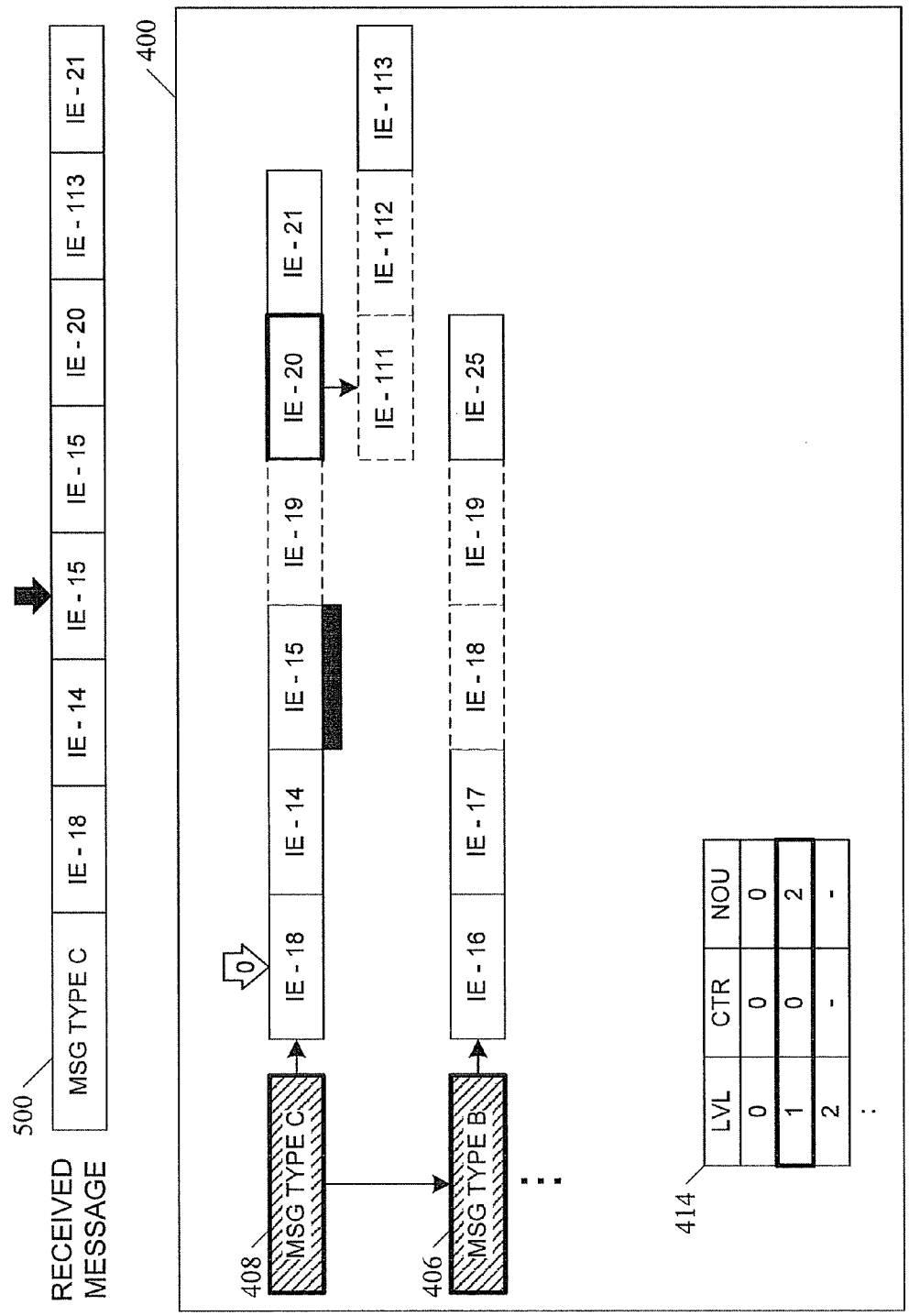
Figure 8B:
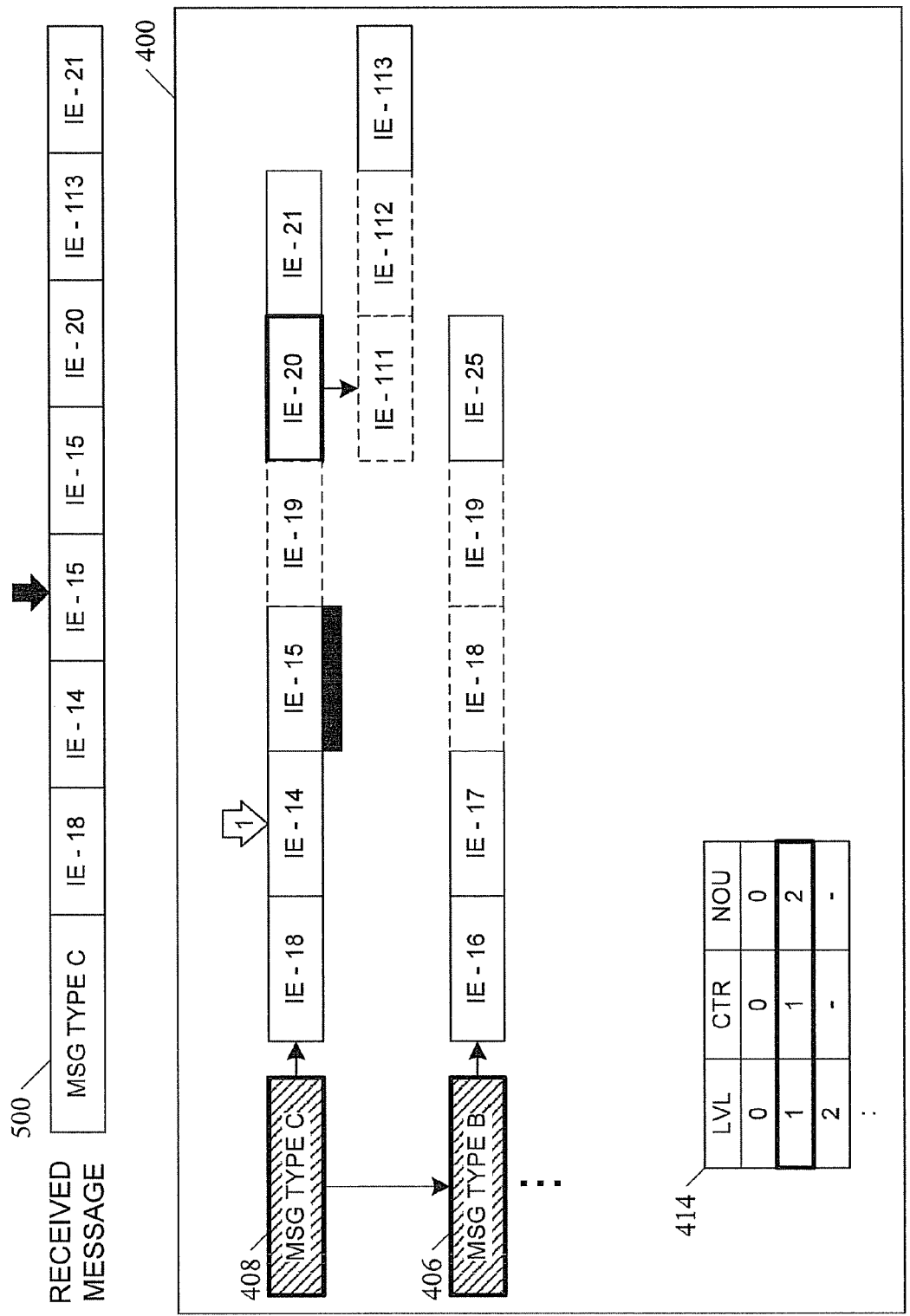
Figure 8C:
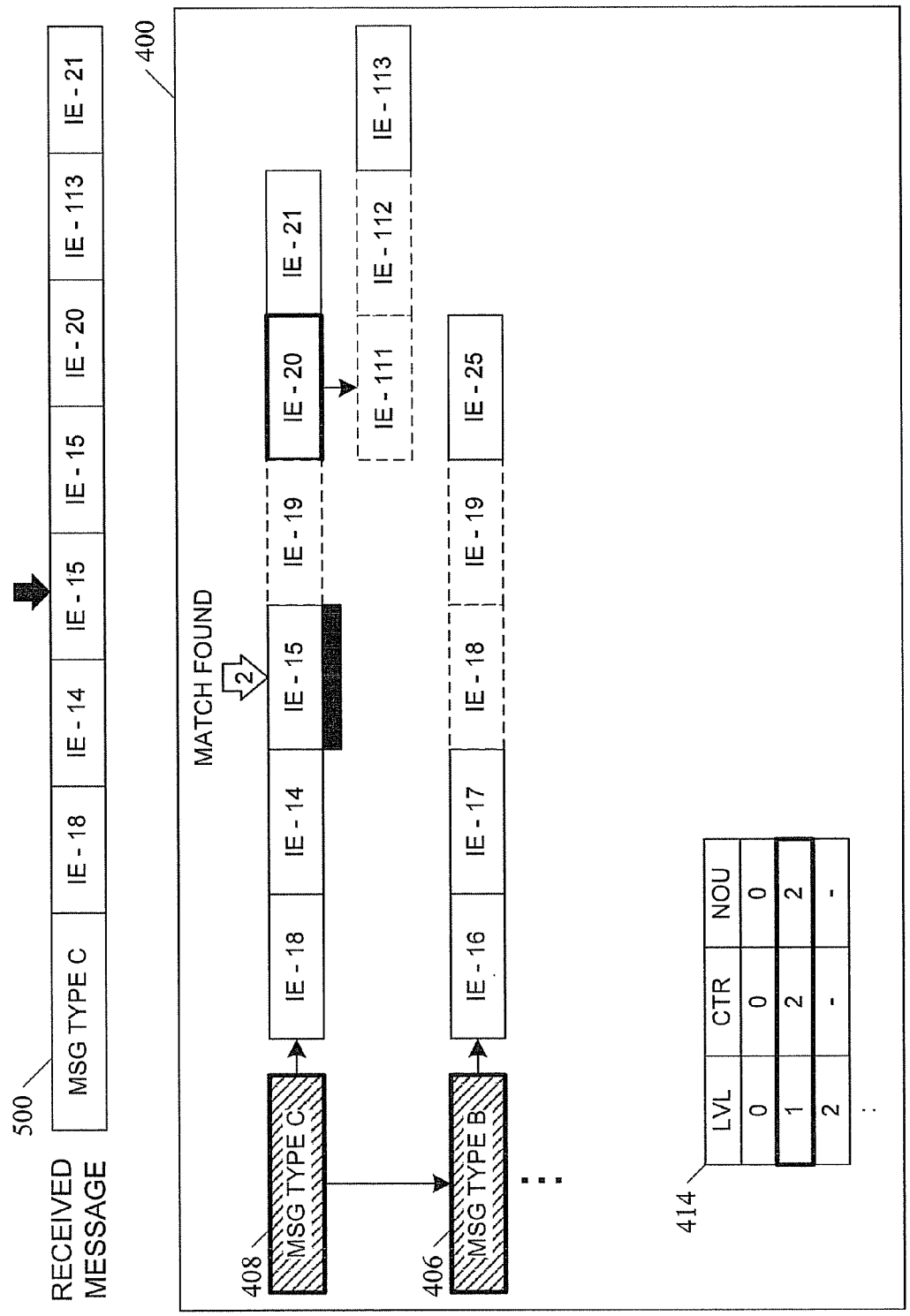
Figure 8D:
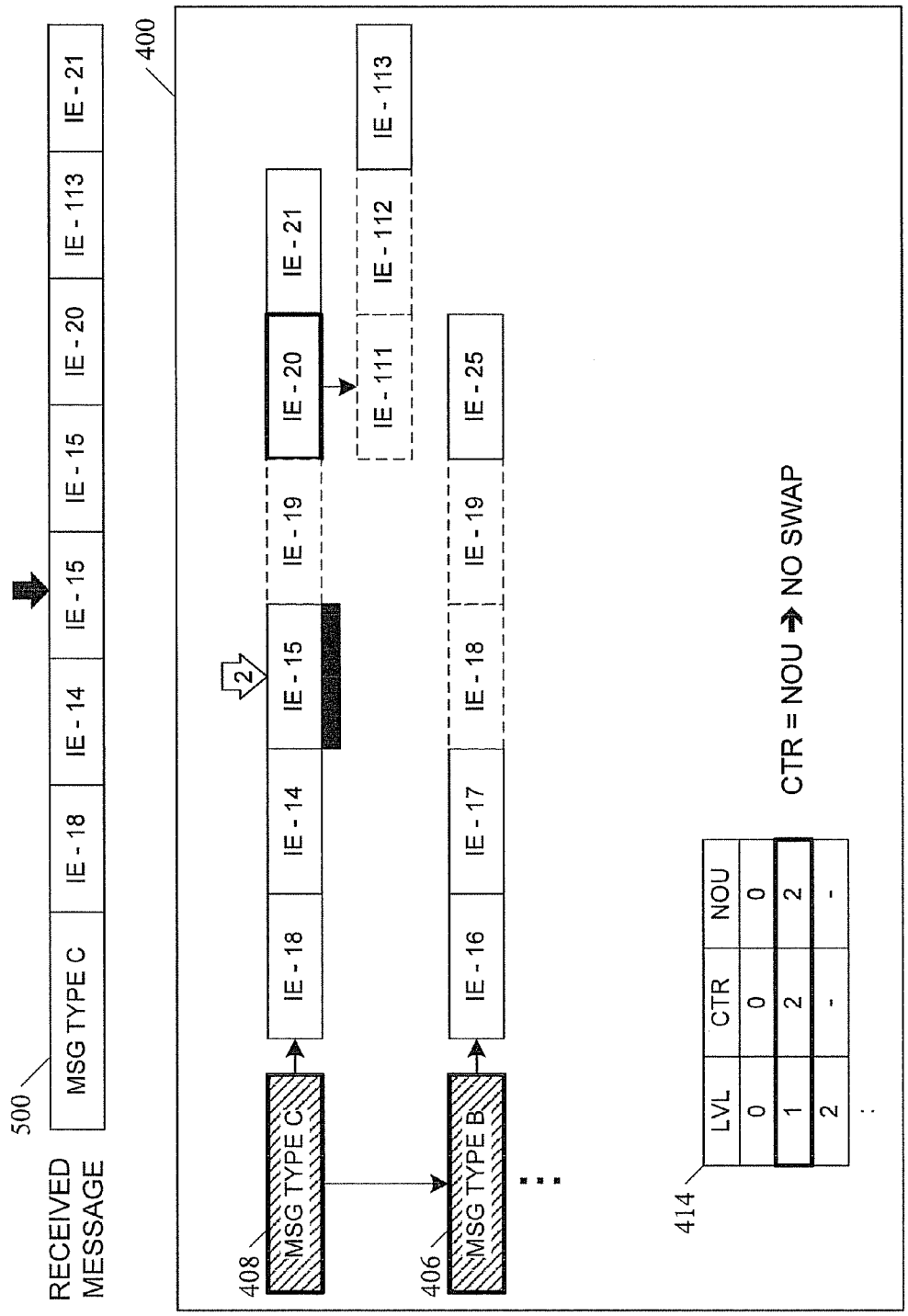
Figure 8E:
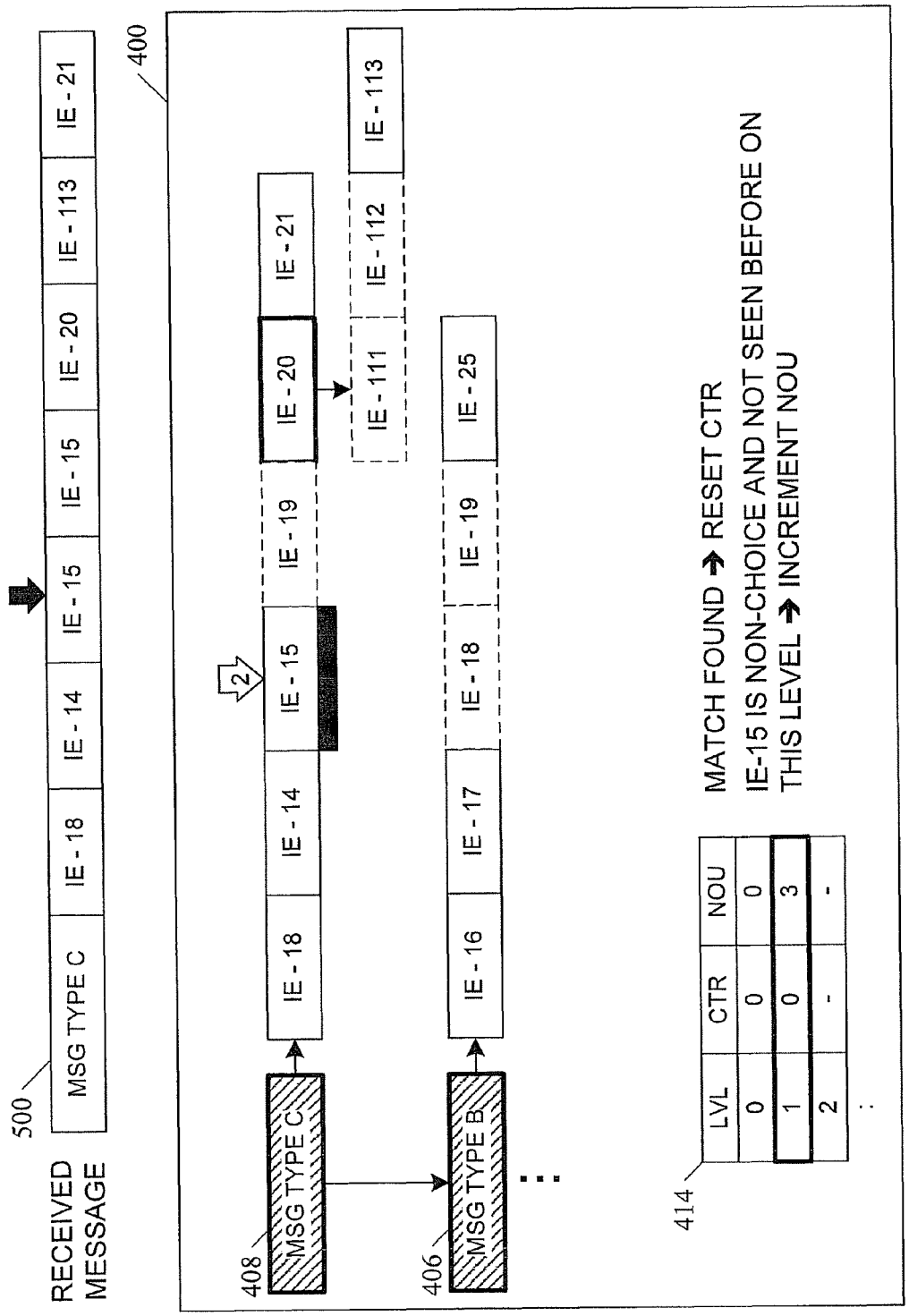

In FIGS. 8A through 8E, protocol tree 400 is searched for the next MSG_IE, "IE-15". FIGS. 8A, 8B, and 8C show the comparison of MSG_IE to PROT_IE nodes IE-18, IE-14, and IE-15, respectively, while the value of CTR for LVL1 is incremented accordingly. In FIG. 8C, PROT_IE matches MSG_IE. In FIG. 8D, however, since CTR is not greater than NOU, however, no swap occurs. The process then checks to see if the matched IE (IE-15) is unique for that level. In one embodiment, MSG_IE is unique if CTR is equal to NOU. Here, IE-15 has not been seen before for this level of the parse tree, so in FIG. 8E, NOU is incremented. Since a match was found, the value for CTR at LVL1 is reset. The process then returns to step 302.

Figure 9A:
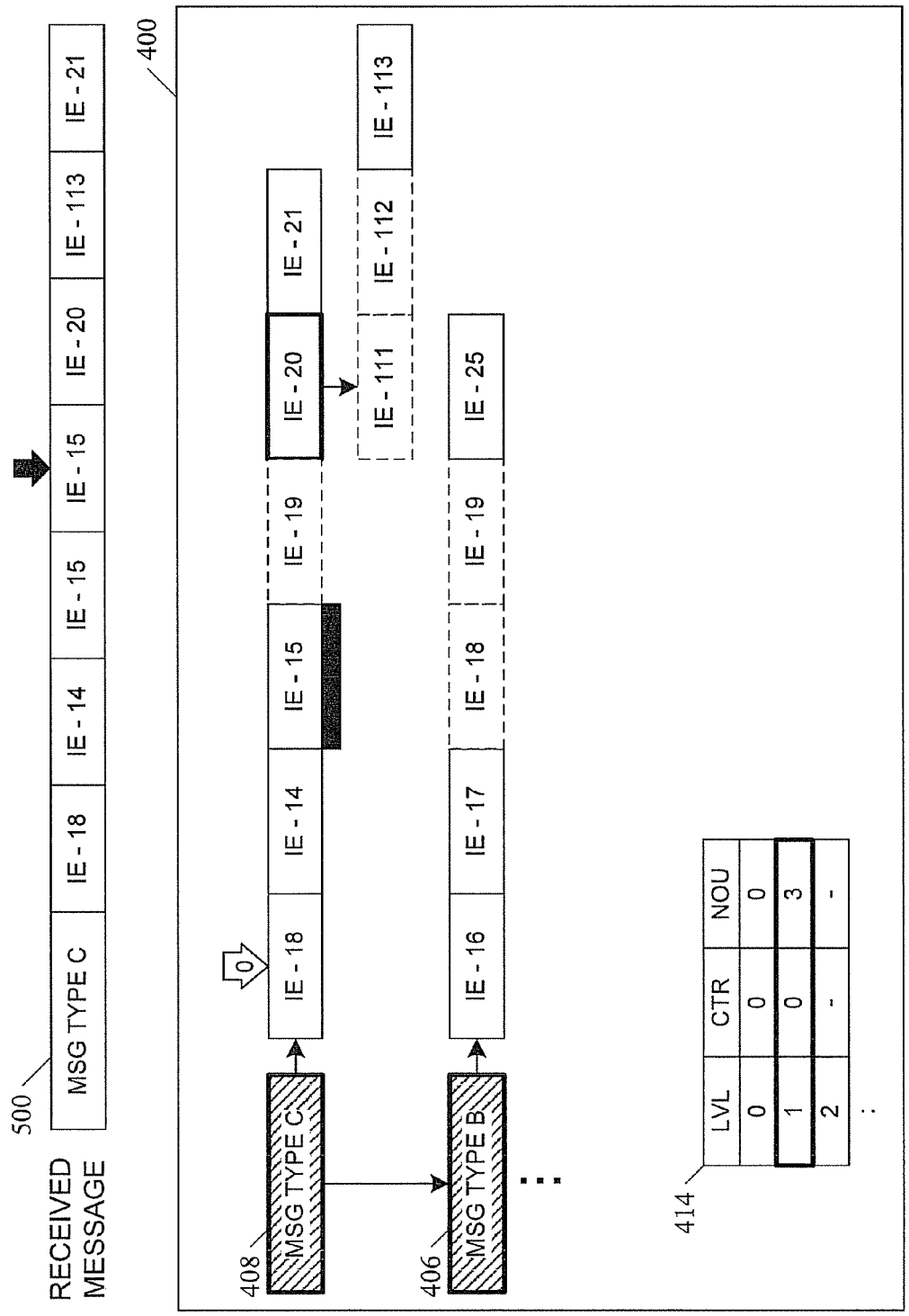
Figure 9B:
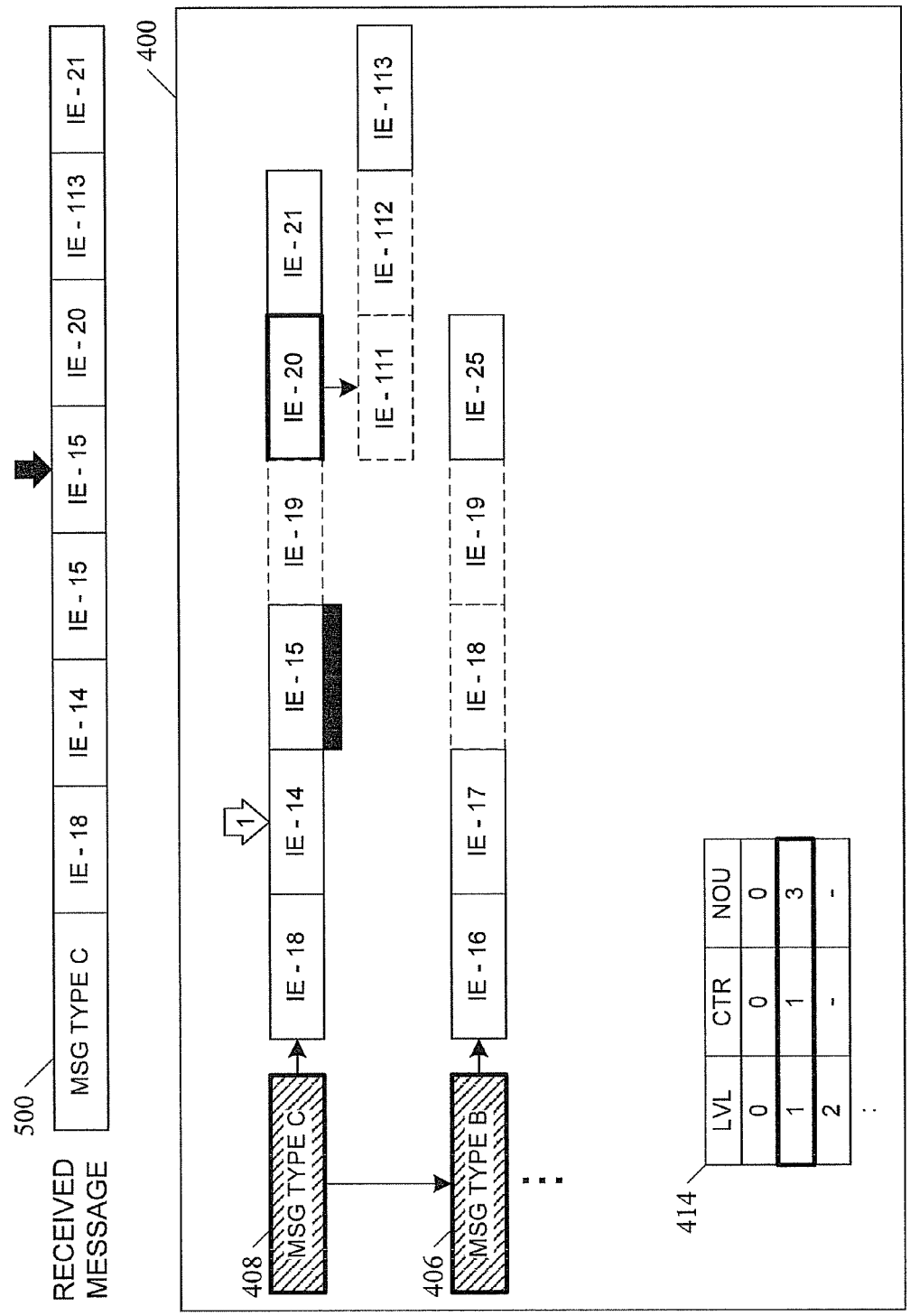
Figure 9C:
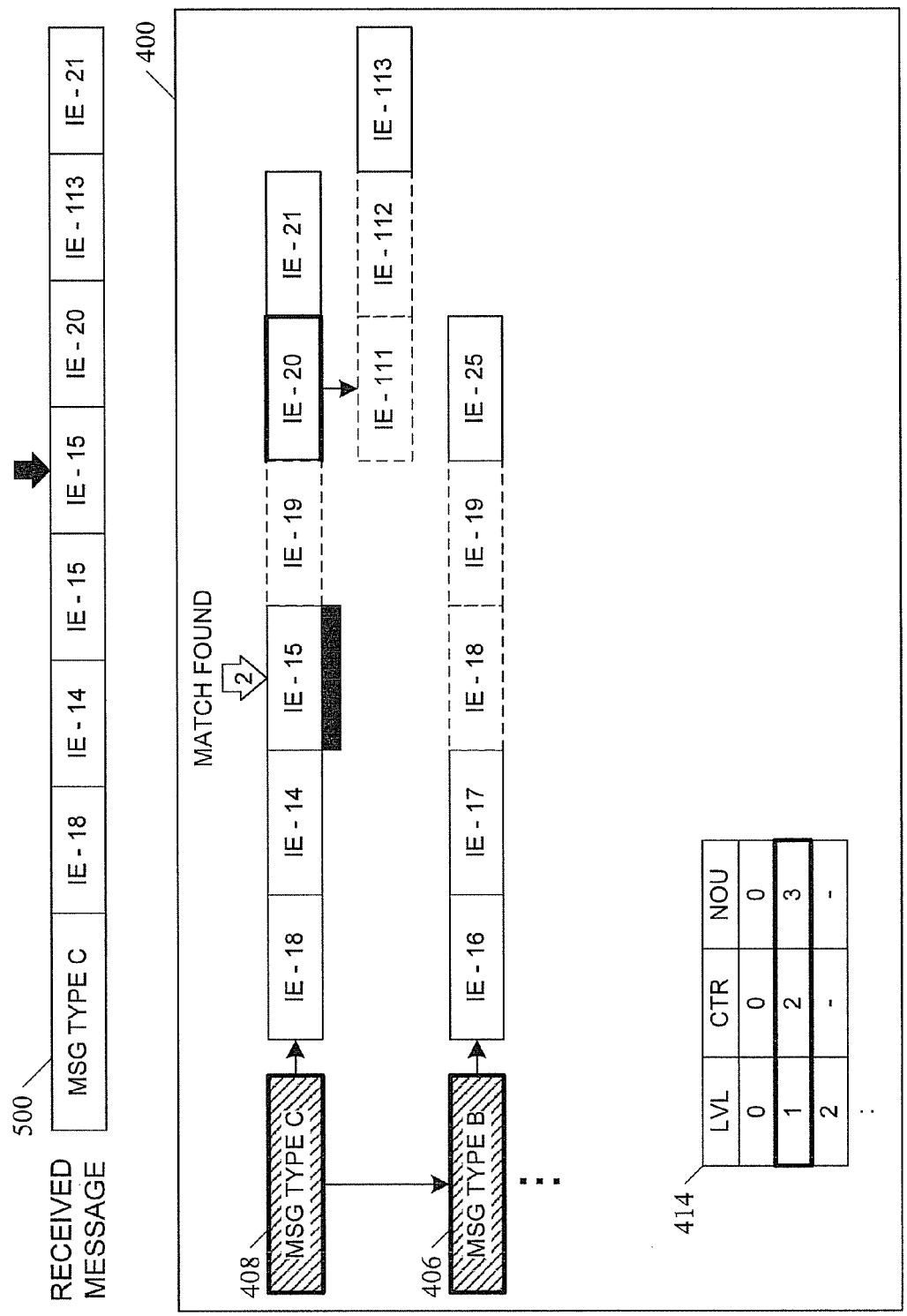
Figure 9D:
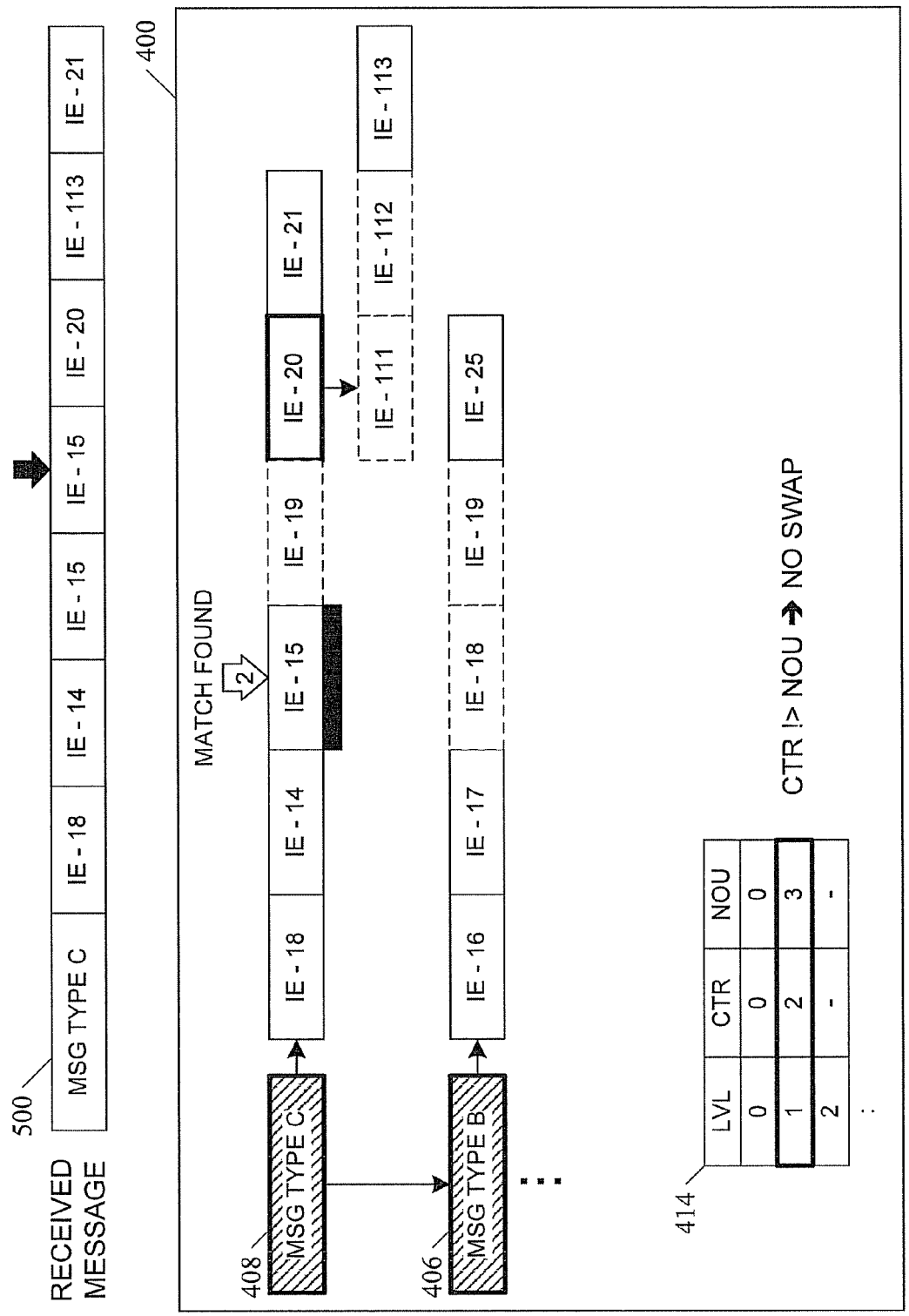
Figure 9E:
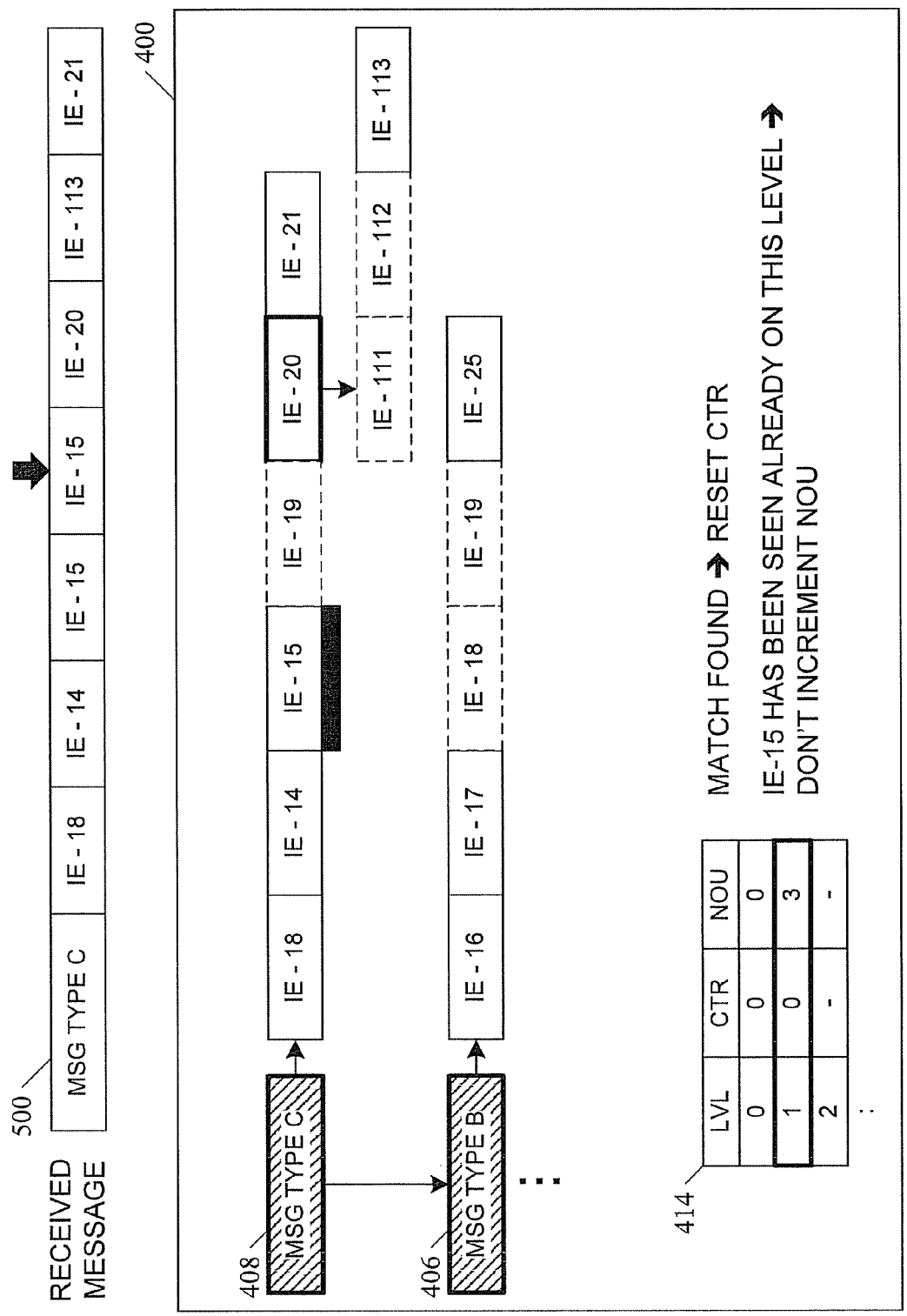

In FIGS. 9A through 9E, protocol tree 400 is searched for the next MSG_IE, IE-15, which in this example happens to be the same as the previous MSG_IE. As can be seen by protocol tree 400, IE-15 is allowed to repeat. FIGS. 9A, 9B, and 9C compare MSG_IE to PROT_IE nodes IE-18, IE-14, and IE-15, respectively, while the value of CTR for LVL1 is incremented accordingly. In FIG. 9C MSG_IE matches PROT_IE. In FIG. 9D, however, CTR (3) is less than NOU (4), and therefore no swap occurs. At step 326, it is determined that MSG_IE is not unique and therefore, in FIG. 9E, NOU for LVL1 is not incremented although CTR for LVL1 is reset because a match was found.

Figure 10A:
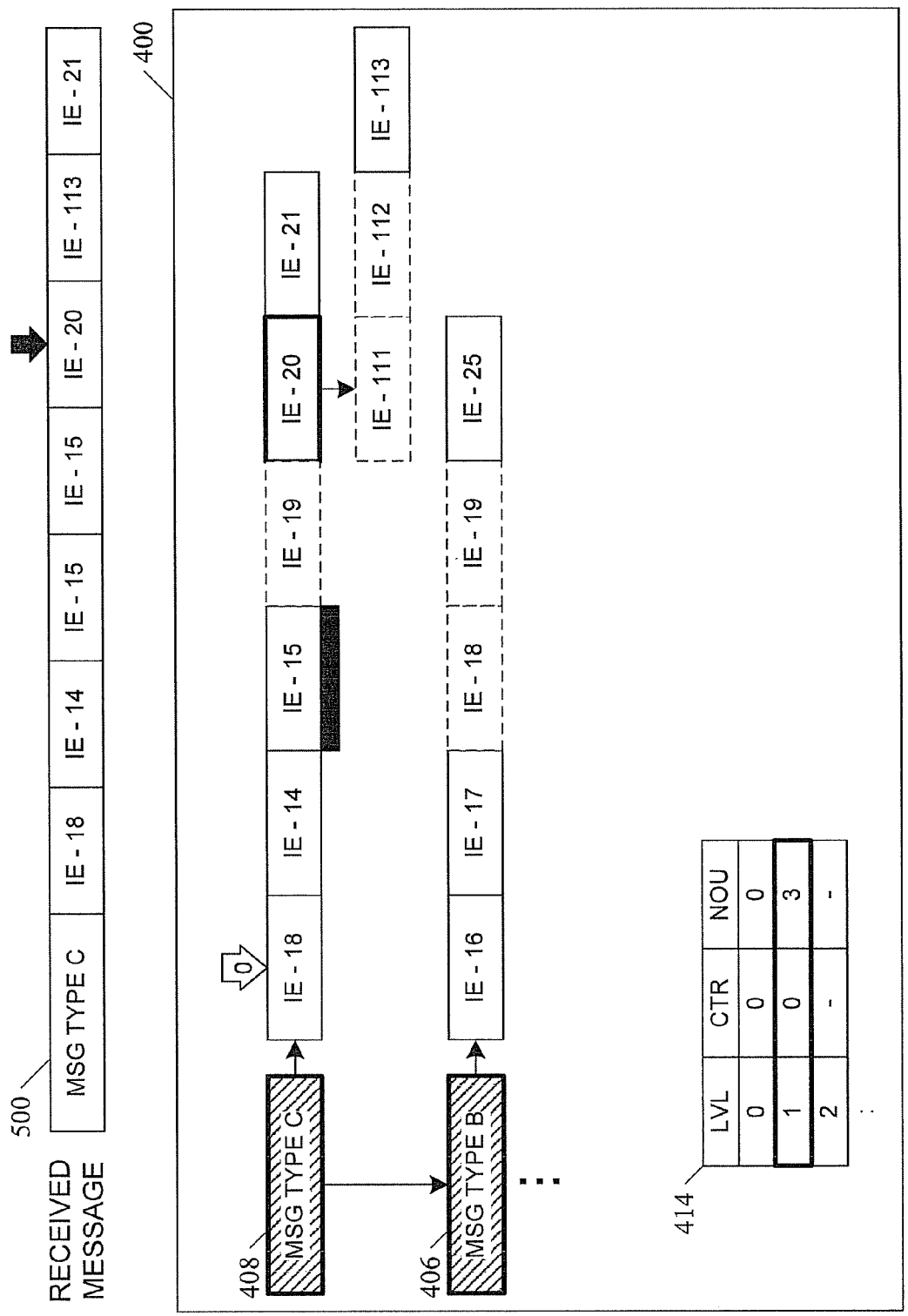
Figure 10B:
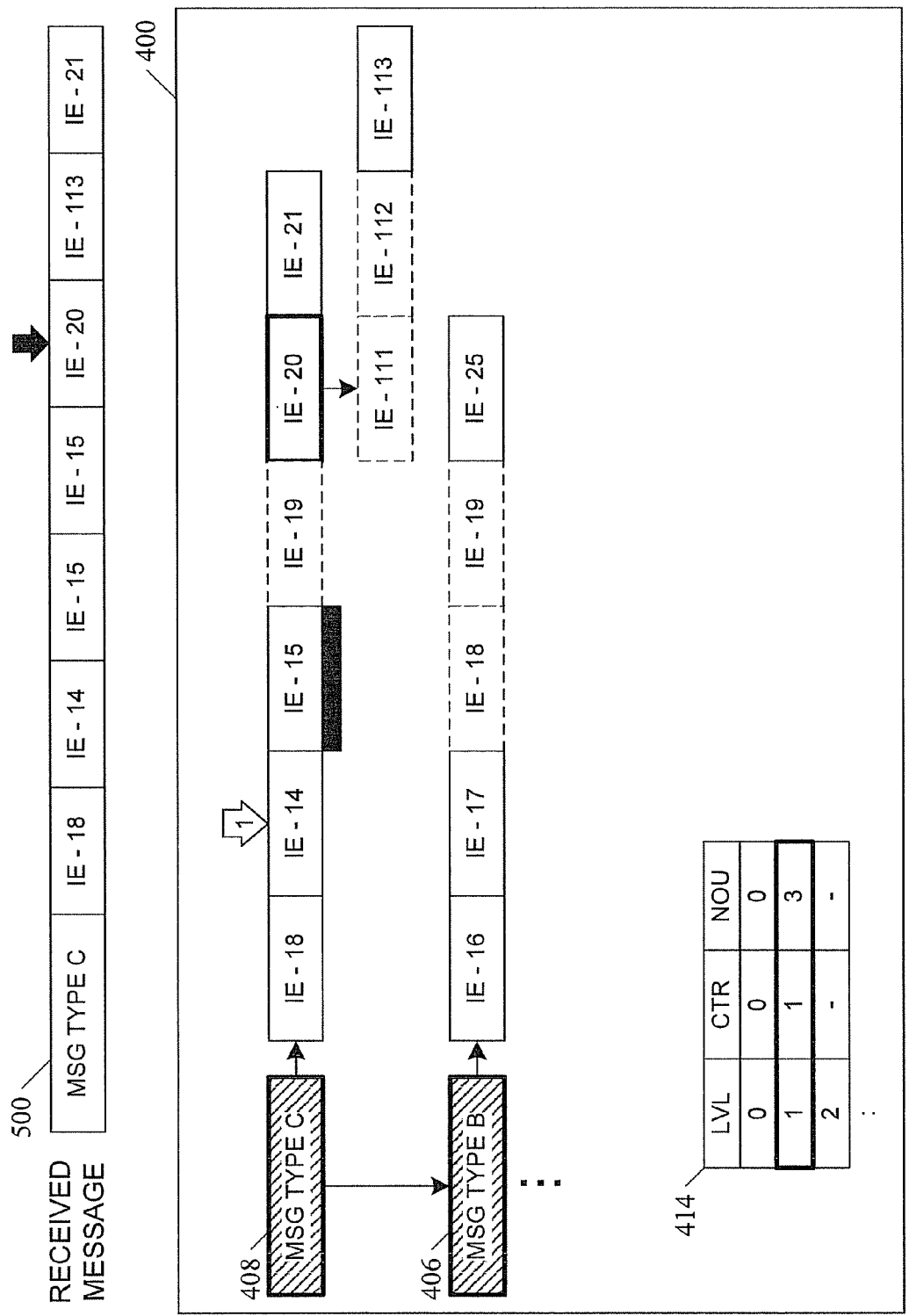
Figure 10C:
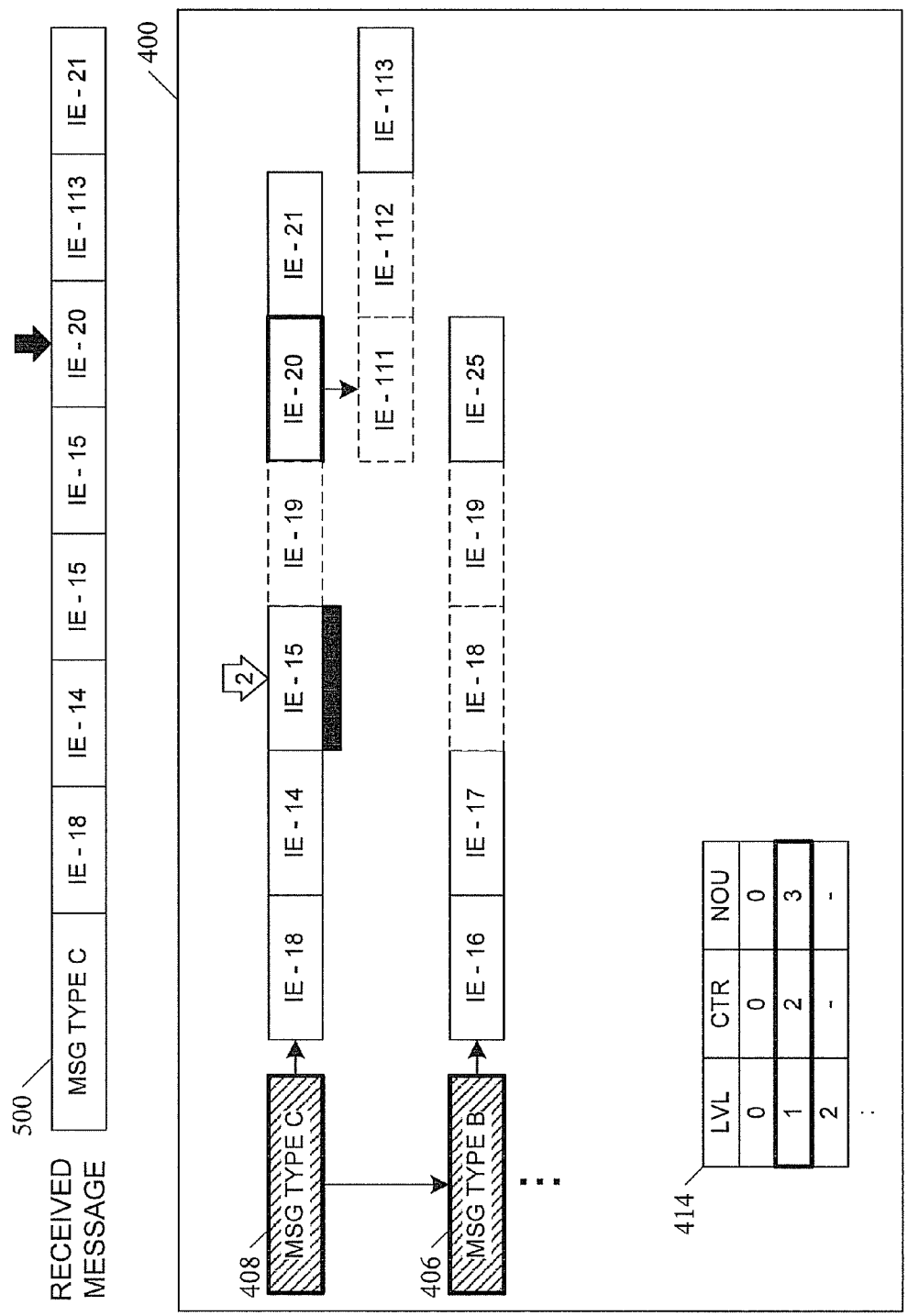
Figure 10D:
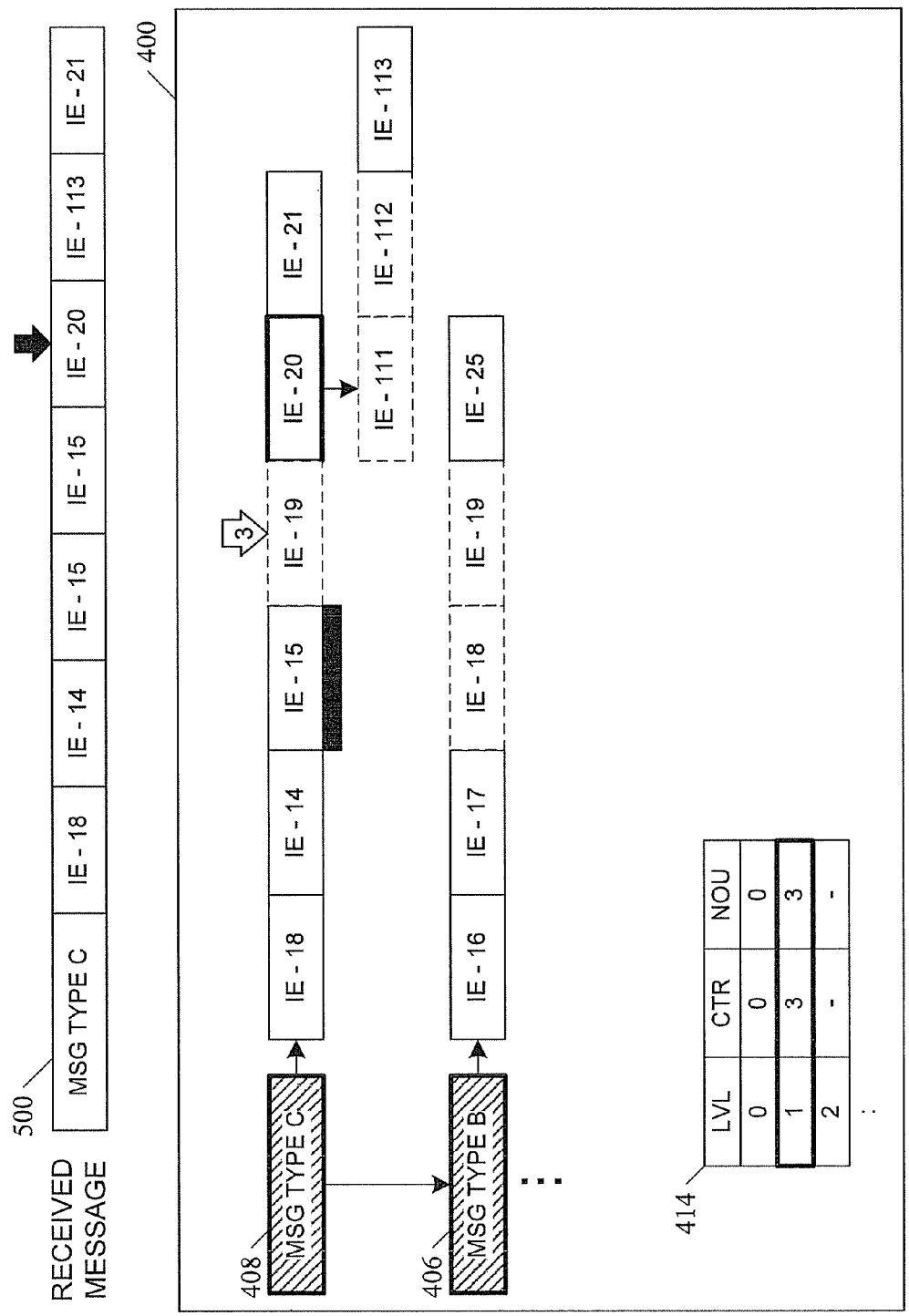
Figure 10E:
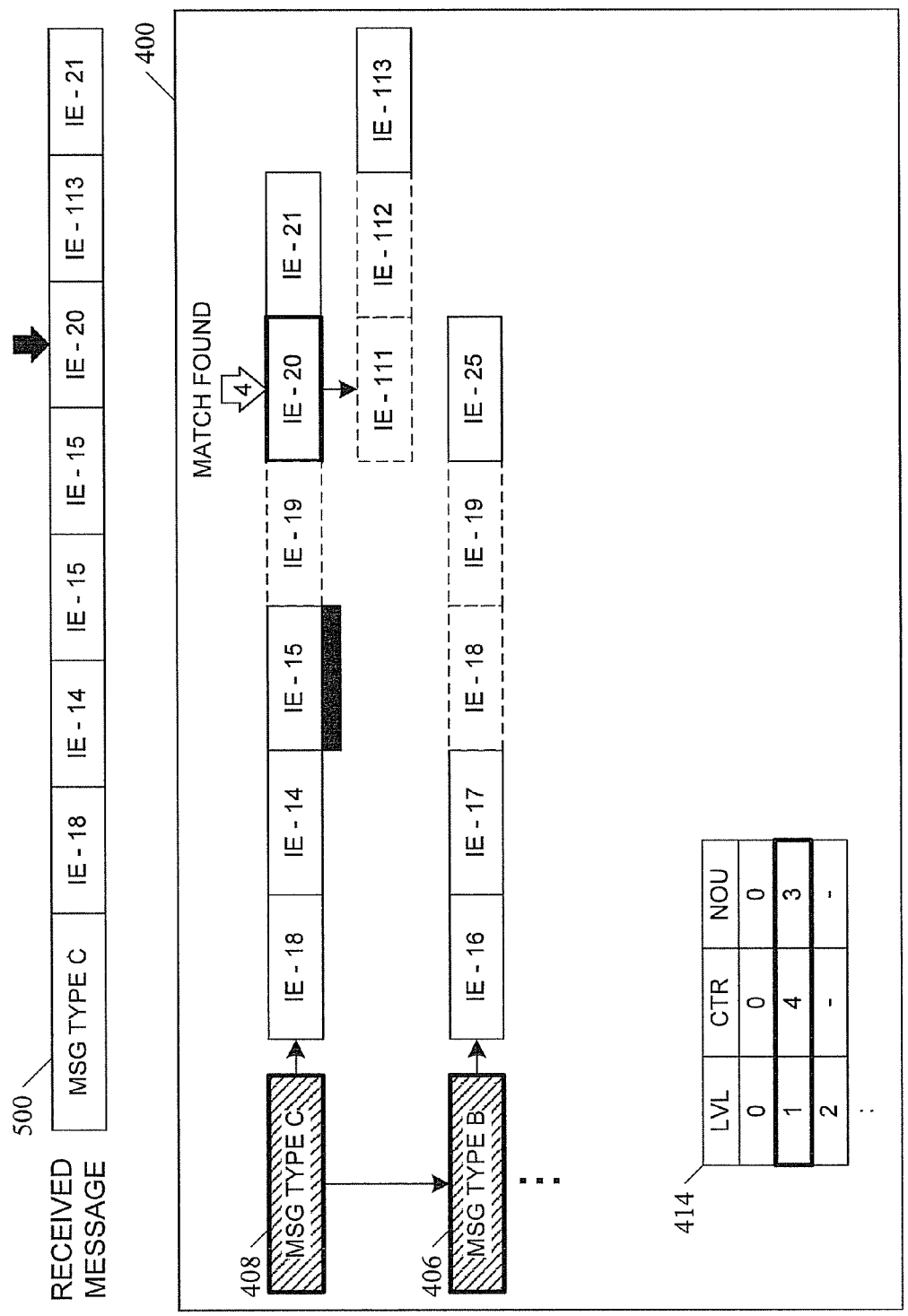
Figure 10F:
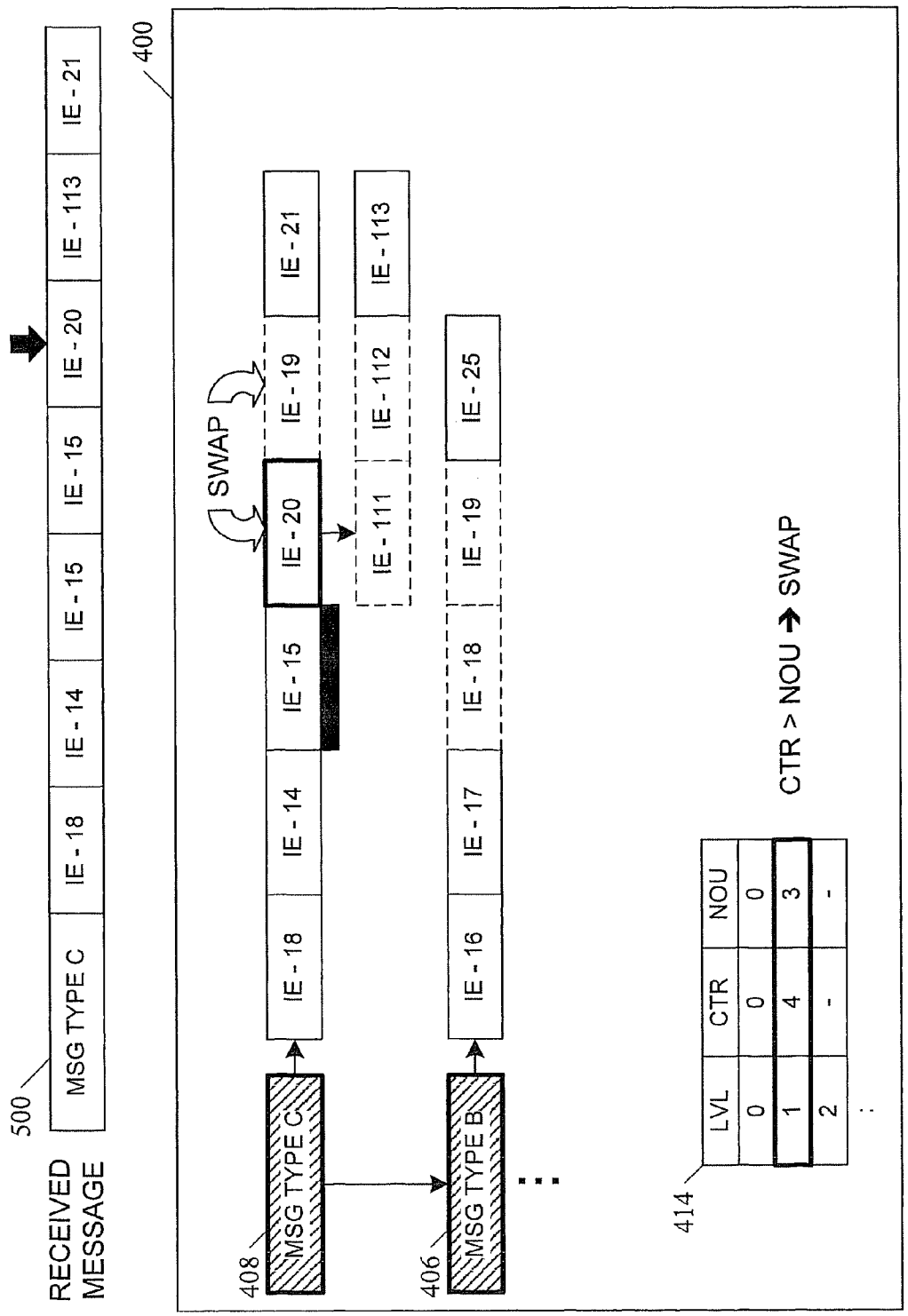
Figure 10G:
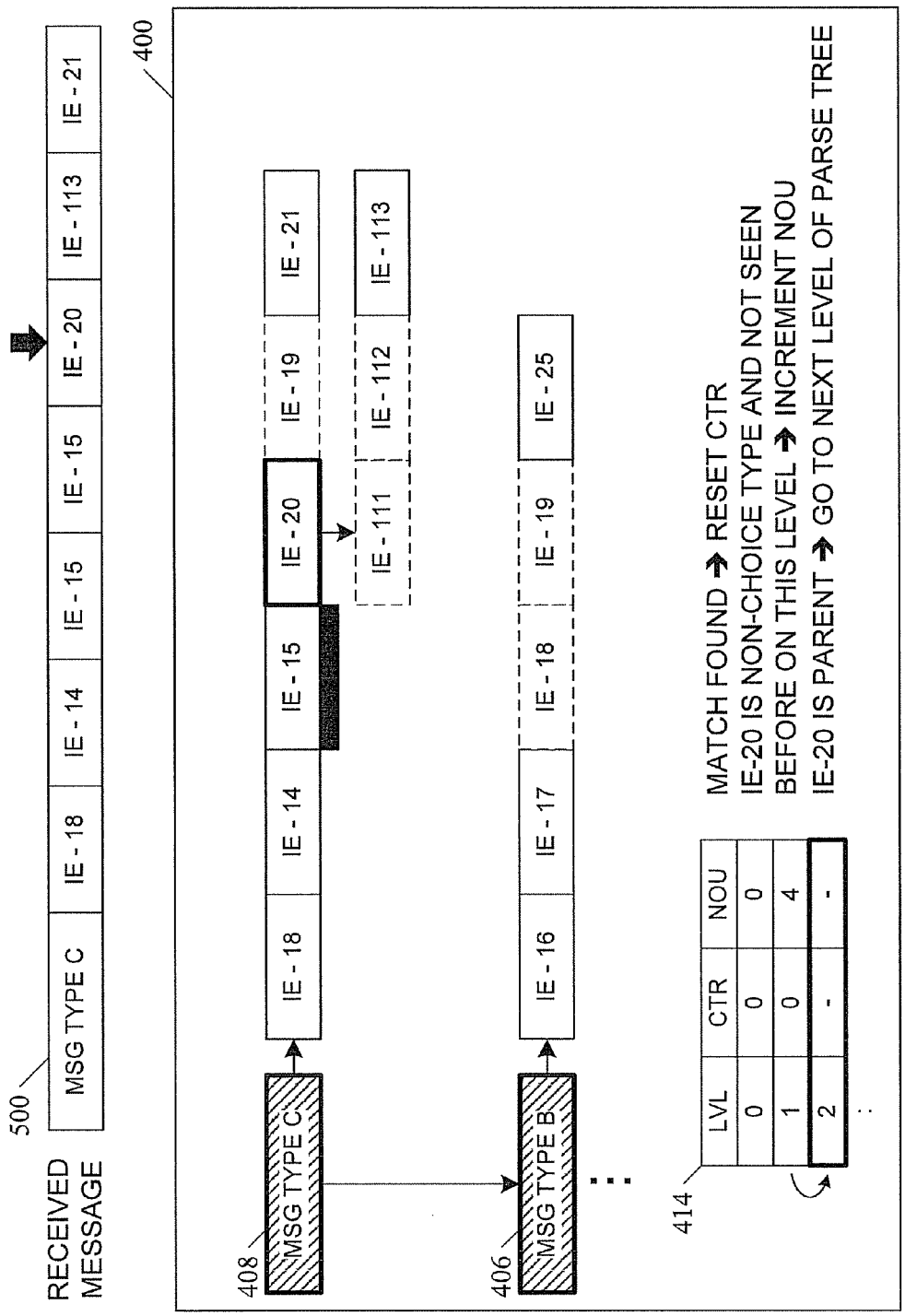

In FIGS. 10A through 10G, protocol tree 400 is searched for the next MSG_IE, "IE-20". FIGS. 10A, 10B, 100, 10D, and 10E show the comparison of MSG_IE to PROT_IE nodes IE-18, IE-14, IE-15, IE-19, and IE-20, respectively, while the value of CTR for LVL1 is incremented accordingly. In FIG. 10E MSG_IE matches PROT_IE. In FIG. 10F, the value of CTR (4) is greater than the value of NOU (3), and therefore IE-20 and IE-19 swap places within protocol tree 400. Note that not only is IE-20 moved, but its sub-tree is moved along with it. In FIG. 10O, the value of CTR for LVL1 is reset and the value of NOU for LVL1 is incremented to 4, but because IE-20 is a parent node, the current values of CTR and NOU for LVL1 are pushed onto the stack or otherwise stored, and the current level changes to LVL2, as indicated by the thick border around that row of table 414.

Figure 11A:
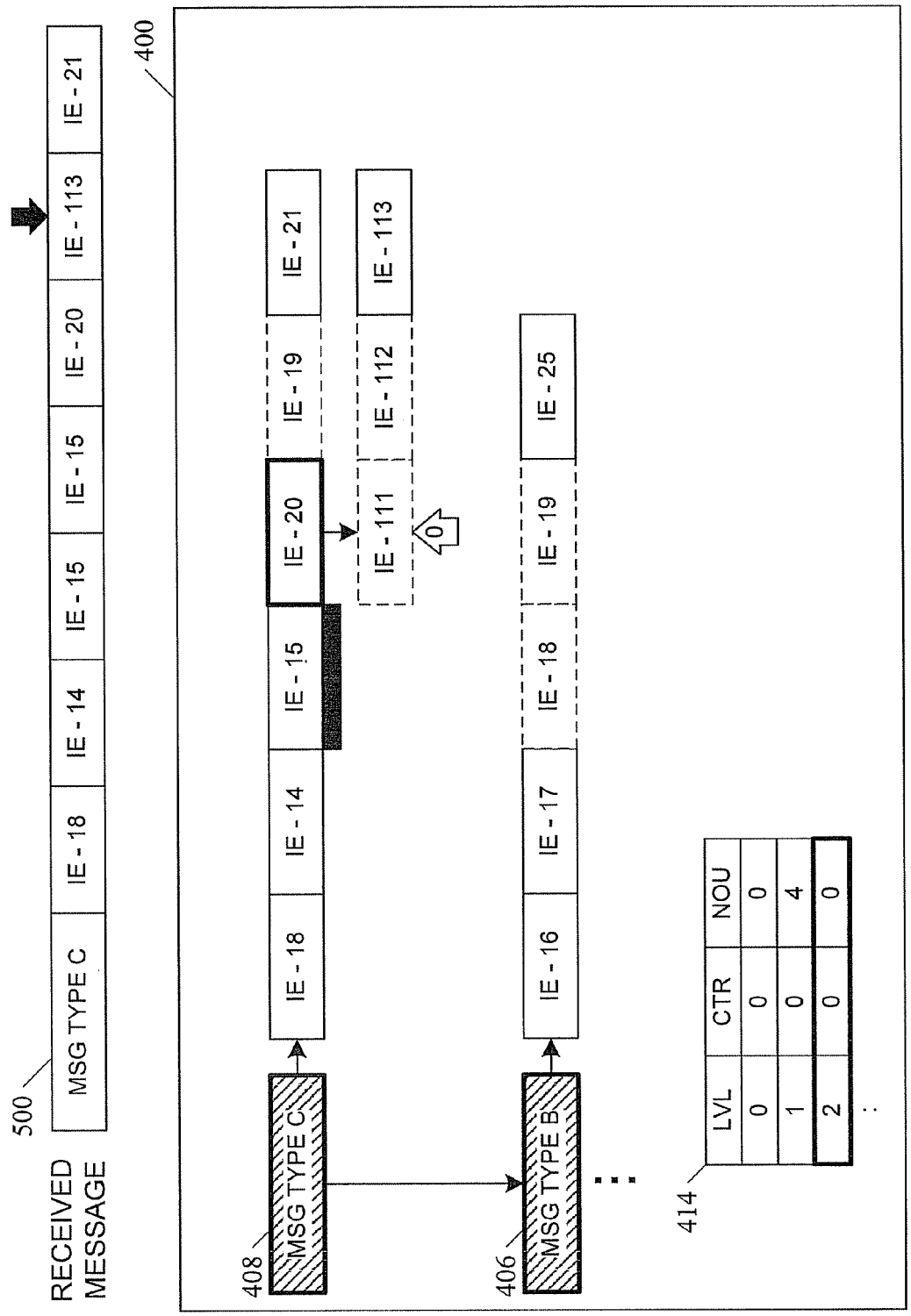
Figure 11B:
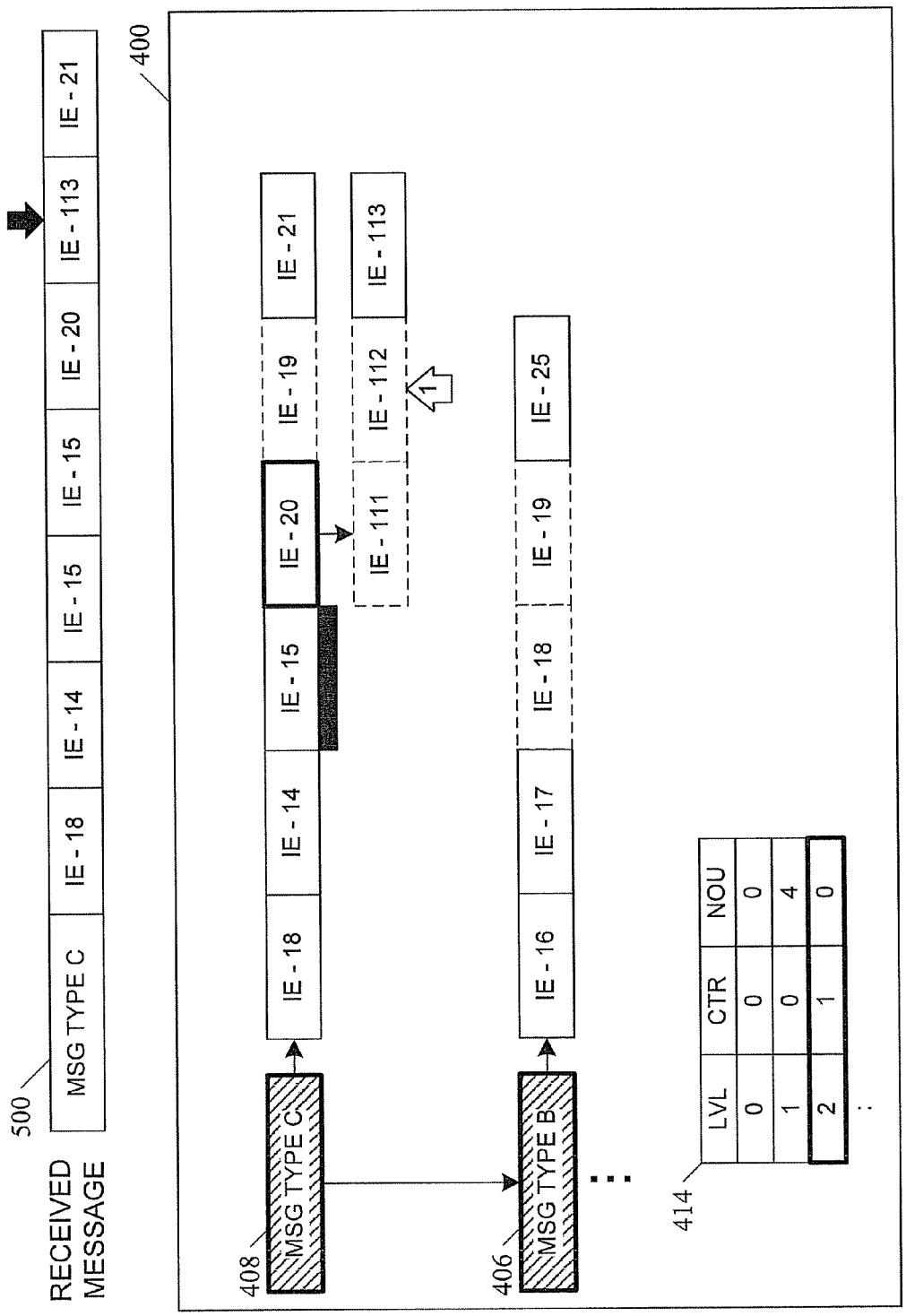

In FIG. 11A through 11G, protocol tree 400 is searched for the next MSG_IE, "IE-113". As can be seen in FIG. 11A, the value of CTR for LVL2 is set to zero, and this points to the first IE in the list of IEs for that level of protocol tree 400, which is IE-111. NOU for this level is also zero.

Figure 11C:
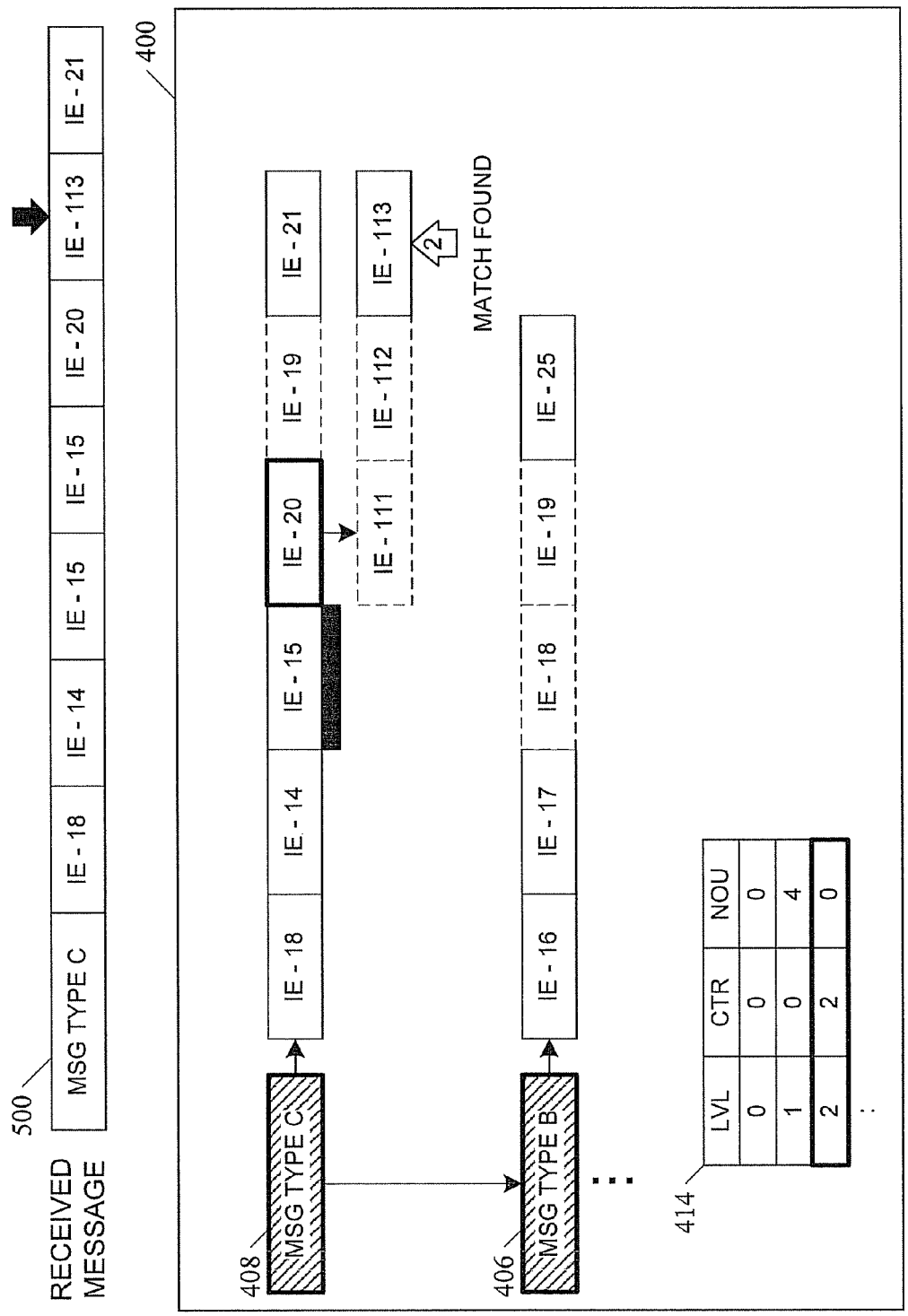
Figure 11D:
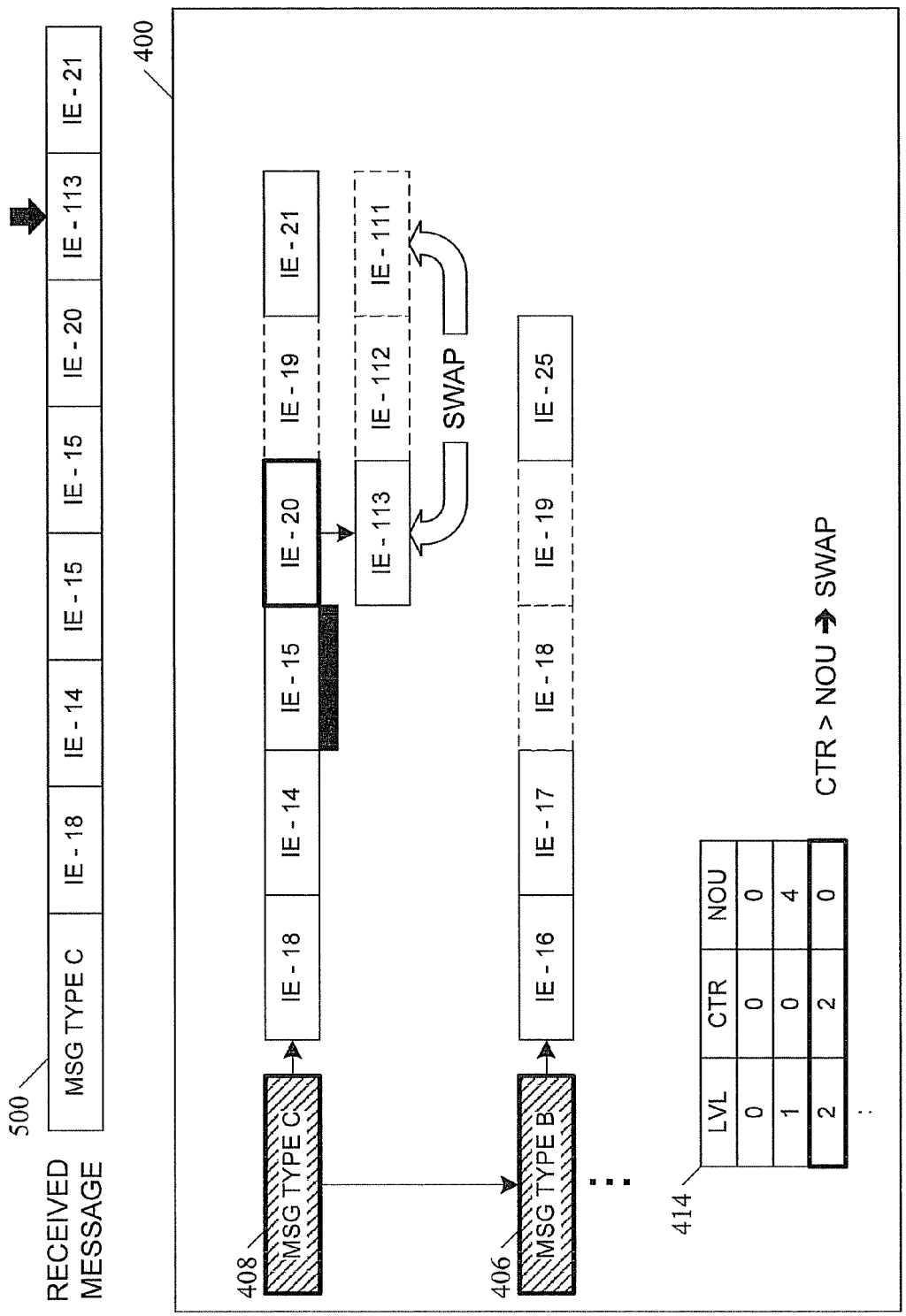
Figure 11E:
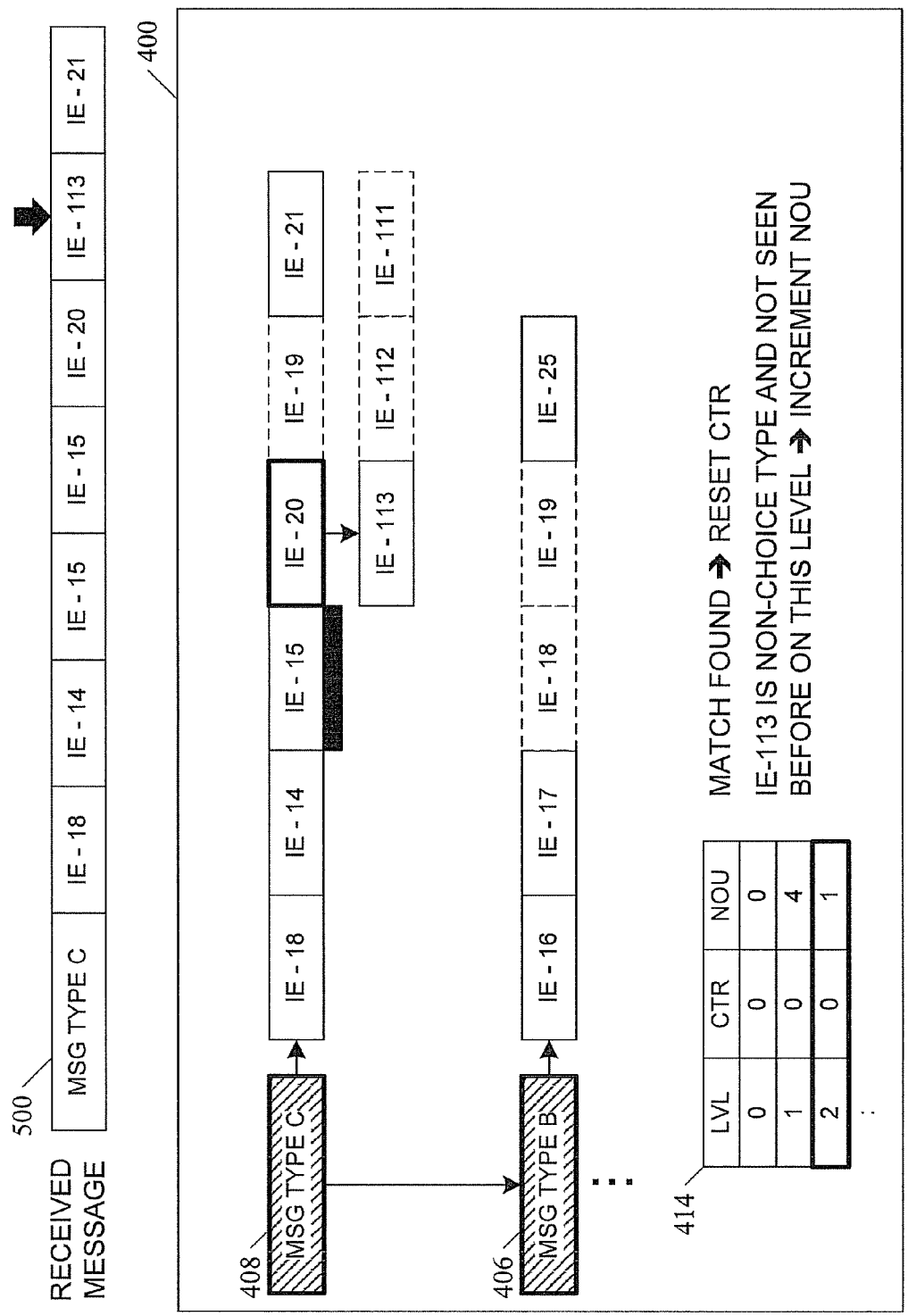

FIGS. 11A, 11B, 11C, 11D, 11E, 11F, and 11G show the comparison of MSG_IE to PROT_IE nodes IE-111, IE-112, and IE-113, respectively, while the value of CTR for LVL2 is incremented accordingly. In FIG. 11C MSG_IE matches PROT_IE. The value of CTR for LVL2(2) is greater than the value of NOU for LVL2(0), therefore in FIG. 11D IE-113 and IE-111 swap places at that level of protocol tree 400. In FIG. 11E, because a match was found the value of CTR for LVL2 is reset, and because the matched IE is a non-choice type and unique for this level, the value of NOU for LVL2 is incremented to 1.

Figure 12A:
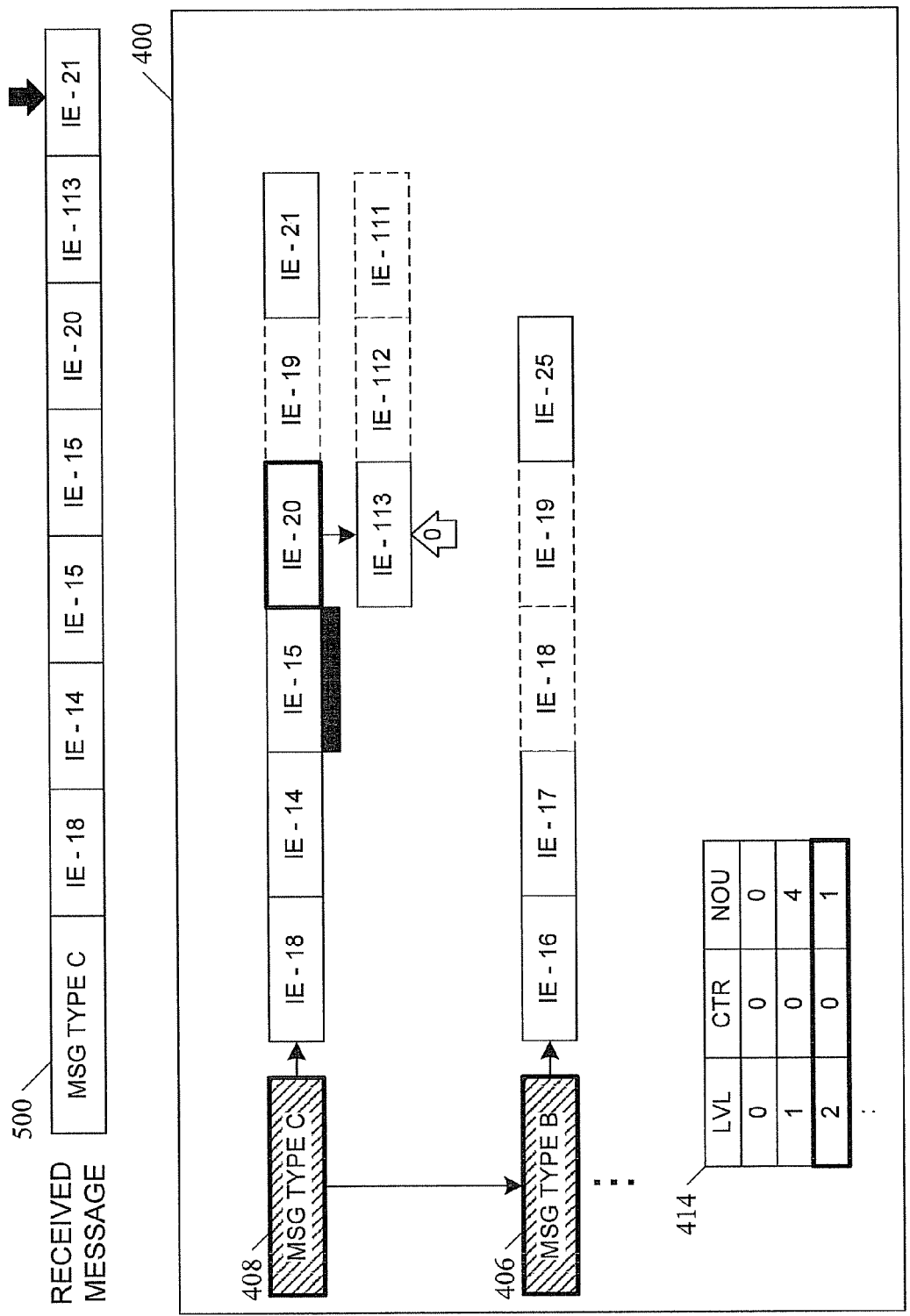
Figure 12B:
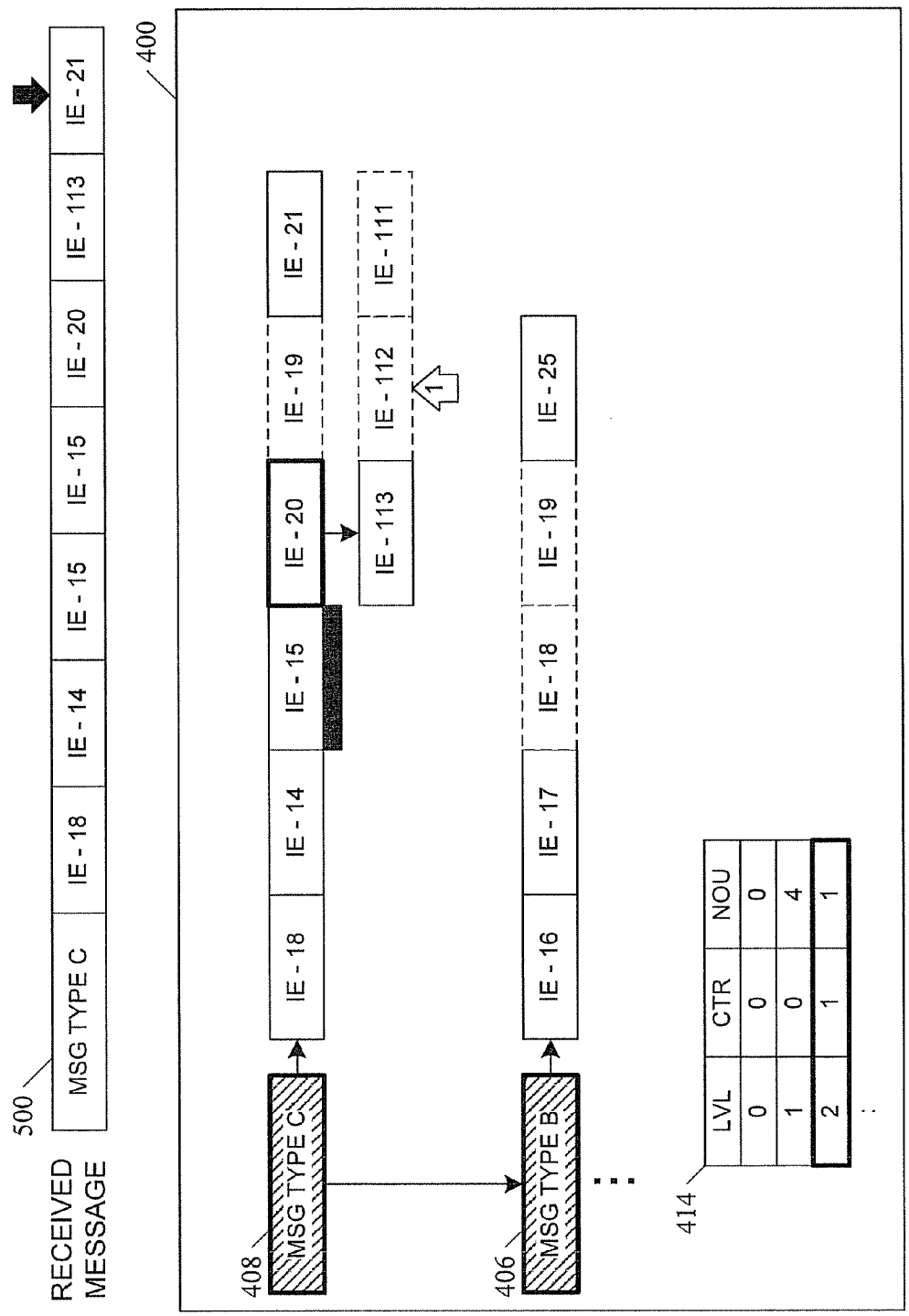
Figure 12C:
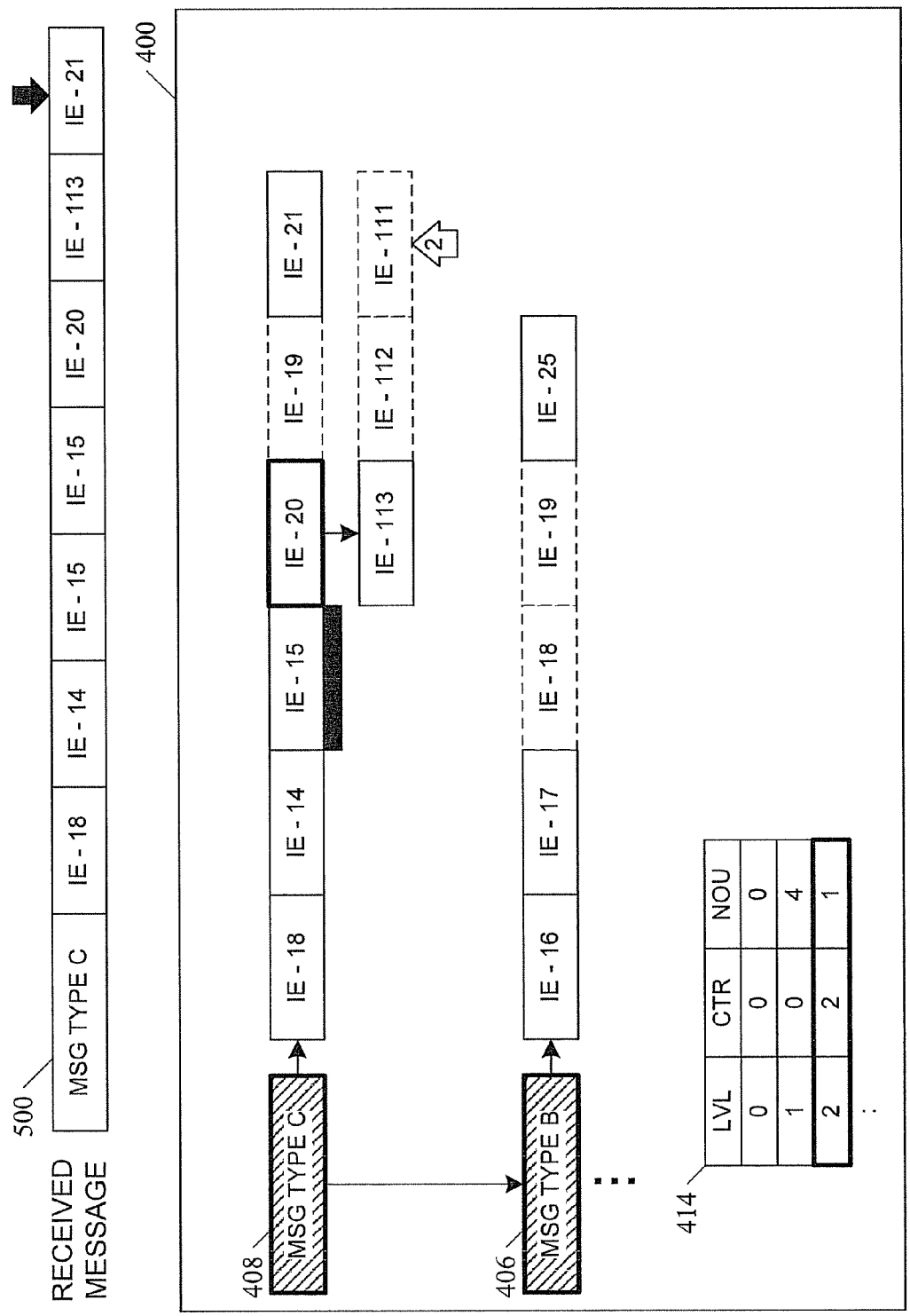
Figure 12D:
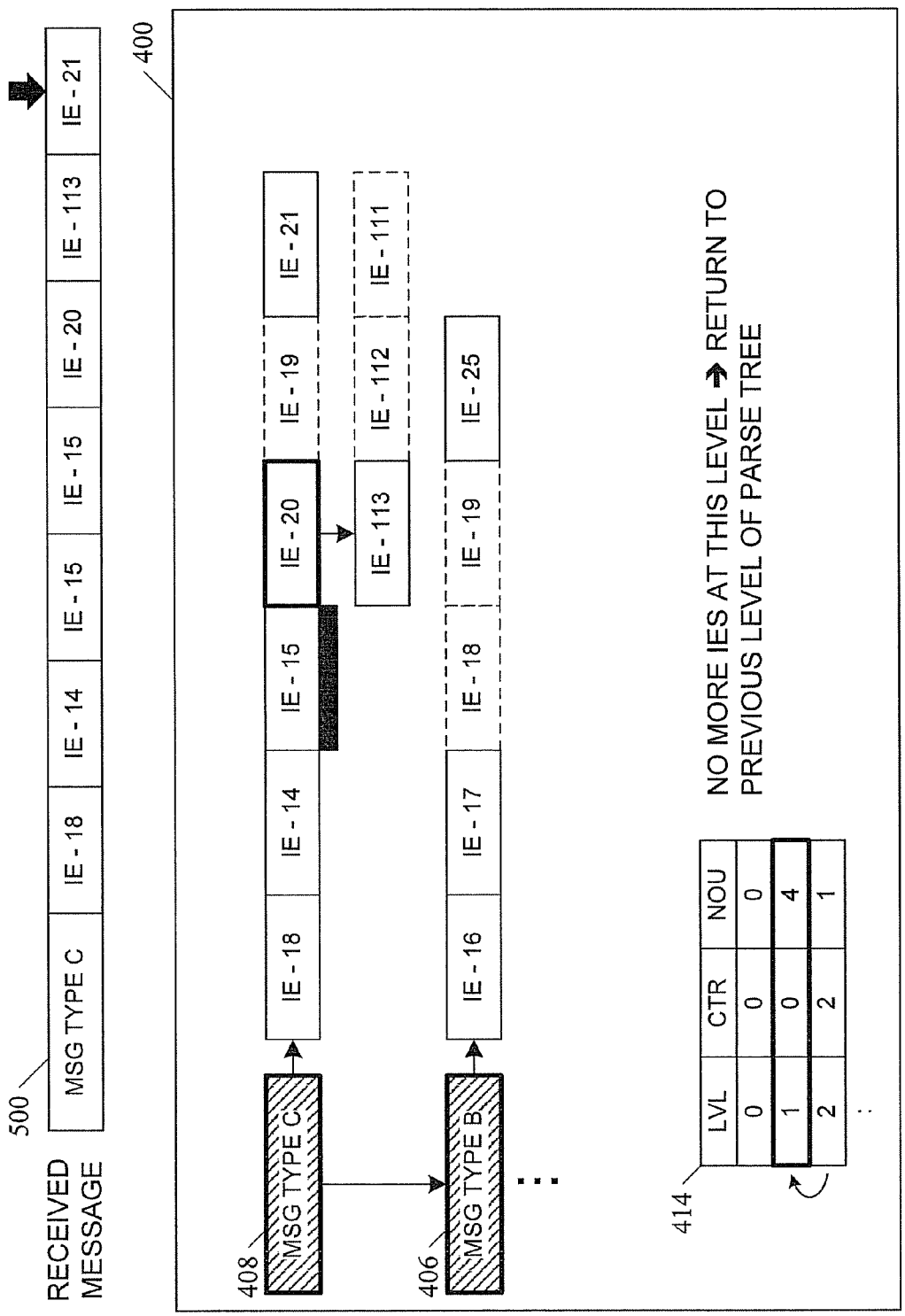
Figure 12E:
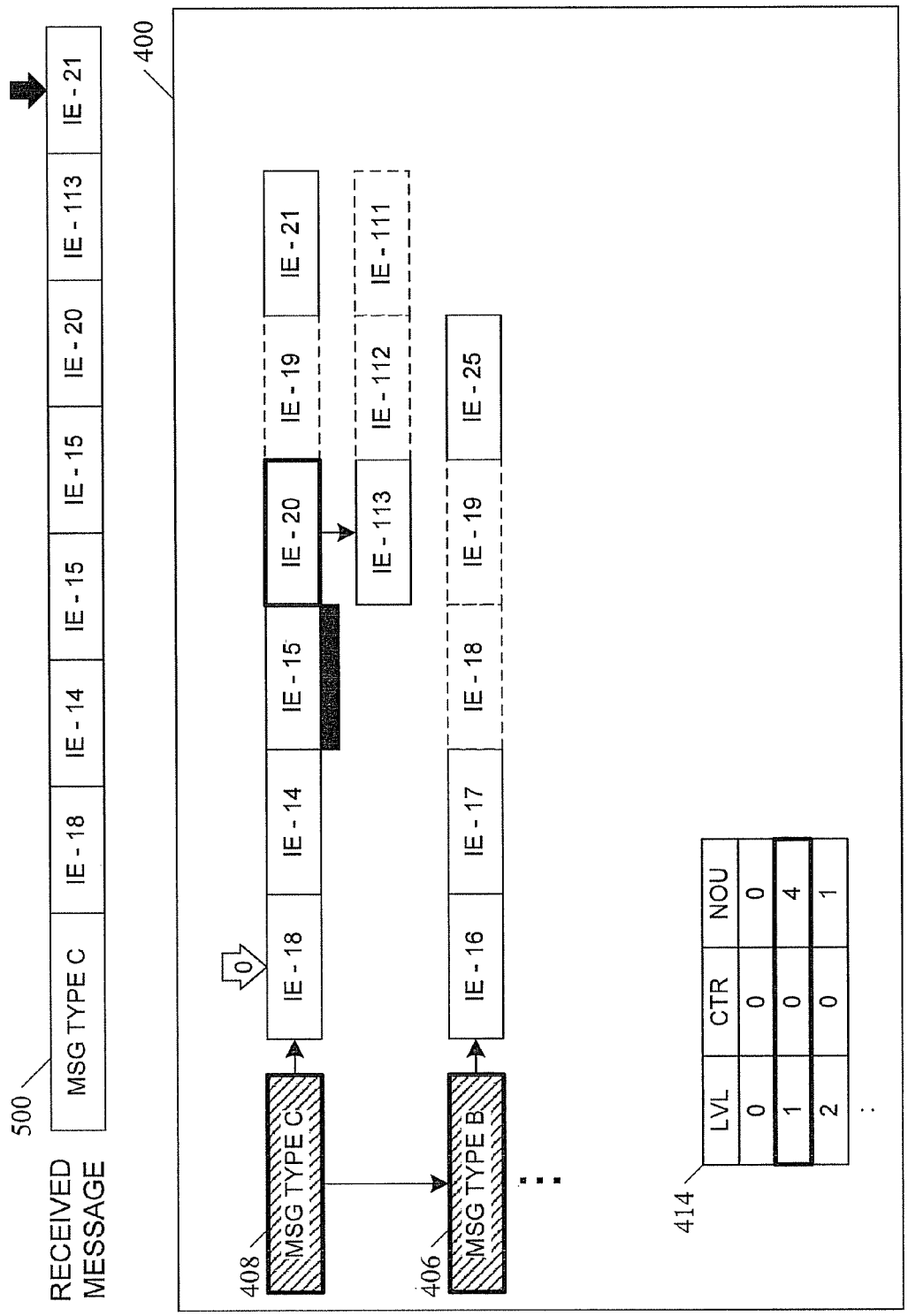
Figure 12F:
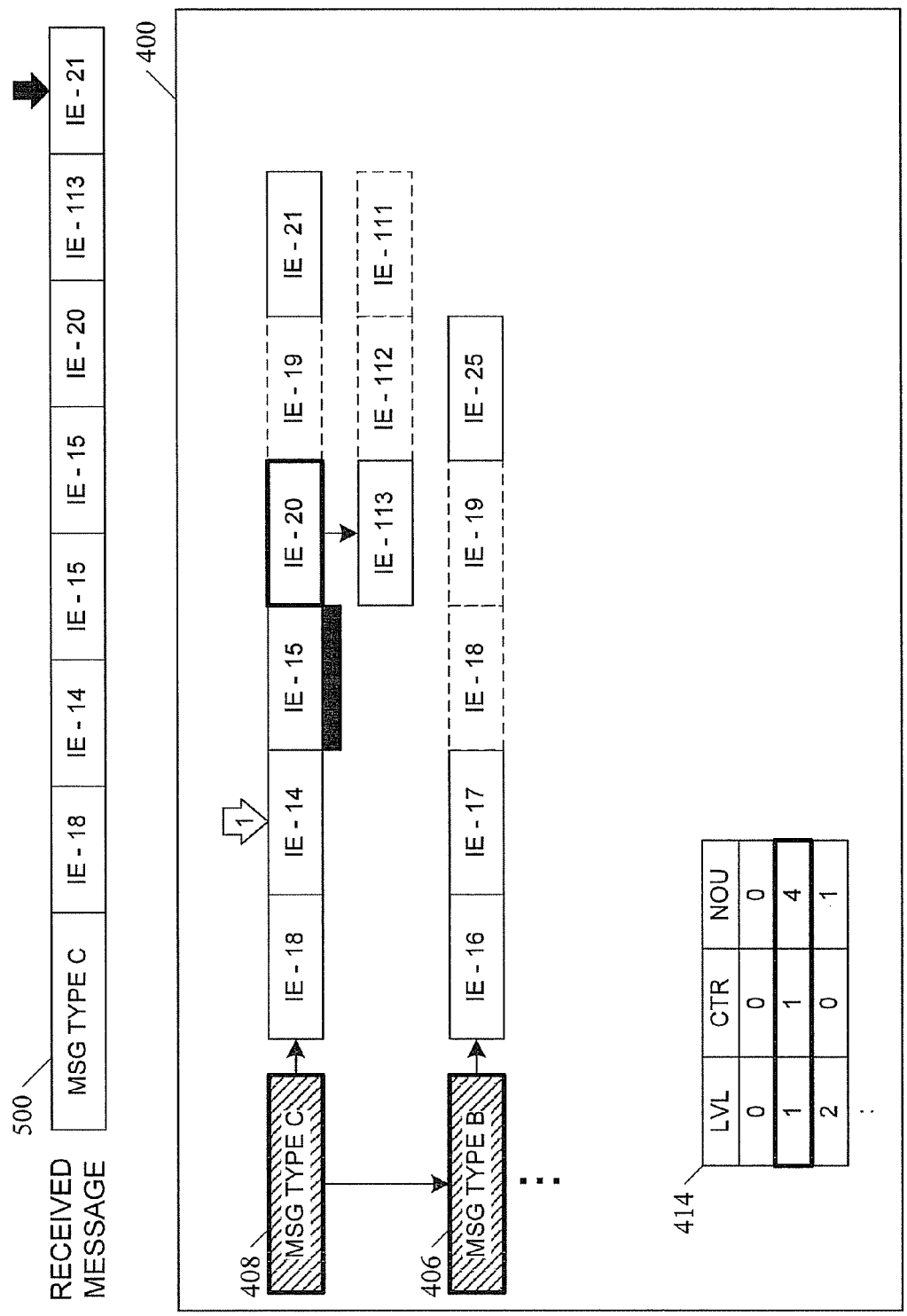
Figure 12G:
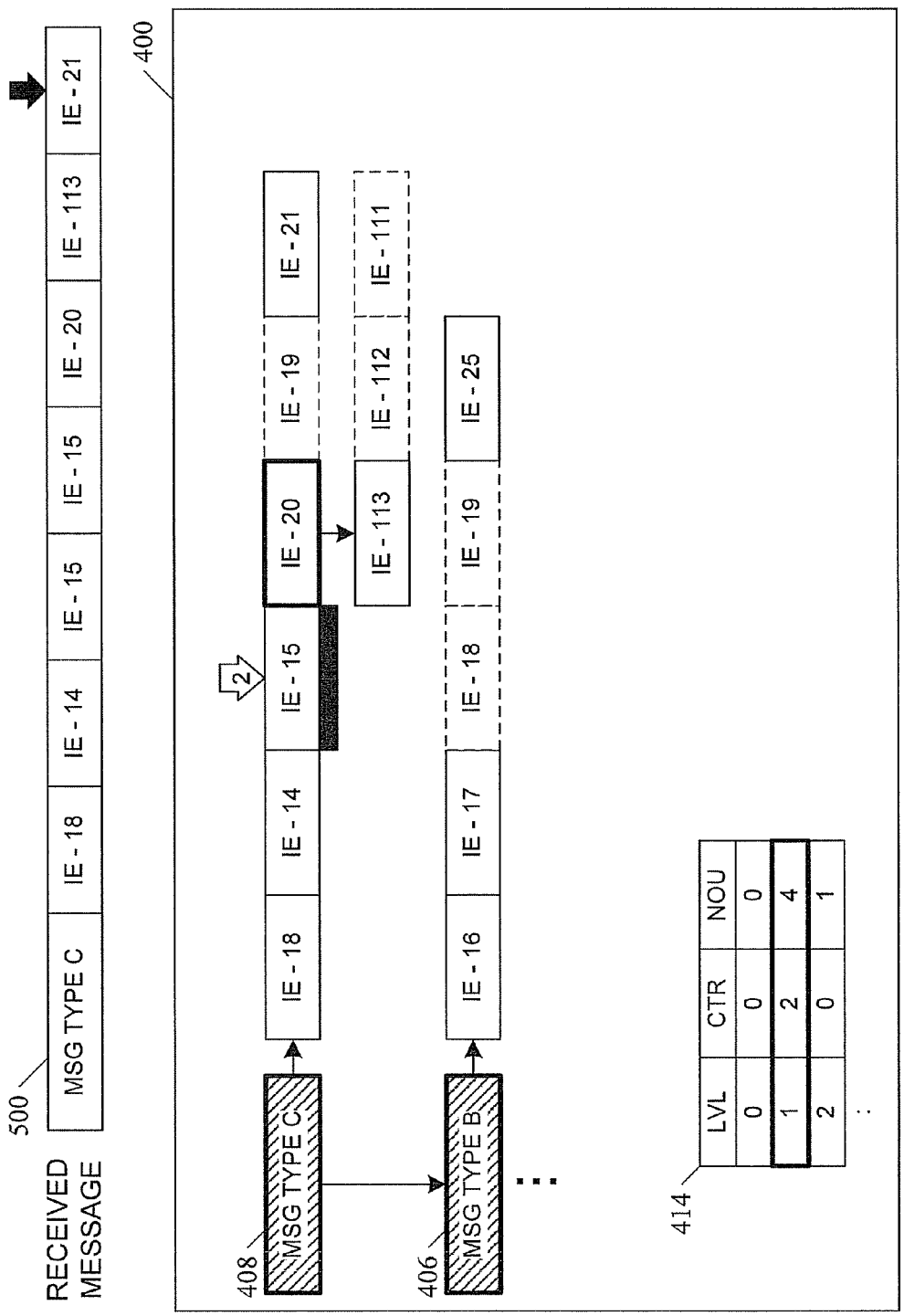
Figure 12H:
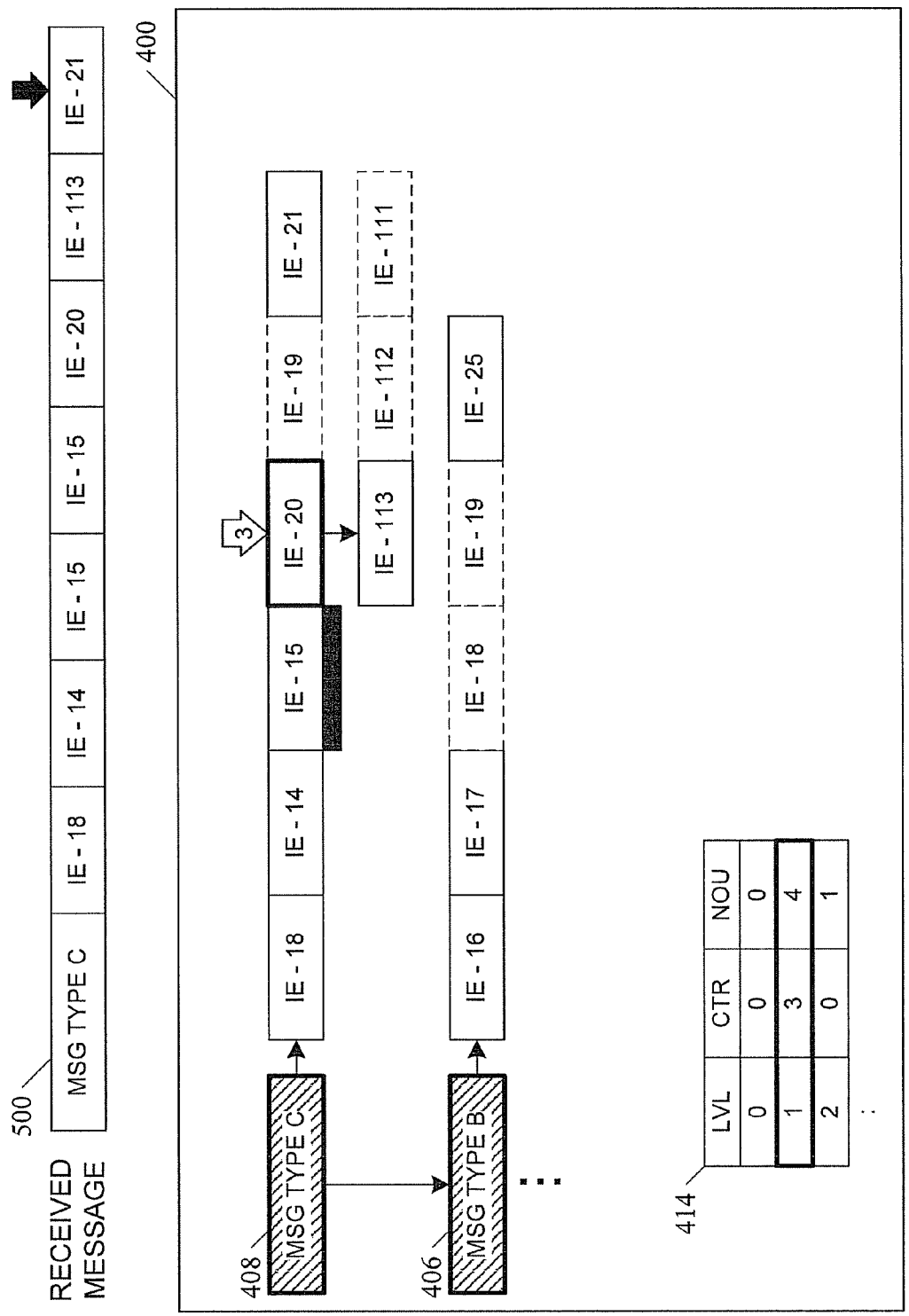
Figure 12I:
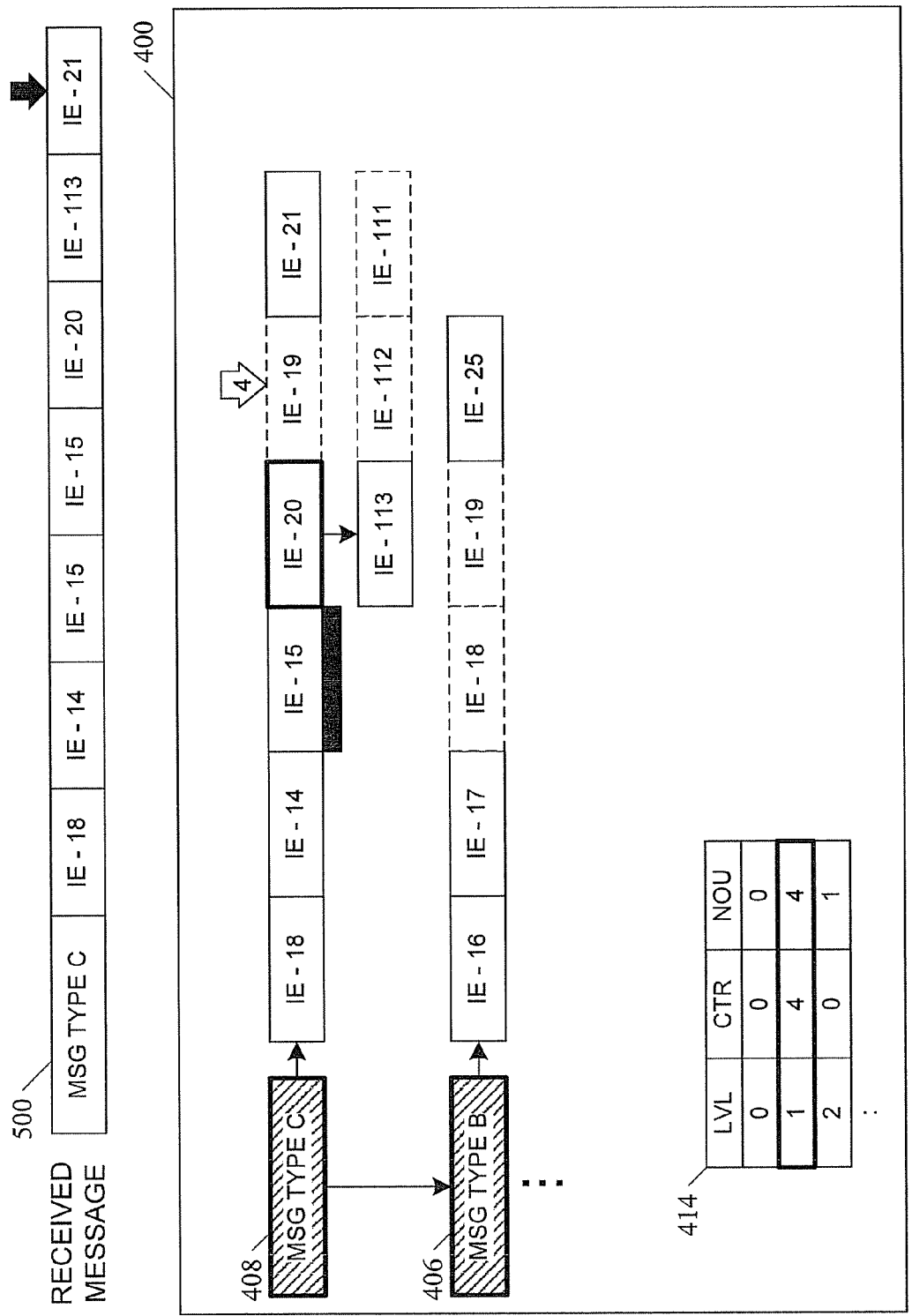

In FIGS. 12A through 12M, protocol tree 400 is searched for the next MSG_IE, "IE-21". In FIGS. 12A, 12B, and 12C, MSG_IE is compared to PROT_IE nodes at LVL2 within protocol tree 400. In FIG. 12D, it is determined that there are no more IEs available within the protocol tree at this level, and therefore the process recurses or otherwise returns to the previous level of the parse tree. This is indicated by the thick border around the row of table 414 that corresponds to LVL1.

Figure 12J:
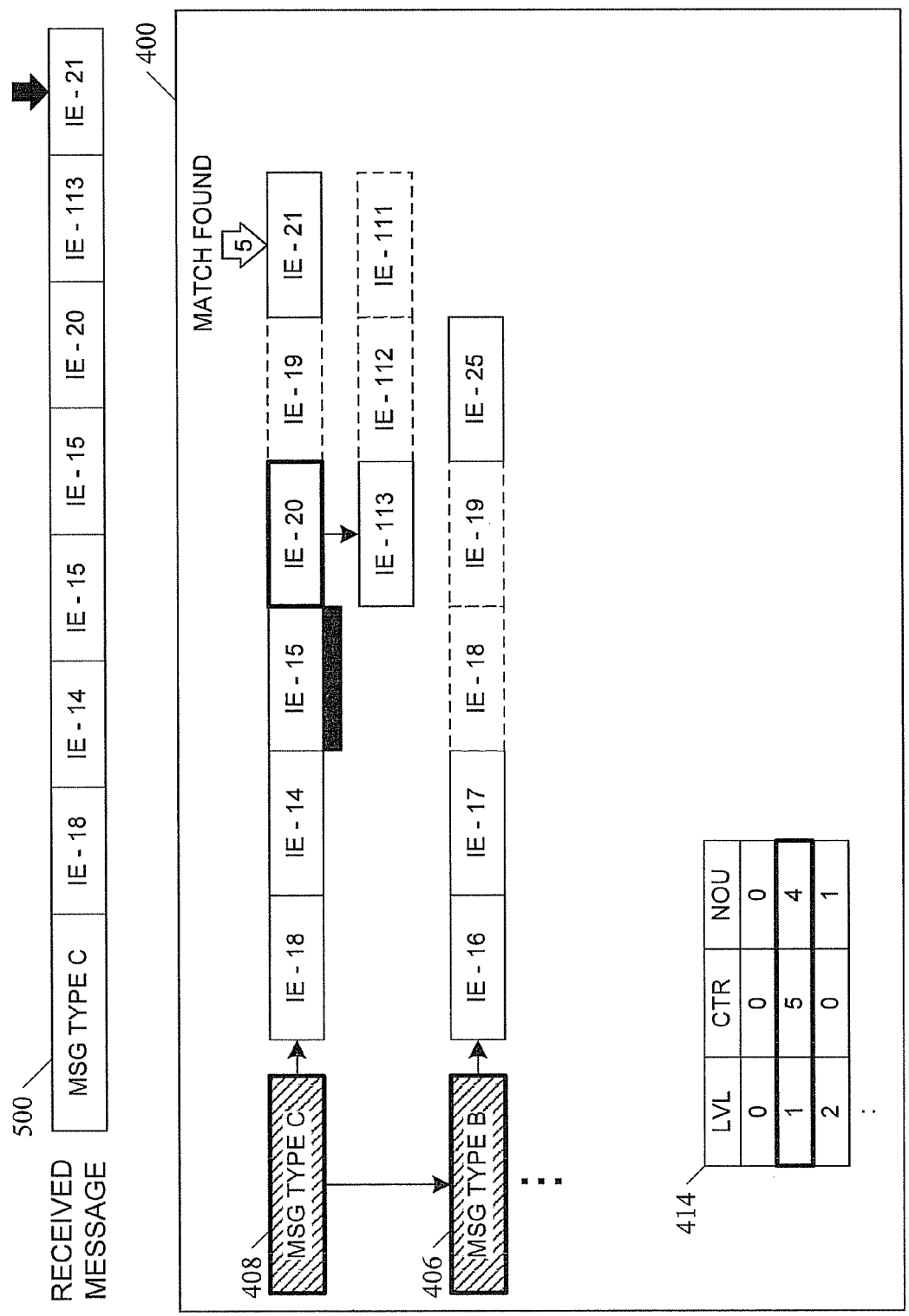
Figure 12K:
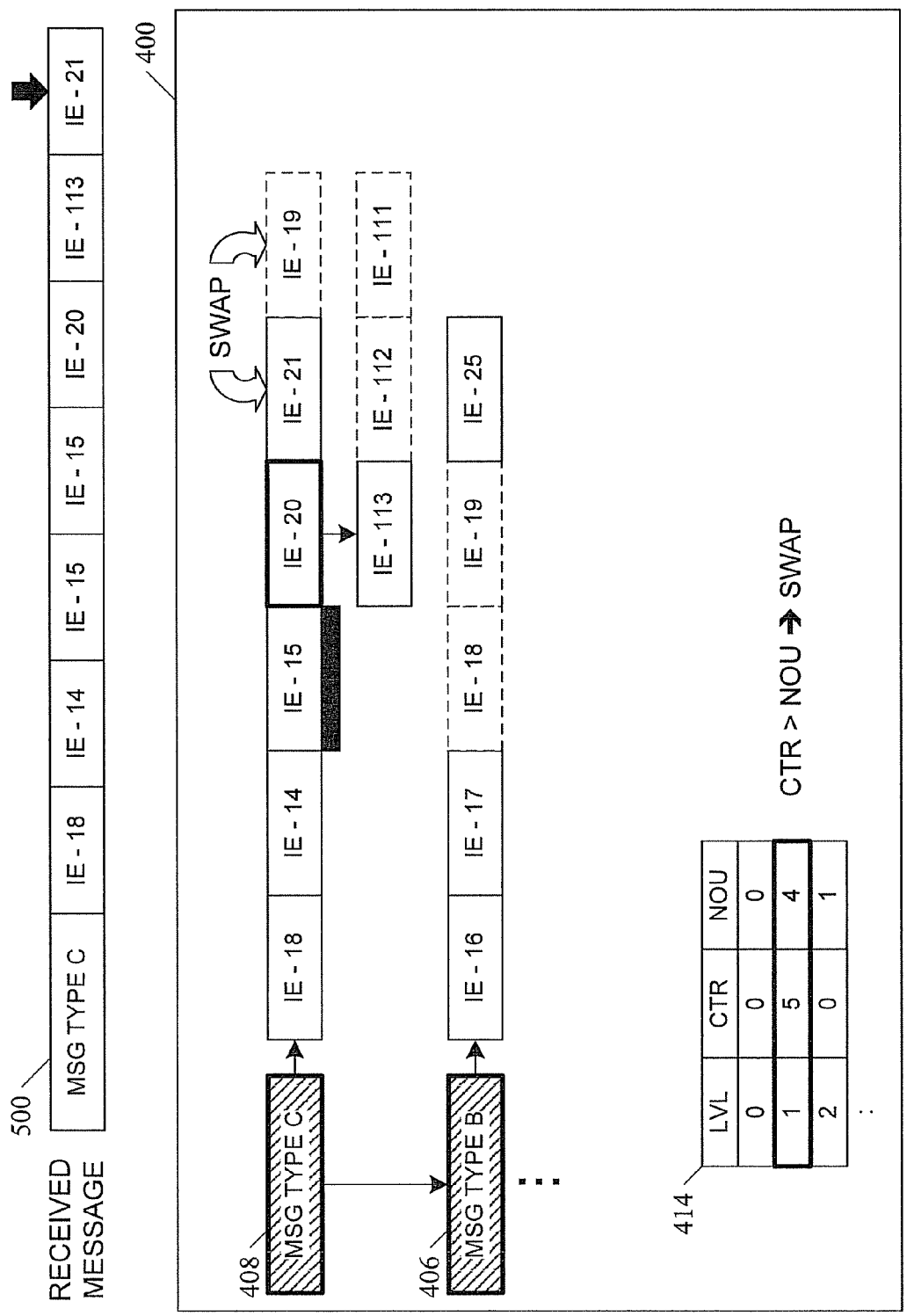
Figure 12L:
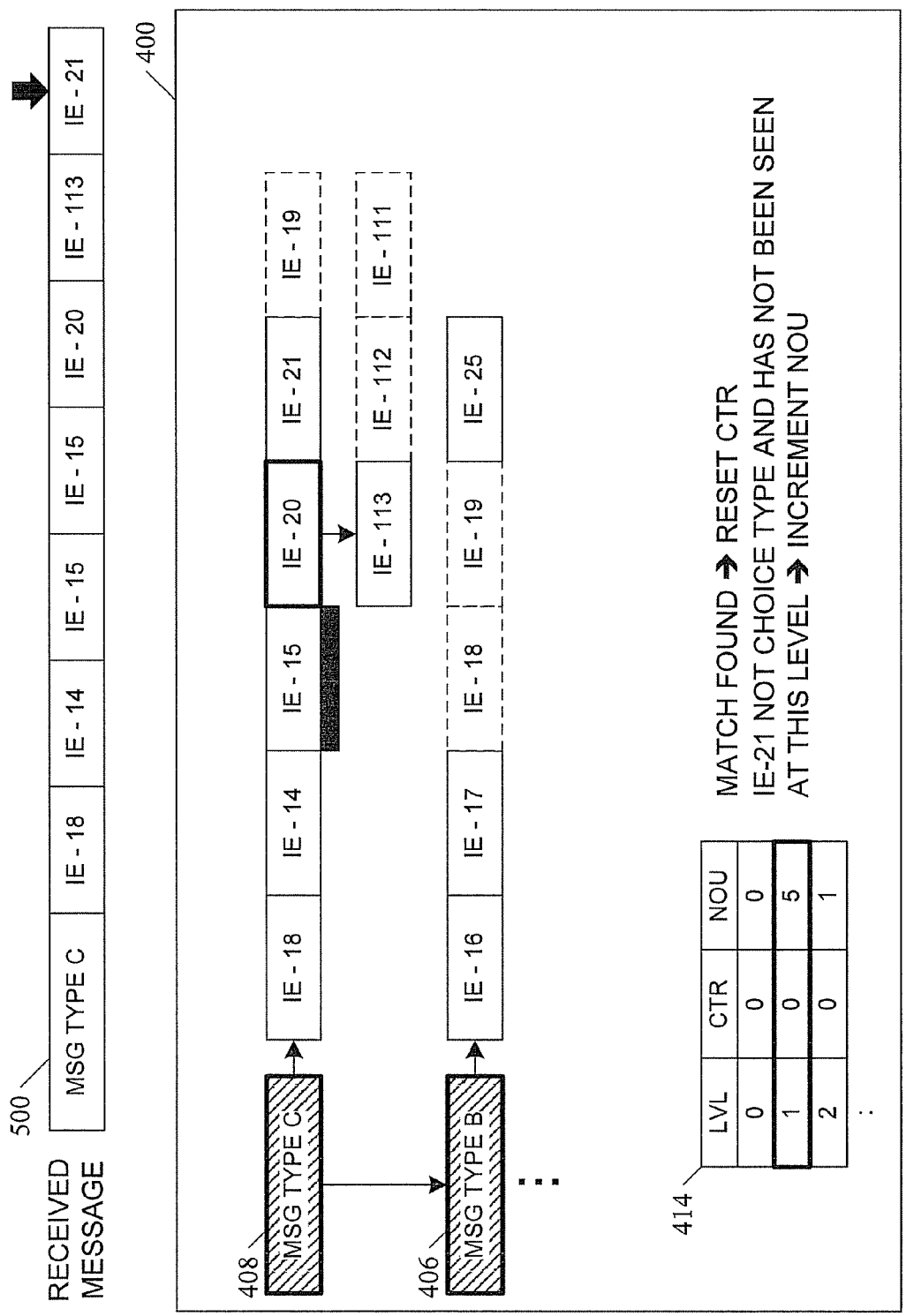
Figure 12M:
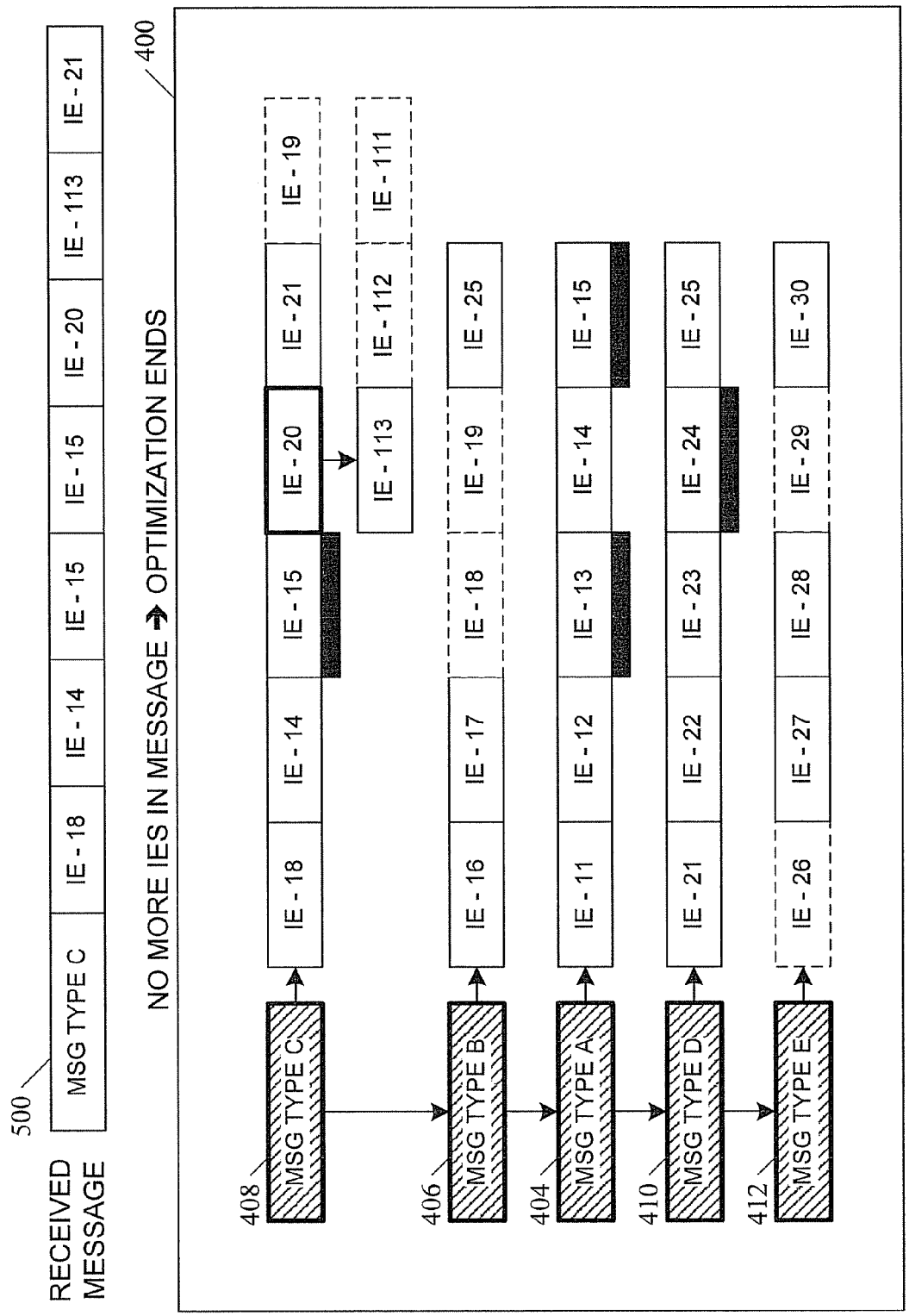

FIGS. 12E, 12F, 12G, 12H, 12I, and 12J show the comparison of MSG_IE to PROT_IE LVL1 nodes IE-18, IE-14, IE-15, IE-20, IE-19, and IE-21, respectively, while the value of CTR for LVL1 is incremented accordingly. In FIG. 12J MSG_IE matches PROT_IE. In FIG. 12K, the value of CTR (5) is greater than the value of NOU (4), and therefore IE-c21 and IE-19 swap places within protocol tree 400. In FIG. 12L, because a match was found, the value of CTR for LVL1 is reset, and because the matched IE, IE-21, is not a choice type and has not been seen yet at this level, the value of NOU for LVL1 is incremented to 5. In FIG. 12M, all IEs of message 500 have been processed and the optimization of protocol tree 400 ends. FIG. 12M shows the arrangement of protocol tree 400 as optimized by the process shown in FIGS. 3A and 3B. At the conclusion of this process, protocol tree 400 is in a form that is optimized to parse subsequent messages that have the same structure as message 500.

Although not shown in FIGS. 5A through 12M, other branches of the protocol tree may also be optimized. For example, if the second message received is a Message Type B 406, this node and its sub-branches may be moved to the top of protocol tree 400 and its non-choice nodes IE-16, IE-17, IE-18, IE-19, and IE-25 may be optimized in a like manner. If the third message received is another Type C message, the previously optimized branch and sub-branches for Message Type C 408 will be moved to the top of protocol tree 400 in their already-optimized form, allowing the third message to be efficiently parsed.

Likewise, in embodiments where statistics are maintained about which message types are most often received, the system may perform optimization in place. Using protocol tree 400 for example, if the most commonly received message type is Message Type C 408 and the next most commonly received message type is Message Type D 410, during the optimization process node 408 and its children will be moved to first position in the list of choice IEs, while node 410 and its children will be moved to the second position in the list of choice IEs. If the system determines that a second variation of Message Type D is being received more often that a first variation of Message Type D, but still less often than messages of Message Type C, node 410 may remain in its position as second in the list of choice IEs but the children of node 410 may be rearranged to match the variation Message Type D that is more often received. This is referred to as optimization in place since parent node 410 does not move.

It will be understood that various details of the subject matter described herein may be changed without departing from the scope of the subject matter described herein. For example, in one embodiment, at step 302 in FIG. 3, rather than restarting CTR at zero, CTR may start from its previous value (or its previous value plus one) and if the MSG_IE and PROT_IE do not immediately match, at that time CTR may be set to zero and the process operates as shown in FIG. 3. This optimization would improve performance of the parser after the tree has been optimized provided that the subsequent messages have the message format to which the tree was adapted. Other implementation specifics may likewise vary. Furthermore, the foregoing description is for the purpose of illustration only, and not for the purpose of limitation.

What is claimed is:

1. A method for heuristics-based adaptive protocol parsing, the method comprising:
   receiving, at a hardware communications interface, a message of a first protocol, wherein the first protocol defines a plurality of valid message formats, the message having a format;
   parsing the received message using a protocol tree for determining whether the format of the received message is one of the plurality of valid message formats, wherein parsing the receiving message using a protocol tree includes processing information elements (IEs) of the received message while traversing the protocol tree, wherein determining whether the format of the received message is one of the plurality of valid message formats includes determining whether the order of IEs in the received message corresponds to an extant path within the protocol tree; and
   while parsing the received message, using heuristics to modify the structure of the protocol tree in real time such that the protocol tree is optimized for processing observed message formats.

2. The method of claim 1 wherein using heuristics to optimize the protocol tree includes optimizing the protocol tree for parsing messages having the format of the received message.

3. The method of claim 1 wherein using heuristics to optimize the protocol tree includes optimizing the protocol tree for parsing messages having the message format that is most often received.

4. The method of claim 1 wherein parsing the received message using a protocol tree comprises parsing the received message using a protocol tree that is embodied in a non-transitory computer readable medium.

5. The method of claim 1 wherein receiving a message comprises receiving a message that includes a plurality of information elements and wherein parsing the received message using a protocol tree comprises using a protocol tree that includes a plurality of nodes, each node corresponding to an information element.

6. The method of claim 5 wherein using heuristics to optimize the protocol tree includes modifying the protocol tree such that observed information elements appear before non-observed information elements in a search of the protocol tree.

7. A system for heuristics-based adaptive protocol parsing, the system comprising:
   a protocol tree for defining a plurality of valid message formats; and
   a protocol analyzer comprising hardware and for receiving a message having a format, using the protocol tree to parse the received message and determine whether the format of the received message is one of the plurality of valid message formats, wherein parsing the receiving message using a protocol tree includes processing information elements (IEs) of the received message while traversing the protocol tree, wherein determining whether the format of the received message is one of the plurality of valid message formats includes determining whether the order of IEs in the received message corresponds to an extant path within the protocol tree, and, while parsing the received message, using heuristics to modify the structure of the protocol tree in real time such that the protocol tree is optimized for processing observed message formats.

8. The system of claim 7 wherein the protocol analyzer is configured to use heuristics to optimize the protocol tree by optimizing the protocol tree for parsing messages having the format of the received message.

9. The system of claim 7 wherein the protocol analyzer is configured to use heuristics to optimize the protocol tree by optimizing the protocol tree for parsing messages having the message format that is most often received.

10. The system of claim 7 wherein the protocol tree is embodied in a non-transitory computer readable medium.

11. The system of claim 7 wherein the received message comprises a plurality of information elements and wherein the protocol tree comprises a plurality of nodes, each node corresponding to an information element.

12. The system of claim 11 wherein the protocol analyzer is configured to use heuristics to optimize the protocol tree by modifying the protocol tree such that observed information elements appear before non-observed information elements in a search of the protocol tree.

13. A non-transitory computer readable medium having stored thereon executable instructions that when executed by the processor of a computer control the computer to perform steps comprising:
   receiving a message of a first protocol, wherein the first protocol defines a plurality of valid message formats, the message having a format;
   parsing the received message using a protocol tree for determining whether the format of the received message is one of the plurality of valid message formats, wherein parsing the receiving message using a protocol tree includes processing information elements (IEs) of the received message while traversing the protocol tree, wherein determining whether the format of the received message is one of the plurality of valid message formats includes determining whether the order of IEs in the received message corresponds to an extant path within the protocol tree; and
   while parsing the received message, using heuristics to modify the structure of the protocol tree in real time such that the protocol tree is optimized for processing observed message formats.

14. The non-transitory computer readable medium of claim 13 wherein using heuristics to optimize the protocol tree includes optimizing the protocol tree for parsing messages having the format of the received message.

15. The non-transitory computer readable medium of claim 13 wherein using heuristics to optimize the protocol tree includes optimizing the protocol tree for parsing messages having the message format that is most often received.

16. The non-transitory computer readable medium of claim 13 wherein parsing the received message using a protocol tree comprises parsing the received message using a protocol tree that is embodied in the non-transitory computer readable medium.

17. The non-transitory computer readable medium of claim 16 wherein using heuristics to optimize the protocol tree includes modifying the protocol tree such that observed information elements appear before non-observed information elements in a search of the protocol tree.

* * * * *